US008792516B2

(12) United States Patent
Beshai

(10) Patent No.: US 8,792,516 B2
(45) Date of Patent: Jul. 29, 2014

(54) MODULAR HIGH-CAPACITY SWITCH

(75) Inventor: Maged E. Beshai, Stittsville (CA)

(73) Assignee: Rockstar Consortium US LP, Plano, TX (US)

( * ) Notice: Subject to any disclaimer, the term of this patent is extended or adjusted under 35 U.S.C. 154(b) by 485 days.

(21) Appl. No.: 12/916,805

(22) Filed: Nov. 1, 2010

(65) Prior Publication Data
US 2011/0052191 A1    Mar. 3, 2011

Related U.S. Application Data

(62) Division of application No. 11/743,805, filed on May 3, 2007, now Pat. No. 7,843,905, which is a division of application No. 10/223,222, filed on Aug. 20, 2002, now abandoned.

(51) Int. Cl.
*H04B 7/212* (2006.01)
(52) U.S. Cl.
USPC .......................................... 370/442; 370/458
(58) Field of Classification Search
None
See application file for complete search history.

(56) References Cited

U.S. PATENT DOCUMENTS

| 3,851,104 | A | * | 11/1974 | Willard et al. ................. 370/442 |
| 4,005,272 | A | | 1/1977 | Collins et al. |
| 4,123,624 | A | | 10/1978 | Gagnier et al. |
| 4,337,463 | A | | 6/1982 | Vangen |
| 4,530,089 | A | * | 7/1985 | Ansell et al. .................. 370/378 |
| 4,771,420 | A | | 9/1988 | Deschaine et al. |
| 4,903,259 | A | | 2/1990 | Hayano |
| 5,091,905 | A | | 2/1992 | Amada |
| 5,241,536 | A | | 8/1993 | Grimble et al. |
| 5,247,593 | A | * | 9/1993 | Lin et al. ........................ 385/17 |
| 5,327,422 | A | | 7/1994 | Abefelt et al. |
| 5,367,518 | A | | 11/1994 | Newman |
| 5,504,741 | A | * | 4/1996 | Yamanaka et al. ............. 370/412 |

(Continued)

FOREIGN PATENT DOCUMENTS

| CA | 2310856 A1 | 12/2001 |
| EP | 1026856 A2 | 8/2000 |
| EP | 1087635 A2 | 3/2001 |
| WO | 2001065783 A1 | 9/2001 |

OTHER PUBLICATIONS

Maged E. Beshai; Time Co-ordination in a Burst-Switching Network, 98 pages.
Maged E. Beshai; Switched Channel-Band Network, 64 pages.

(Continued)

*Primary Examiner* — Marsha D Banks Harold
*Assistant Examiner* — Hooman Houshmand
(74) *Attorney, Agent, or Firm* — Christopher & Weisberg, P.A.

(57) ABSTRACT

A modular optical switch includes a set of optical switch modules connected in a mesh, a master controller for the whole optical node and a switch-module controller for each of the optical switch modules. The optical switch modules receive optical signals from, and transmit optical signals to, edge nodes based on connection requests received from the edge nodes. The master controller acts to select a path, using a simple or compound time-slot matching process, through the mesh of switch modules for each optical signal related to a connection request. Advantageously, the optical switch modules are fast switching, enabling the use of time-sharing schemes such as TDM, and the modular optical core node is made practical by efficient path selection at the master controller. A hybrid modular switch may include both optical and electronic switch modules, a master controller, and a switch-module controller for each of the switch modules.

7 Claims, 32 Drawing Sheets

(56) References Cited

U.S. PATENT DOCUMENTS

| | | | |
|---|---|---|---|
| 5,555,266 A * | 9/1996 | Buchholz et al. | 370/347 |
| 5,850,398 A | 12/1998 | King, Jr. | |
| 5,896,380 A | 4/1999 | Brown et al. | |
| 6,353,618 B1 | 3/2002 | Hung et al. | |
| 6,501,762 B1 | 12/2002 | Pillar et al. | |
| 6,563,837 B2 | 5/2003 | Krishna et al. | |
| 6,570,873 B1 * | 5/2003 | Isoyama et al. | 370/375 |
| 6,618,379 B1 | 9/2003 | Ramamurthy et al. | |
| 6,747,971 B1 | 6/2004 | Hughes et al. | |
| 6,781,986 B1 | 8/2004 | Sabaa et al. | |
| 6,813,274 B1 | 11/2004 | Suzuki et al. | |
| 6,868,084 B2 | 3/2005 | Konda | |
| 6,885,639 B2 | 4/2005 | Kamiya | |
| 6,885,663 B2 | 4/2005 | Laubner et al. | |
| 6,891,834 B1 | 5/2005 | Dally et al. | |
| 6,934,295 B2 | 8/2005 | Ikematsu | |
| 6,956,851 B1 | 10/2005 | McKeown et al. | |
| 6,970,469 B1 | 11/2005 | Howarth et al. | |
| 7,110,394 B1 | 9/2006 | Chamdani et al. | |
| 7,139,277 B2 * | 11/2006 | Ofek et al. | 370/401 |
| 7,154,885 B2 | 12/2006 | Nong | |
| 7,161,906 B2 | 1/2007 | Dell et al. | |
| 7,173,931 B2 | 2/2007 | Chao et al. | |
| 7,420,969 B2 | 9/2008 | Siu et al. | |
| 7,636,358 B1 | 12/2009 | Manchester et al. | |
| 2002/0039364 A1 | 4/2002 | Kamiya et al. | |
| 2002/0044568 A1* | 4/2002 | Smiljanic | 370/468 |
| 2002/0075884 A1 | 6/2002 | Wellen | |
| 2002/0085491 A1* | 7/2002 | Beshai et al. | 370/230 |
| 2002/0105963 A1* | 8/2002 | Boroditsky et al. | 370/458 |
| 2002/0141400 A1 | 10/2002 | DeMartino | |
| 2002/0176428 A1 | 11/2002 | Ornes et al. | |
| 2002/0191588 A1 | 12/2002 | Personick | |
| 2003/0107996 A1* | 6/2003 | Black et al. | 370/235 |
| 2003/0202545 A1 | 10/2003 | Arbel et al. | |
| 2003/0214944 A1 | 11/2003 | Towles | |
| 2003/0214982 A1 | 11/2003 | Lorek et al. | |

OTHER PUBLICATIONS

STWnet: A High Bandwidth Space-Time-Wavelength Multiplexed Optical Switching Network by Kannan R et al; Apr. 7, 1997; ISBN:0-8186-7780-5, IEEE 1997.

* cited by examiner

INLET PORT 1016

|  | 0 | 1 | 2 | 3 | 4 |
|---|---|---|---|---|---|
| 0 | 0 | 1 | 2 | 3 | 4 |
| 1 | 5 | 6 | 7 | 8 | 9 |
| 2 | 10 | 11 | (12) | 13 | 14 |
| 3 | 15 | 16 | 17 | 18 | 19 |
| 4 | 20 | 21 | 22 | 23 | 24 |

2000A

OUTLET PORT 1018

|  | 0 | 1 | 2 | 3 | 4 |
|---|---|---|---|---|---|
| 0 | 0 | 1 | 2 | 3 | 4 |
| 1 | 5 | 6 | 7 | 8 | 9 |
| 2 | 10 | (11) | 12 | 13 | 14 |
| 3 | 15 | 16 | 17 | 18 | 19 |
| 4 | (20) | 21 | 22 | 23 | 24 |

2000B

INLET PORT 1016

|  | 0 | 1 | 2 | 3 | 4 |
|---|---|---|---|---|---|
| 0 | 0 | 1 | 1 | 0 | 0 |
| 1 | 0 | 0 | 1 | 0 | 0 |
| 2 | 1 | 1 | (0) | 0 | 0 |
| 3 | 1 | 1 | 1 | 0 | 0 |
| 4 | 0 | 0 | 0 | 0 | 0 |

2010A

OUTLET PORT 1018

|  | 0 | 1 | 2 | 3 | 4 |
|---|---|---|---|---|---|
| 0 | 1 | 1 | 0 | 0 | 0 |
| 1 | 0 | 0 | 1 | 0 | 0 |
| 2 | 0 | (0) | 1 | 0 | 0 |
| 3 | 0 | 1 | 1 | 0 | 0 |
| 4 | (0) | 1 | 0 | 0 | 0 |

2010B

SWITCH MODULE INDEX (vertical axis labels)

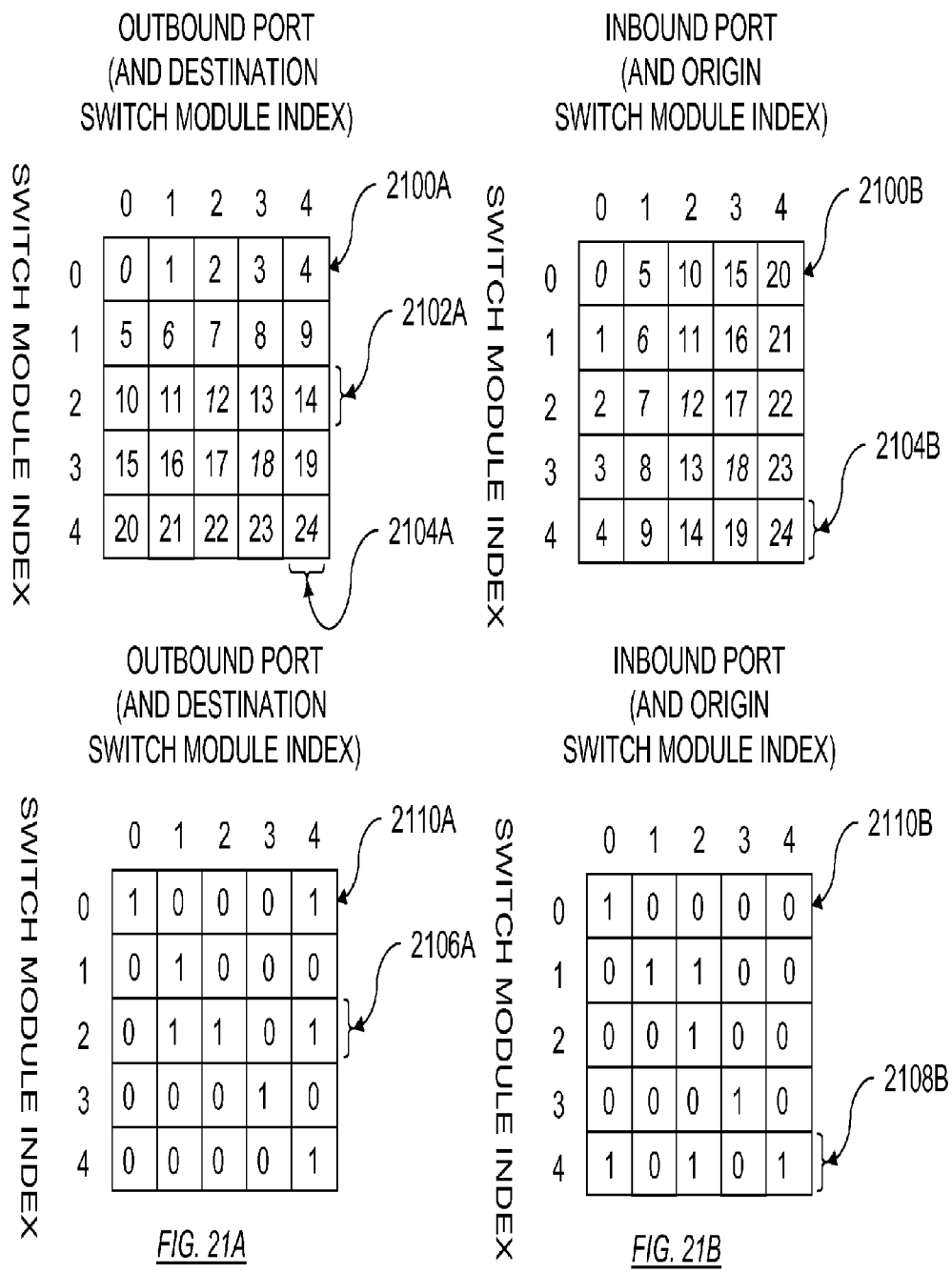

| L1 | L2 | T |
|----|------|----|
| 14 | NULL | 15 |

⌐ 2502

| L1 | L2 | T |
|----|----|---|
| 11 | 9  | 0 |
| 10 | 4  | 3 |
| 13 | 19 | 6 |

| Internal Path: types of switch modules Traversed | Number of matching processes: matching order | | |
|---|---|---|---|
| | 1st | 2nd | 3rd |
| Electronic-Electronic | 2 | 0 | 0 |
| Electronic-Optical | 2 | 0 | 0 |
| Optical-Electronic | 2 | 0 | 0 |
| Optical-Optical | 0 | 1 | 0 |
| Electronic-Electronic-Electronic | 3 | 0 | 0 |
| Electronic-Electronic-Optical | 3 | 0 | 0 |
| Electronic-Optical-Electronic | 3 | 0 | 0 |
| Electronic-Optical-Optical | 1 | 1 | 0 |
| Optical-Electronic-Electronic | 3 | 0 | 0 |
| Optical-Electronic-Optical | 3 | 0 | 0 |
| Optical-Optical-Electronic | 1 | 1 | 0 |
| Optical-Optical-Optical | 0 | 0 | 1 |

FIG. 32

MODULAR HIGH-CAPACITY SWITCH

CROSS-REFERENCE TO RELATED APPLICATIONS

This application is a divisional of prior application U.S. Ser. No. 11/743,805, filed May 3, 2007, now U.S. Pat. No. 7,843,905 entitled Modular High-Capacity Switch, which is a divisional of prior application U.S. Ser. No. 10/223,222, filed Aug. 20, 2002, now abandoned entitled Modular High-Capacity Switch, both of which are incorporated by reference.

FIELD OF THE INVENTION

The present invention relates to optical network communication and, more particularly, to a modular, high-capacity, optical core node.

BACKGROUND

A typical data network comprises a number of source nodes, each source node receiving traffic from numerous traffic sources, and a number of sink nodes, each sink node transmitting data to numerous traffic sinks. The source nodes can be connected to the sink nodes directly or through core nodes. Source nodes and sink nodes are usually paired so that a source node and an associated sink node are included within a single edge node.

The capacity of a given data network may be defined by the capacities of the edge nodes and the core nodes. Each link between nodes (e.g., a link from a source node to a core node or a link from a core node to a sink node) may comprise multiple channels. Where an optical link is divided into channels using Wavelength Division Multiplexing (WDM), each channel in the optical link is defined by a separate modulated wavelength. Additionally, the link, or channels of the link, may be sub-divided in time using Time Division Multiplexing (TDM). In a TDM scheme, a set number of time slots makes up a TDM frame. A core node that acts to connect source nodes to sink nodes using multi-channel links may switch an entire incoming link to an outgoing link (link switching), an incoming channel to an outgoing channel (channel switching) or an incoming sub-divided channel to an outgoing sub-divided channel (time-sharing switching). In time-sharing switching, a received optical signal may be switched to a first sink node during one time interval and switched to a second sink node during an immediately subsequent time interval. Accordingly, a switch must be capable of changing the destination of a received signal in a very short period of time. Switches capable of such switching are said to be capable of fast-switching.

Fast-switching, high-capacity, optical switches are needed to realize an agile optical-core network, that is, an optical-core network that may adjust swiftly to changes in desired connectivity between edge nodes. A core node comprises one or more switches. The degree of a switch (or a core node) is a measure of a number of input ports and output ports. To construct a high degree, fast-switching, optical core node using optical-switch modules of smaller sizes, it is known to use an aggregation of the optical-switch modules in a multi-stage arrangement. Where a typical space switch need only be configured to connect an input port to an output port, a core node comprising several optical-switch modules may need to be configured to connect an input port in a first switch to an output port of a second switch. Such a need may be met by establishing a "path" across the core node from the first stage to the second stage. If a direct connection from the first stage to the second stage is unavailable, such a path may traverse one or more intermediate stages.

The construction of a high-capacity, multi-stage, optical core node using optical-switch modules would be considered easily manageable if high path-establishment speed was not a requirement. For instance, high path-establishment speed is not a requirement in the case of conventional cross connectors. However, a relatively long delay required to change a path across an optical core node may preclude the use of such an optical core node for time-sharing switching schemes such as TDM switching or burst switching. In the absence of such time-sharing switching schemes, the multi-stage optical core node becomes a channel-switching cross-connector and a network based on such a core node may be forced to perform such measures as multiple edge-to-edge hops and/or intra-core hops to inter-connect certain edge nodes. These measures may significantly increase the complexity, and degrade the performance, of a network. Ideally, every source node in a given network should be able to reach every sink node in the given network either directly or via a single core node. However, when none of the core nodes to which a source node connects subsequently connects to a desired sink node, there may be a necessity to send a data stream to an intermediate edge node that connects to a core node that does connect to the desired sink node. Such use of an intermediate node may be called "tandem switching".

The number of sink nodes that a given source node can reach without switching at an intermediate edge node is referenced herein as the reach index of the source node. Slow switching, in contrast to the fast switching mentioned above, may limit the reach of a source node and may necessitate tandem switching for data streams of low traffic intensity. This is due to the coarse granularity resulting from slow switching, which increases the number of hops. A data stream is defined as data that is transferred from a source node to a sink node over a particular path (e.g., via a particular core node). Tandem switching may be required when channel switching is used in the core because the number of channels emanating from a source node would typically be smaller than the number of sink nodes addressable by the source node.

Hereinafter, a link from a source node to a core node is called an uplink and a link from a core node to a sink node is called a downlink. A channel in an uplink is called an upstream channel and a channel in a downlink is called a downstream channel. Data carried by an uplink or an upstream channel is identified as upstream data and data carried by a downlink or a downstream channel is identified as downstream data An electronic edge node can realize a high reach index due to the inherent fast-switching ability of electronic edge nodes, which enables capacity division into small units. As stated above, the reach index of a reference edge node is the number of other edge nodes that can be reached by the reference edge node, directly or through core nodes. An optical core node, however, is preferably bufferless and, hence, requires precise time coordination with the source nodes in order to create paths of fine granularities through time sharing. To summarize, a fast-switching core node may independently route individual data blocks defined using time-sharing switching techniques such as TDM switching or burst switching. Realizing a high-capacity network requires high-capacity, fast-switching core nodes. Preferably, the core nodes include optical switches.

McGuire (U.S. Pat. No. 5,889,600, issued Mar. 30, 1999) discloses a modular switch operated in a channel switching mode comprising a plurality of star couplers, connecting to a plurality of input WDM links and a plurality of output WDM links. Each WDM link comprises a number of wavelength channels equal to the number of star couplers. Each input WDM link is demultiplexed into its constituent wavelength channels and each of the individual wavelength channels connects to an input port of one of the star couplers. Wavelength converters are provided at the output ports of the star couplers. Each output WDM link carries multiplexed optical signals received from an output port of each star coupler. The modular switch allows a wavelength channel from any input port to connect to any of wavelength channel in a subset of the output ports of the star couplers. For example, using 32×32 star couplers, 32 WDM input links and 32 WDM output links, each input link and each output link carrying 32 wavelength channels, a specific wavelength channel in an input link can be switched to any one of a subset of 32 of the 1,024 output ports of the 32 star couplers.

Multi-stage, optical switch structures that switch channels are known in the prior art. For example, Kuroyanagi (U.S. Pat. No. 6,154,583, issued Nov. 28, 2000) describes an optical switch configured as a multi-stage circuit, with each of the stages including a plurality of space switches. An arrangement of optical amplifiers is also described. Such structures, however, are limited to channel switching granularity, which may be considered too coarse for future applications.

Bala et al. (U.S. Pat. No. 6,335,992, issued Jan. 1, 2002) describe a scalable multi-stage optical cross-connect. The multi-stage optical cross connect comprises a plurality of first stage switch matrices, a plurality of middle stage switch matrices having input ports and output ports, and a plurality of last stage switch matrices having input ports and output ports. Each of the first stage switch matrices has a plurality of input ports, each input port receiving an input communication signal, and a larger number of output ports, where the first stage switch matrices switch the input communication signals to selected output ports. The input ports of the middle stage switch matrices are coupled to the output ports of the first stage switch matrices for receiving communication signals output from the first stage switch matrices. The middle stage switch matrices switch communications signals received at their input ports to their output ports. The input ports of the last stage switch matrices are coupled to the output ports of the middle stage switch matrices for receiving communication signals output from the middle stage switch matrices. The last stage switch matrices switch communications signals received at their input ports to their output ports. In addition, the middle stage itself can be recursively a multi-stage switch.

Neither of the above two disclosures suggests the use of a time-sharing scheme, such as TDM, in a bufferless multi-stage switching node. A node structure that permits scalability and can employ time-sharing techniques is required, and methods of circumventing the difficulty of scheduling signal transfer in bufferless, multi-stage, time-sharing, optical switching nodes are required to enable the realization of such nodes and, ultimately, an efficient network that scales to capacities of the order of several petabits/second.

SUMMARY

A modular, high-capacity, optical core node that includes several medium-capacity, fast-switching, optical switch modules enables the construction of an agile, scalable optical network. Each optical switch module is provided with a controller that includes time-locking circuitry and adaptive-configuration circuitry. The optical switch modules are connected to each other in a mesh structure and each uplink has an internal time-switched path to a respective switch-module controller. The switch-module controllers are communicatively coupled to a master controller, which hosts a fast path-selection device. The switch-module controllers also exchange time-locking data with external nodes, receive connection requests from external nodes, communicate the time-slot-allocation requests to the master controller (based on the connection requests), receive descriptions of time division multiplexed frames from the master controller and configure the internal connectivity of the optical switch modules based on the appropriate time division multiplexed frame descriptions.

Advantageously, the master controller of the modular, high-capacity, optical core node is configured so that time-slot-allocation requests that may be satisfied by a second-order time-slot matching process (for a direct path between switch modules) may be processed before time-slot-allocation requests that may be satisfied by a third-order time-slot matching process (for an indirect path between switch modules). This order of processing avoids unnecessary diversion of a connection to an indirect path. Intra-switch-module paths, which do not require traversing inter-module links, can be processed last.

In accordance with an aspect of the present invention there is provided a modular switch. The modular switch includes a plurality of optical switch modules. Each of the plurality of optical switch modules includes a plurality of inlet ports, each of the plurality of inlet ports adapted to communicatively couple to an optical link from an external node, a plurality of outlet ports, each of the plurality of outlet ports adapted to communicatively couple to an optical link to an external node, a plurality of outbound ports, each of the plurality of outbound ports communicatively coupled to an inter-modular optical link to an other of the plurality of optical switch modules and a plurality of inbound ports, each of the plurality of inbound ports communicatively coupled to an inter-modular optical link from an other of the plurality of optical switch modules. The modular switch also includes a master controller including a path selection device adapted to match vacant time slots in calendars associated with particular ones of the inlet ports, the outlet ports and selected outbound ports of the optical switch modules in response to receiving a connection request, the connection request specifying an inlet port, an outlet port, and a number of time slots in a time-division-multiplex frame.

In accordance with another aspect of the present invention there is provided an optical core node. The optical core node includes a plurality of optical switch modules connected as a mesh, wherein each of the optical switch modules is adapted to communicate with an external node over a corresponding outer link, communicate with another optical switch module over an inner link. The optical core node also includes a plurality of switch-module controllers, each of the plurality of switch-module controllers associated with one of the plurality of optical switch modules, each of the switch-module controllers including a time-locking unit adapted to time-lock the switch-module controller with the external node with which the switch-module controller communicates over the outer link.

In accordance with a further aspect of the present invention there is provided a method of controlling an optical switch module in a modular optical switch. The method includes receiving a connection request, from an edge node, via the optical switch module, where satisfying the connection request requires use of an inter-modular link to another optical switch module in the modular optical switch, sending a time-slot-allocation request to a master controller of the modular optical switch, where the time-slot-allocation request is based on the connection request, receiving a plurality of connection schedules, from the master controller in response to the sending the time-slot-allocation request, wherein each of the plurality of connection schedules is associated with a port of the optical switch module and sending, to the optical switch module, commands adapted to configure an internal connectivity of the optical switch module according to the connection schedules.

In accordance with a still further aspect of the present invention there is provided, in a switching node having a plurality of input ports and a plurality of output ports, the switching node having a controller that includes a route-set memory storing a route set of routes for each pair of input and output ports, and a plurality of cascaded schedulers, each scheduler associated with a result memory and operable to schedule connections for a specified sub-set of time slots within a slotted time frame, a method of scheduling connections in response to receiving connection requests. Each connection request includes a connection descriptor having a connection identifier and specifying one of the plurality of input ports, one of the plurality of output ports and a requested number of time slots in a slotted time frame. The method includes determining a number of pending time slots, the number of pending time slots initially equated to the requested number of time slots, selecting a current scheduler, starting with the first scheduler, to allocate allocable time slots and place identifiers of the allocable time slots in the result memory, selecting a subsequent scheduler as the current scheduler and cyclically reading content of the result memory associated with each of the plurality of cascaded schedulers.

In accordance with an even further aspect of the present invention there is provided, in a switching node comprising inlet ports, outlet ports and inner links, where a route set is designated for each pair of inlet and outlet ports and includes at least one route, each of the at least one route traversing two of the inner links, each inlet port adapted to receive time-multiplexed signals, each signal occupying at least one time-slot in a time frame having $\sigma$ time slots, each inlet port, outlet port and inner link associated with a calendar of $\sigma>1$ cells, each cell corresponding to a time slot and containing an indication of an occupancy state, a method of scheduling a transfer of data, in a specified number of time slots, from a given inlet port to a given outlet port using a designated route set. The method including selecting a candidate time slot from the $\sigma$ time slots, where the selecting is performed in a predetermined order, and, for the candidate time slot, determining, from the calendar associated with the given inlet port, an occupancy state of the given inlet port for the candidate time slot, determining, from the calendar associated with the given outlet port, an occupancy state of the given outlet port for the candidate time slot, selecting a candidate route in the designated route set for consideration, where the selecting is performed in a cyclic order and where the consideration comprises determining, from the calendar associated with a first inner link in the candidate route, an occupancy state of the first inner link in the candidate route for the candidate time slot and, where the occupancy state of the given inlet port, the given outlet port and the first inner link in the candidate route is determined as vacant, considering the candidate route a first available route and the candidate time slot an allocable time slot.

In accordance with an even further aspect of the present invention there is provided a method of matching vacant time slots in a plurality of calendars of time slots, each of the plurality of calendars associated with a port at one of a plurality of optical switch modules in a modular optical switch. The method includes receiving a request for scheduling a time slot that is vacant in a first of the optical switch modules and a second of the optical switch modules, the request specifying an inlet port of the first of the optical switch modules, used to receive a data block from a first edge node, and an outlet port of the second of the optical switch modules, used to transmit the data block to a second edge node and performing a second-order matching process. The second-order matching process includes examining occupancy of the inlet port and the outlet port over sequential time slots until a particular time slot is found for which both the inlet port and the outlet port are vacant, where the examining begins at an initial time slot and, where the particular time slot is found for which both the inlet port and the outlet port are vacant, assessing occupancy of a first inter-modular link connecting the first of the optical switch modules to the second of the optical switch modules for the particular time slot.

In accordance with an even further aspect of the present invention there is provided a method of matching vacant time slots in a plurality of calendars of time slots, each of the plurality of calendars associated with a port at one of a plurality of optical switch modules in a modular optical switch. The method includes receiving a request for scheduling a time slot that is vacant in a first of the optical switch modules and a second of the optical switch modules, the request specifying an inlet port of the first of the optical switch modules, used to receive a data block from a first edge node, and an outlet port of the second of the optical switch modules, used to transmit the data block to a second edge node and performing a third-order matching process. The third-order matching process includes examining occupancy of the inlet port and the outlet port for sequential time slots until a particular time slot is found for which both the inlet port and the outlet port are vacant, where the examining begins at an initial time slot, where the particular time slot is found for which both the inlet port and the outlet port are vacant, assessing occupancy of a second inter-modular link connecting the first of the optical switch modules to a third of the optical switch modules and a third inter-modular link connecting the third of the optical switch modules to the second of the optical switch modules for the particular time slot.

In accordance with an even further aspect of the present invention there is provided an apparatus for matching vacant time slots in a plurality of calendars of time slots, each of the plurality of calendars associated with a port at one of a plurality of optical switch modules in a modular optical switch. The apparatus includes a request buffer adapted to receive a request for allocating a time slot that is vacant in a first of the optical switch modules and a second of the optical switch modules, the request specifying an inlet port of the first of the optical switch modules, used to receive a data block from a first edge node, and an outlet port of the second of the optical switch modules, used to transmit the data block to a second edge node, a path finder adapted to perform a second-order matching process for a given request from the request buffer. The second-order matching process includes examining occupancy of the inlet port and the outlet port for sequential time slots until a particular time slot is found for which both the inlet port and the outlet port are vacant, where the examining begins at an initial time slot and, where the particular time slot is found for which both the inlet port and the outlet port are vacant, assessing occupancy of a first inter-modular link connecting the first of the optical switch modules to the second of the optical switch modules for the particular time slot and, where the first inter-modular link is vacant for the particular time slot, generating a result record identifying the given request, the particular time slot and the first intermodular link. The apparatus also includes a connection-control circuit adapted to receive the result record, update the plurality of calendars to result in updated calendars that reflect use of the particular time slot to satisfy the request and send the updated calendars to the first of the optical switch modules and the second of the optical switch modules.

In accordance with an even further aspect of the present invention there is provided a method of selecting a path through a modular optical switch. The method includes receiving a request, where the request identifies a requested number of time slots, an inlet port of a first switch module and an outlet port of a second switch module, responsive to the receiving the request, comparing a state map, specific to a particular time slot, associated with the inlet port to a state map, specific to the particular time slot, associated with the outlet port to find a matching time slot that is vacant in both the inlet port and the outlet port, if the comparing provides the matching time slot, wherein the state maps associated with the respective ports indicate vacancy in the particular time slot, recording the matching time slot in a result record and transmitting the result record to a controller of the modular optical switch.

In accordance with an even further aspect of the present invention there is provided a path selection apparatus. The path selection apparatus includes a plurality of matching units, where each of the plurality of matching units is adapted to receive a connection request, where the connection request identifies a requested number of time slots, an inlet port of a first switch module and an outlet port of a second switch module, responsive to the receiving the time-slot-allocation request, compare a state map, specific to a particular time slot, associated with the inlet port to a state map, specific to the particular time slot, associated with the outlet port to find a matching time slot that is vacant in both the inlet port and the outlet port and, if the comparing provides the matching time slot, wherein the state maps associated with the respective ports indicate vacancy in the particular time slot, record the matching time slot in a result record. The path selection apparatus also includes a plurality of result buffers, each of the a plurality of result buffers adapted to receive a result record from an associated one of the plurality of matching units and a cyclic selector adapted to select a single result record at a time from each of the plurality of result buffers under control of the cyclic selector.

In accordance with an even further aspect of the present invention there is provided a data structure for simple and compound time-slot matching over a number of time slots to be scheduled, the data structure for use in a switch module in a modular switch comprising a plurality of switch modules having inlet ports and outlet ports. The data structure includes a first matrix having a number of rows equal to a first product of a maximum number of the inlet ports and a maximum number of switch modules and a number of columns equal to the number of time slots, a second matrix having a number of rows equal to a second product of a maximum number of the outlet ports and a maximum number of switch modules and a number of columns equal to the number of time slots, a third matrix having a number of rows equal to a third product of the maximum number of the inlet ports and a maximum number of time slots to be considered and a number of columns equal to a maximum number of the outlet ports and a fourth matrix having a number of rows equal to a fourth product of the maximum number of the outlet ports and a maximum number of time slots to be considered and a number of columns equal to the maximum number of inlet ports.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 20A illustrates a port labeling scheme and associated state map, for port connecting to links inbound from edge nodes to the switch modules of FIG. 19A, as a matrix, according to an embodiment of the present invention;

FIG. 20B illustrates a port labeling scheme and associated state map, for port connecting to links outbound from to the switch modules of FIG. 19A to edge nodes, as a matrix, according to an embodiment of the present invention;

FIG. 21A illustrates a port labeling scheme and associated state map, for outbound ports of the switch modules of FIG. 19A, as a matrix, according to an embodiment of the present invention;

FIG. 21B illustrates a port labeling scheme and associated state map, for inbound ports of the switch modules of FIG. 19A to edge nodes, each a transpose of one of the matrices of FIG. 21A, according to an embodiment of the present invention;

FIG. 25 illustrates a result record generated by the scheduler of FIG. 24;

FIG. 26 and FIG. 27 illustrate a data structure for use in scheduling a connection in the modular core node of FIG. 4;

FIG. 32 is a table indicating the order of time-slot matching processes in a modular switch comprising electronic and/or optical switch modules according to an embodiment of the present invention.

DETAILED DESCRIPTION

Figure 1:
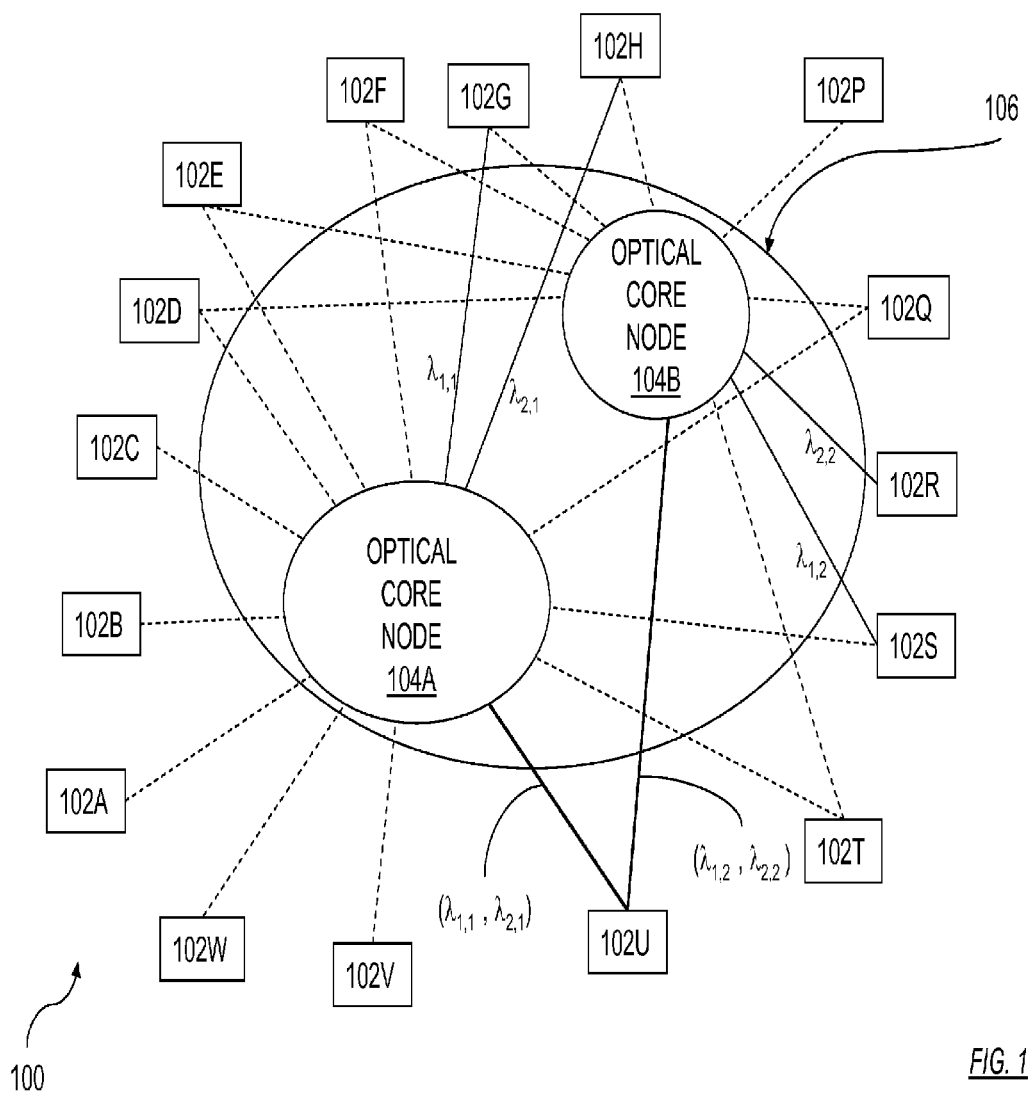
FIG. 1 illustrates a network of electronic edge nodes interconnected by an optical core that switches entire individual wavelength channels according to an embodiment of the present invention.

A first exemplary network 100 is illustrated in FIG. 1 and includes a number of electronic edge nodes 102A, 102B, 102C, 102D, 102E, 102F, 102G, 102H, 102P, 102Q, 102R, 102S, 102T, 102U, 102V and 102W (referenced herein collectively or individually as 102) interconnected by an optical core 106 that comprises a number of optical core nodes 104, two of which, 104A and 104B (referenced herein collectively or individually as 104), are illustrated. The optical core nodes 104 may have different levels of switching granularities. Each of the electronic edge nodes 102 in the first exemplary network 100 of FIG. 1 has a small number of fiber links to the optical core 106, each fiber link carrying wavelength-division-multiplexed (WDM) optical signals, and is hereinafter referenced as a WDM link. The electronic edge nodes 102 support traffic sources and traffic sinks (not illustrated). The optical core nodes 104 switch wavelength channels, thus an electronic edge node 102 having a number, L, of WDM links, each link carrying W wavelength channels, can reach at most L×W other electronic edge nodes 102 at any given time. FIG. 1 illustrates a case where an example electronic edge node 102U has two WDM links each link carrying two wavelength channels. At a given instant of time, the four wavelength channels emanating from edge node 102U may be connected to any four edge nodes, as indicated by the solid lines connecting edge nodes 102G, 102H, 102R, 102S to the optical core 106.

In a high-capacity network, the number of edge nodes can be of the order of a thousand and the number of WDM links from an edge node 102 would be of the order of two, with each WDM link carrying 32 wavelength channels. Thus the edge node can reach up to 64 other edge nodes at any given time. A typical electronic edge node 102, however, may require connections to a large number of other electronic edge nodes 102. Such high connectivity can then be realized indirectly by multiple edge-to-edge hops, where each edge-to-edge hop requires traversing the network core, possibly in several core hops. The electronic edge nodes 102 considered in this disclosure are based on electronic switches and can, therefore, provide a fine switching granularity.

If the number of edge nodes in a given network, similar to that of FIG. 1 is much larger than the number of channels connecting an edge node to the rest of the network, then the majority of destination edge nodes can only be reached by edge-to-edge hopping where the path between two electronic edge nodes 102 traverses intermediate electronic edge nodes 102.

Figure 2:
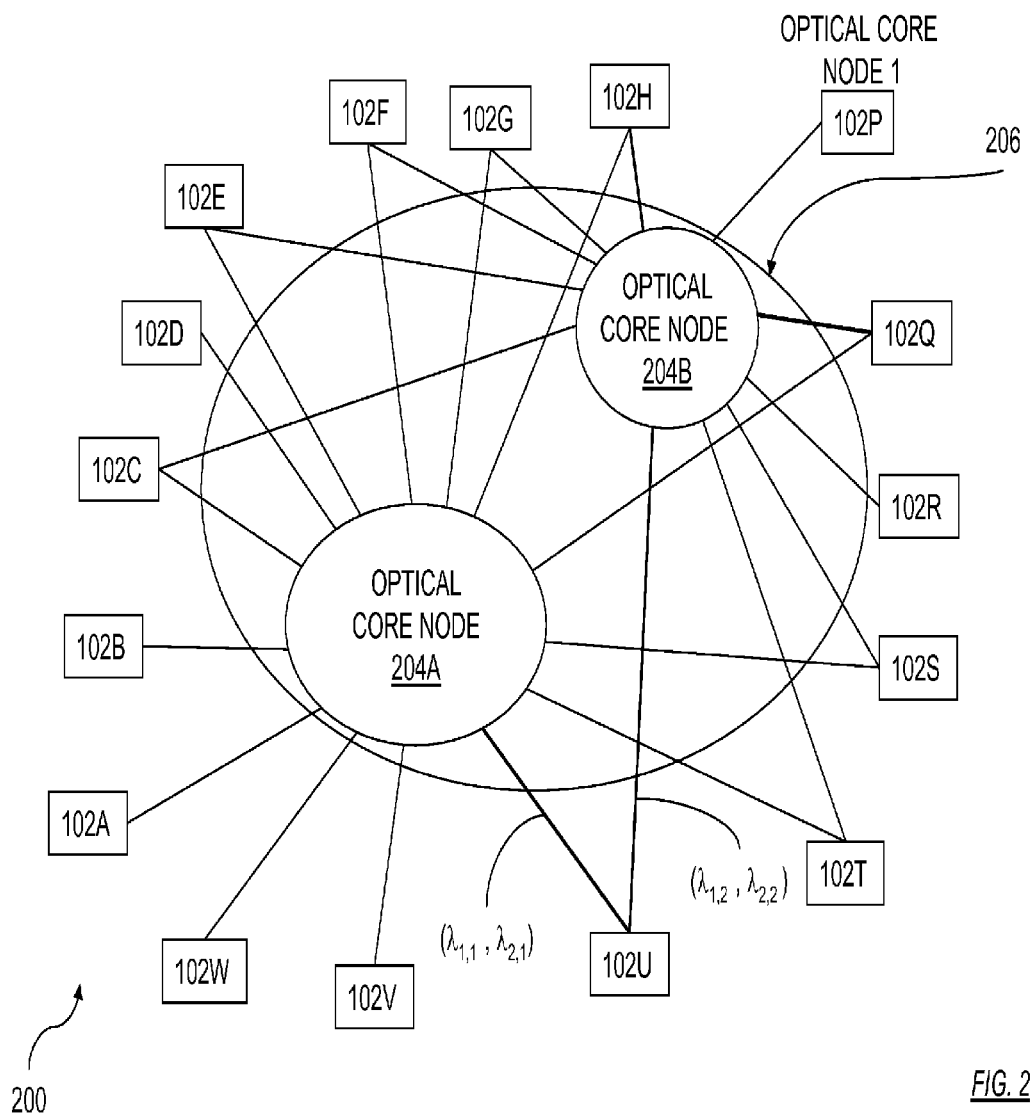
FIG. 2 illustrates a network similar to the network of FIG. 1, with the exception that the capacity of each link, wavelength channel-band or wavelength channel is divided into units, using time-division multiplexing (TDM) for example, and the optical core switches individual units according to an embodiment of the present invention.

FIG. 2 illustrates a second exemplary network 200 similar to the first exemplary network 100 of FIG. 1. Network 200 of FIG. 2 has an optical core 206 comprising a number of core nodes 204, two of which 204A and 204B are illustrated, and differs from the first exemplary network 100 in that the core nodes 204 switch individual "switched units". These switched units derive from a division of the capacity of each fiber link into smaller units, using, for example, time-division multiplexing (TDM).

In a TDM scheme, the electronic edge nodes 102 repetitively send TDM frames, of a given number of time slots, having a structure predetermined at a core node 204. A data block is transferred during each time slot. The structure specifies the time slots in which a particular source electronic edge node 102 should place data blocks destined for a particular destination electronic edge node 102. Communication between the source electronic edge node 102 and the core node 204 is used to establish the TDM frame structure. Such a scheme requires precise time coordination between electronic edge node 102 and core node 204.

A related burst switching scheme also requires precise time coordination between electronic edge node 102 and core node 204. In such a scheme, an electronic edge node 102 indicates, to the core node 204, a desire to transmit a large data block. The core node 204 may reply with a time to start sending the data block.

The reach index of an edge node in the second exemplary network 200 is greater than that of an edge node in the first exemplary network 100 because of the finer granularity of Network 200. Consider the example electronic edge node 102U having two WDM links to the optical core with each link carrying two wavelength channels as described above with reference to FIG. 1. Using a TDM switching scheme where the number of time slots per TDM frame is 128, for example, then the two wavelength channels connecting edge node 102U to core node 204A can be divided into 256 time slots and at a given instant of time, edge node 102U can communicate with all other edge nodes connecting to core node 204A. Likewise, edge node 102U can communicate with all other edge nodes connecting to core node 204B, and some edge nodes can be reached through either or both of core nodes 204A and 204B.

The use of TDM also enables partitioning the capacity of a light beam, regardless of its wavelength band, into optical signal units, each optical signal unit corresponding to a data unit transmitted from an edge node 102 to another edge node 102. If an electronic edge node 102 has a relatively large number of fiber links, 16 for example, to the optical core, and using 1,024 time slots per TDM frame, the number of optical signal units would be 16,384 and a high reach index can be realized for each edge node 102. This eliminates the need for individual wavelength switching. There are many advantages of such wavelength-unaware switching in the optical core. The use of such a scheme requires timing considerations to account for the differing propagation speeds of the constituent wavelength channels in the time-slotted light beam as described in Applicant's U.S. patent application Ser. No. 09/960,959, filed on Sep. 25, 2001 and titled "Switched Channel-Band Network".

The performance, efficiency and scalability of a telecommunications network, comprising nodes interconnected by links, depend heavily on the nodal degree and the directly related network diameter. The degree of a specific node is a measure of the number of nodes to which the specific node directly connects. A direct connection may be continuous or time-slotted. A time slot, or a plurality of time slots, in a time-slotted link also constitutes a direct path along the link. The diameter of a network is a measure of the maximum number of hops along the shortest path between any two nodes. The higher the nodal degree, the smaller the network diameter becomes, and a small network diameter generally yields high performance and high efficiency. On the other hand, for a given nodal degree, scalability generally increases with the network diameter, but to the detriment of network efficiency. It is therefore advantageous to increase the nodal degree to the highest limit that technology permits. To illustrate the implications of nodal degree, reference is made to FIGS. 1 and 2. The reach index of a core node in the networks of FIG. 1 and FIG. 2 is defined herein as the number of edge nodes that can exchange signals through the core node.

Figure 3:
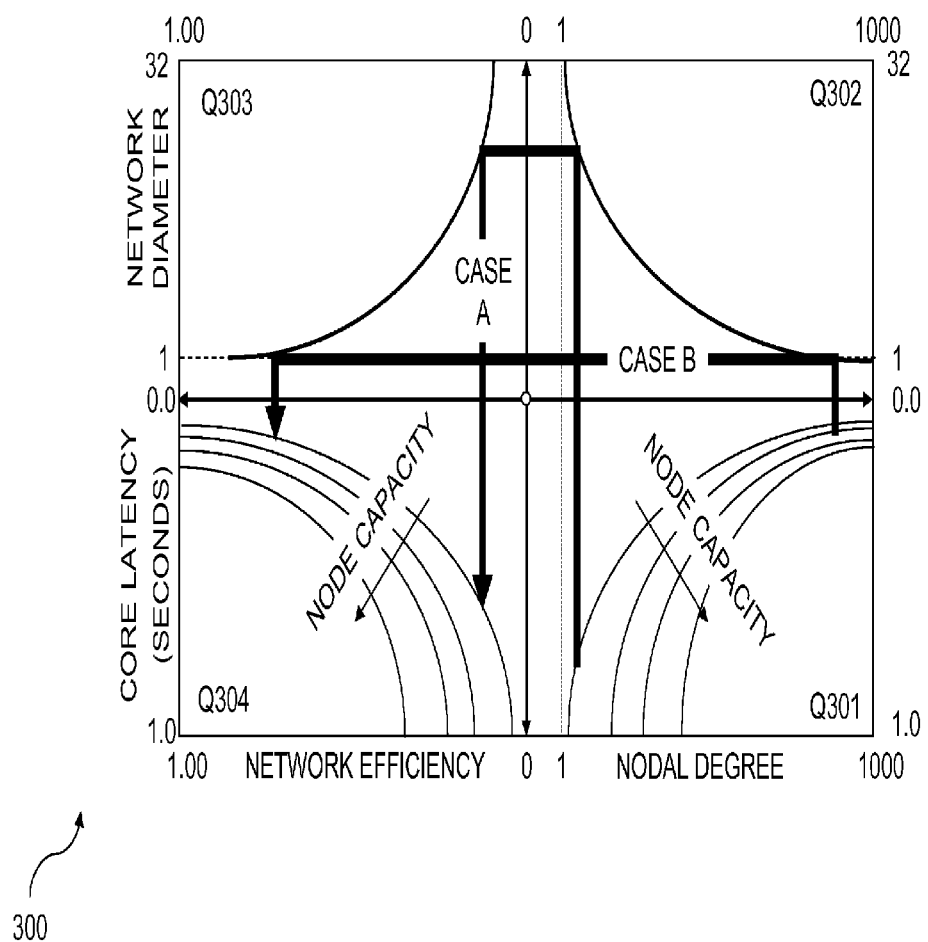
FIG. 3 qualitatively illustrates the effect of switch granularity on edge-to-edge hopping and overall network efficiency.

FIG. 3 qualitatively illustrates the effect of switch granularity on edge-to-edge hopping. Fine switch granularity reduces the number of hops and, hence, increases the network efficiency. The advantages of fine switch granularity, however, are realized at a cost because increasingly fine switch granularity requires increasingly more elaborate controls. Selecting an appropriate granularity is crucial to network efficiency and performance. The inter-relationships among the nodal degree, network diameter, core switching latency and network efficiency are illustrated in four quadrants of a plot 300 in FIG. 3, labeled Q301, Q302, Q303 and Q304. The first quadrant Q301 shows the effect of core switching latency on the nodal degree. Fast switching (low latency) in the core enables time sharing of links and, hence, a higher nodal degree. The nodal degree also increases with node capacity. A high-capacity node can support several links, each of which may further be time divided. The second quadrant Q302 illustrates the effect of nodal degree on network diameter. Naturally, a high degree results in a high direct connectivity and, with proper topology, a smaller number of hops. The third quadrant Q303 illustrates the dependence of network efficiency on the network diameter where a smaller diameter increases efficiency. Finally, the fourth quadrant Q304 illustrates the enhancement of network efficiency with low switching latency and high nodal capacity. FIG. 3 illustrates two cases, case 'A' with a high network diameter, hence low network efficiency and case 'B' with a high degree, low diameter and high efficiency. Case 'A' in FIG. 3 represents a multi-hop network while case 'B' represents a network where the mean number of hops is small. Case 'B' enables higher performance and lower network cost. Having an optical core node of high-capacity and a low switching latency is therefore highly desirable. FIG. 3 elucidates the benefits of having an optical core node of high-capacity and low latency.

Figure 4:
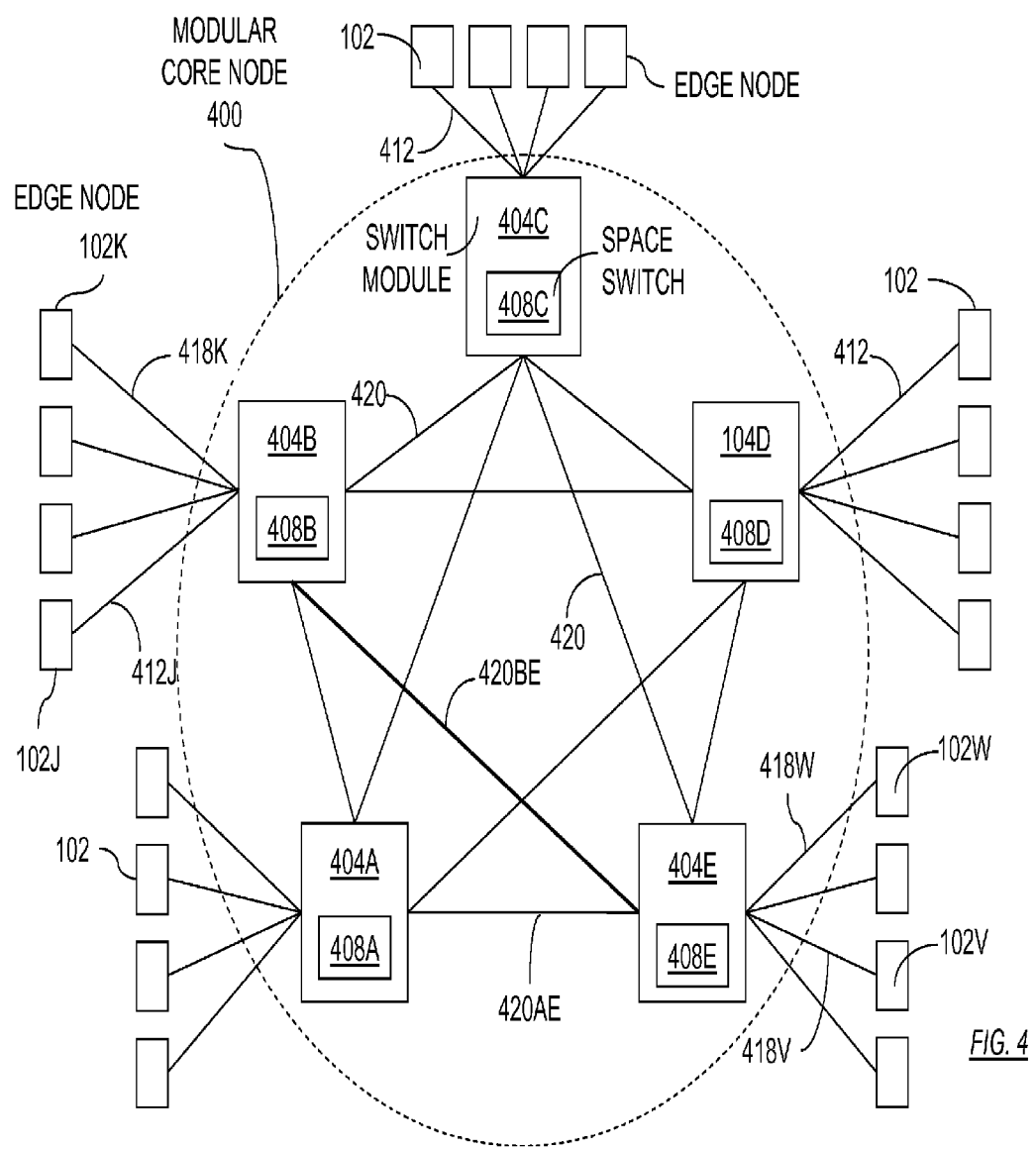
FIG. 4 illustrates a modular core-node structured as a mesh of switch modules according to an embodiment of the present invention.

FIG. 4 illustrates a modular optical core node 400 constructed as a modular switch comprising five switch modules 404A, 404B, 404C, 404D, 404E, (referenced herein collectively or individually as 404) each switch module 404 connecting to edge nodes 102 through WDM links 412 and to each other switch module 404 through internal links 420, each link 412, 420 carrying at least one wavelength channel. Each of the five switch modules 404A, 404B, 404C, 404D, 404E includes a corresponding space switch 408A, 408B, 408C, 408D, 408E (referenced herein collectively or individually as 408) for switching signals from input ports to output ports (not illustrated). The input ports are divided into inlet ports that receive signals from edge nodes and inbound ports that receive signals from other switch modules 404. The output ports are divided into outlet ports that send signals to edge nodes and outbound ports that send signals to other switch modules 404. Inlet ports and outlet ports receive signals from, and transmit signals to, edge nodes and are, therefore, called outer ports. The inbound ports and outbound ports of a switch module 404 receive signals from, and transmit signals to other switch modules and are, therefore, called inner ports. An internal link 420 connecting a first switch module to a second switch module connects an outbound port of the first switch module to an inbound port of the second switch module, and the internal link 420 is therefore an outbound link with respect to the first switch module and an inbound link with respect to the second switch module. All internal links 420 are unidirectional. Thus, link 420BE carries signals from switch module 404B to switch module 404E and another link 420EB (not illustrated) carries signals from switch module 404E to switch module 404B. A link 420 may connect several outbound ports of a first switch module 420 to an equal number of inbound ports of a second switch module.

Each internal link 420 may carry a single wavelength channel or a band of wavelength channels.

Each edge node 102 has an uplink 412 to a switch module 404 and a downlink 418 from the same, or another, switch module 404 of the modular core node 400. An uplink 412 or a downlink 418 may carry several wavelength channels. A given edge node 102 may have more than one uplink to the modular core node 400 and more than one downlink from the modular core node 400. For a given edge node 102, the number of uplinks need not equal the number of down links and an edge node may choose to send control signals to the modular core node along only one channel in an uplink 412 and receive control signals through one channel of a downlink 418.

If each uplink 412 and each downlink 418 carry multiple wavelength channels, the modular core node 400 may either switch time-slotted multi-channel signals in a single space switch 408, or use a number of space switches 408 per switch module 404. A multi-channel signal occupies a band of wavelength channels as described in the aforementioned U.S. patent application Ser. No. 09/960,959. The present disclosure is based on the generic case of switching time-slotted multi-channel signals. The use of a multi-channel signal of course covers the case of a single-channel signal.

A modular switch operating in a TDM mode receives signals from electronic source nodes and a time-slot switching stage takes place at each source node. If each switch module in the modular switch is an optical switch, the time slots selected for a given connection request may be switched to other time slots at both the source node and sink node. Time-alignment of source nodes and a corresponding optical switch module is enabled by a time-locking process to be described hereinafter.

This mesh structure is used to increase the number of inlet and outlet ports of the modular core node. The modular core node 400 can be used in either a channel-switching mode, as described with reference to FIG. 1, or in a TDM switching mode as described with reference to FIG. 2. The benefits of using a high-capacity core node were described above with reference to FIG. 3.

Preferably, each switch module 404 would have a direct internal link 420 to each other switch module 404. The traffic volume from a switch module 404A to a switch module 404B may be consistently higher than the capacity of the direct link from switch module 404-A to switch module 404-B. It is preferable in this case to reserve the internal link from switch module 404-A to switch module 404-B for the exclusive use of the 404A-404B traffic. The 404A-404B traffic may still overflow to other routes through intermediate switch modules, where each connection requires traversing two internal links 420.

Hereinafter, the term "calendar" is used to refer to an array having as many cells as the number of time slots in a TDM frame, where each cell (each entry) contains an indication of the state, busy or free, of a corresponding time slot in the TDM frame. A cell (entry) in a calendar is said to be busy or occupied if the corresponding time slot is reserved. A calendar may be associated with an input port, an output port, an uplink, a downlink, or an internal link in a modular switch. The process of "comparing" two or more calendars is a process of examining corresponding cells (entries) in the compared calendars to determine if the examined cells (entries) are all free (in a vacant state), thus yielding a matching time slot in a corresponding TDM frame.

The absolute occupancy of a calendar is an integer number of the number of busy (occupied) cells and the absolute vacancy is the number of free (vacant) cells in the calendar. The relative occupancy of a calendar is the absolute occupancy divided by the number of cells in the calendar and the relative vacancy is the absolute vacancy divided by the number of cells in the calendar. For brevity, the terms occupancy and vacancy are used to indicate, respectively, the relative occupancy and relative vacancy. The term "occupancy state" of a calendar refers to the number of occupied cells and the distribution of the occupied cells within the calendar.

Path Allocation

Consider a modular core node of an arbitrary structure and having N input ports, M output ports, N>1 and M≥1. The input ports transfer signals to output ports through internal links within the modular core node. A route set is designated for transferring signals from each input port to each output port. The number of routes in a route set can vary from a single route to several routes, and a route may traverse a single link or a concatenation of at least two links. The modular core node has a controller that includes a route-set memory storing N×M route sets, one route set for each pair of input and output ports. The routes in the N×M route sets naturally intersect, and a particular link may be included in a large number of routes. The routes in a route set may be classified according to some merit, such as the number of links per route and, naturally, a route having the least number of links is preferred and would be selected if it has a sufficient vacancy to accommodate a connection request. Each connection request includes a connection identifier and specifies an input port, an output port, and a requested number q of time slots in a slotted time frame.

In both channel switching and TDM switching, it is desirable to equalize the vacancy of the internal links in order to increase the throughput, given the varying spatial distribution of the traffic load. Vacancy equalization can be realized by selective routing, where two or more routes of comparable merit (for example, the same number of links per route) would be designated as candidate routes and when two or more routes have a sufficient vacancy to accommodate a connection request, the route with the highest vacancy would be selected. Selective routing can, however be computationally intensive. A simple, yet effective, technique is to select the routes according to merit classification and, within each merit classification, select a route of sufficient vacancy in a cyclic manner.

If the modular core node is operated in a time-division-multiplexing (TDM) mode, it is desirable that the occupancy of each route be packed in the TDM frame so that routes have a high probability of being occupied during time slots near a selected reference time slot (usually the start of a TDM frame) and have a high probability of being vacant during time slots away from the selected reference time slot. This temporal packing discipline is in contrast with the spatial load-equalization discipline described above which attempts to equalize the vacancy across the internal links.

The route-selection discipline used for the modular high-capacity optical core node according to the present invention is based on:

(1) favoring routes having a least number of links;
(2) spatial load-equalization of routes of the same number of links; and
(3) temporal packing.

Because each input port in the modular switch may transmit to many output ports, hence each output port may receive from many input ports, vacant time slots at a given pair of input port and output port may not be aligned. Mismatch occurs where vacant time slots in a multi-link route are not aligned. Temporal packing significantly reduces the mismatch probability. However, this is realized at the expense of an extensive search effort because the search must start from the same reference time slots for all connection requests and the required number of vacant time slots are more likely to be found near the end of the TDM frame period. If the number, S, of time slots per TDM frame is 1,024, and with a high mean occupancy of 0.90, for example, a large proportion of connection requests would require scanning more than 800 time slots across all links of a candidate route. This can significantly reduce the scalability of the modular core node.

To circumvent this difficulty, the scheduling method in accordance with the present invention divides the TDM frame into a number of sub-frames, and uses a cascade of schedulers each of which operating on a specific sub-frame. The sub-frame need not be of equal duration. Using H cascaded schedulers, where $H \geq 1$, a connection request requiring $q>0$ time slots is offered to a head scheduler which attempts to find matching time slots within the first sub-frame and relays the connection request, with the pending number of time slots, to a second scheduler if the pending number is greater than zero. The second scheduler attempts to find matching time slots along routes in the route set and relays the connection request to a third scheduler if the pending number of time slots is not zero, and so on. This permits simultaneous operation of all schedulers where the schedulers would be processing different connection requests.

The method requires that each scheduler be provided with a result memory to hold allocated time slots within a respective sub-frame, and a cascade memory to hold the parameters of a connection request to be relayed to a subsequent scheduler, if any. A result selector cyclically visits the result buffers of the H schedulers to read the records of allocated time slots.

The routes in each route set may be classified into a number, $\Gamma$, of categories, $\Gamma \geq 1$, where the $\gamma^{th}$ category, $1 \leq \gamma \leq \Gamma$ includes routes requiring a corresponding order of time-slot matching process. A route set being defined for each pair of input and output ports. For each connection request specifying an inlet port and an outlet port that belong to different switch modules, the entire cascaded scheduling process described above would be applied to one category to determine allocable time slots and if the allocable number of time slots is less than the required number, the cascaded scheduling process may be applied to another category.

The categories are preferably sorted according to a descending order of preference, the first category being the most preferred.

If the pending number of time slots is not zero after all sub-frames of the TDM frame have been considered, i.e., after the last of the H schedulers has completed its time-slot matching process, the cascade-scheduling process is repeated, starting with the head scheduler and using routes classified to be in the next preferred category, if any.

If the core node is a single-stage space switch, there is only one route for each pair of input and output ports, and $\Gamma$, therefore, equals 1. If the core node is a multi-stage (modular) core node employing space-switching modules, then the value of $\Gamma$ depends on the maximum number of switch modules to be traversed by a route in the route set.

In an unfolded three-stage modular core node, each route traverses three switch modules. There is only one category, i.e., $\Gamma=1$, requiring a third-order time-slot matching process. A route set for each pair of input-output ports may include numerous routes, each requiring a third-order matching process.

In a folded three-stage modular core node (not illustrated), each switch module in a first array of switch modules serves both as a first stage and a third stage switch module, and each switch module in a second array of switch modules serves as a second-stage switch module. A path between an input port and an output port belonging to the same switch module in the first array of switch modules requires a first-order time-slot matching process. A path between an input port in a first switch module in the first arrays of switch modules and an output port in a second switch module in the first array of switch modules requires a third-order time-slot matching process. Thus, there are only two route categories ($\Gamma=2$) within some route sets including only a single path each within a space switch and each of the remaining route sets including numerous candidate paths through the switch modules of the second array of switch modules, and allocating each candidate path requires a third-order time-slot matching process.

In a double-folded three stage modular core node, where each switch module in a single array of switch modules serves as a first-stage switch module, a second-stage switch module, and a third-stage switch module, there are also at most two categories ($\Gamma=2$) in a route set. The switch modules in a double-folded three-stage switch modular core node are fully-meshed as illustrated in FIG. 4. A route set for pairs of input-output ports belonging to the same switch module includes only one internal path, through a switching module, and requires a first-order matching process. A route set for pairs of input-output ports belonging to different switch modules includes a direct path connecting the two switch modules and (N−2) paths each traversing one of the switch modules, other than the switch modules supporting the input and output ports specified in the connection request, and requiring a third-order matching process to allocate.

State arrays and matrices, to be described below, are needed to facilitate the path scheduling process. Upon completion of the cascade scheduling process for all route categories in a route set, one of two policies may be adopted if the allocable number of time slots is still less than required. In one policy, the corresponding connection request would be rejected, the allocable time slots would be released and the corresponding entries in the state arrays and matrices used for path allocation would be reset to a free state. In an alternate and preferred policy, the allocable time slots would be communicated to the switch-module controller which may accumulate the allocable time slots according to input-output port pairs and grant admission to any of waiting connection requests. For example, if a connection request, forwarded by a given switch module to a master controller of a modular core node, specifies 18 time slots and only 14 can be allocated, the switch module may grant four of the allocable time slots to a new connection request, retain the remainder, and send the master controller a connection request specifying only eight time slots. This process can be carried on continually, where a connection request may be delayed until an accumulated number of allocable time slots for a pair of input and output ports is sufficient. Naturally, when a connection is terminated, the switch-module controller instructs the master controller to release the corresponding resources, i.e., to reset corresponding entries in the state arrays and state matrices to a free state. The state arrays and matrices will be described below.

Figure 5:
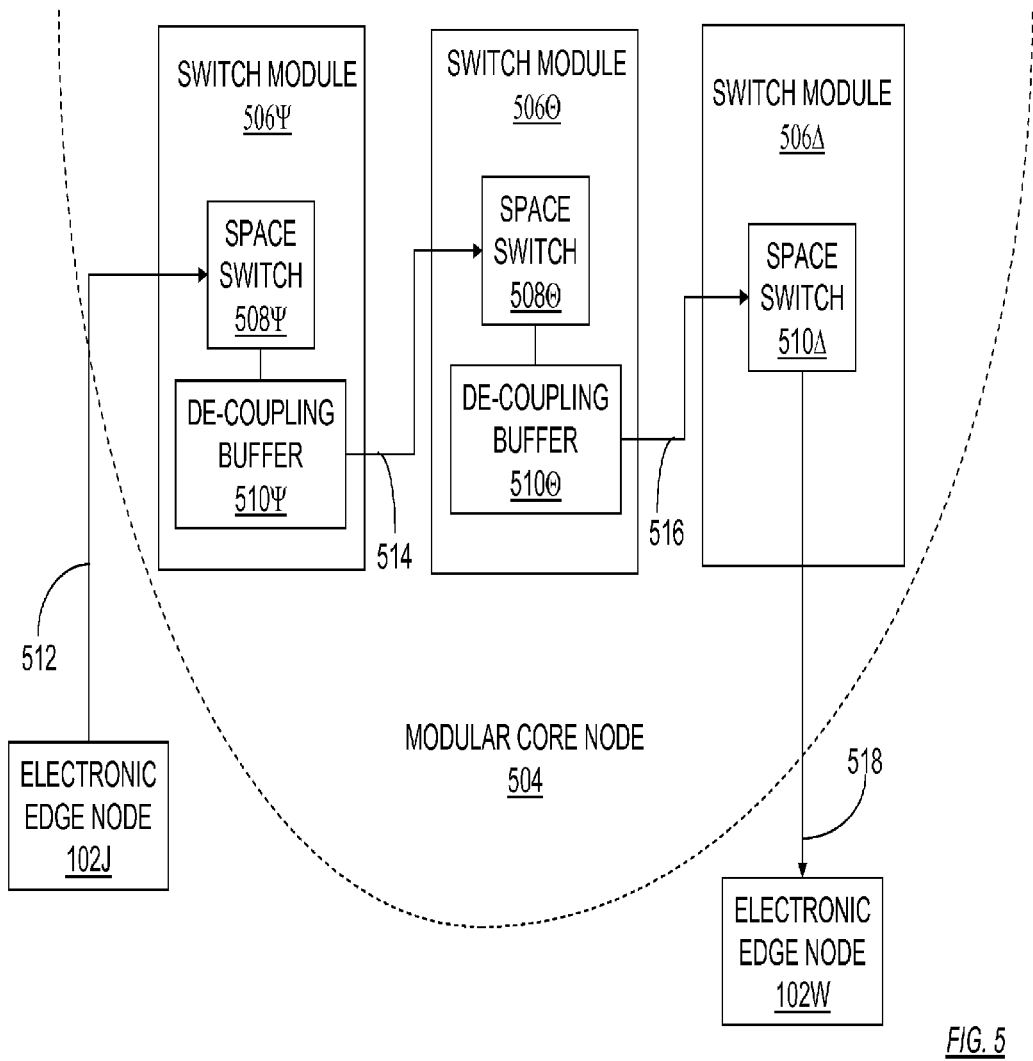
FIG. 5 illustrates a prior-art cascade of space switches connecting two electronic edge nodes wherein de-coupling buffers interpose the space switches.

FIG. 5 illustrates a path in an exemplary prior art core node 504. The path traverses a first switch module 506Ψ, a second switch module 506Θ and a third switch module 506Δ (referred to collectively or individually as 506). The optical core node 504 is used to connect a first electronic edge node 102J to a second electronic edge node 102W. Each switch module 506 includes a respective space switch 508Ψ, 508Θ, 508Δ. Each switch module 506 along the illustrated path from the first electronic edge node 102J to the second electronic edge node 102W performs a switching stage. To eliminate the need for strict time-coordination, an inter-module de-coupling buffer 510Ψ is provided to interpose the space switch 508Ψ at the first switch module 506Ψ and the space switch 508Θ at the second switch module 506Θ. Additionally, an inter-module de-coupling buffer 510Θ is provided to interpose the space switch 508Θ at the second switch module 506Θ and the space switch 508Δ at the third switch module 506Δ. These inter-module de-coupling buffers 510Ψ, 510Θ facilitate path allocation. The availability of inter-module de-coupling buffers 510Ψ, 510Θ interposing the bufferless switch modules 506 greatly simplifies the scheduling process because a path traversing all the space switches can be established as a concatenation of individual paths that are independent from each other. This reduces the path allocation process to a number of simpler independent matching processes. Providing such decoupling buffers is not currently feasible for optical switch modules without resorting to optical-to-electrical conversion and electrical-to-optical conversion.

Figure 6:
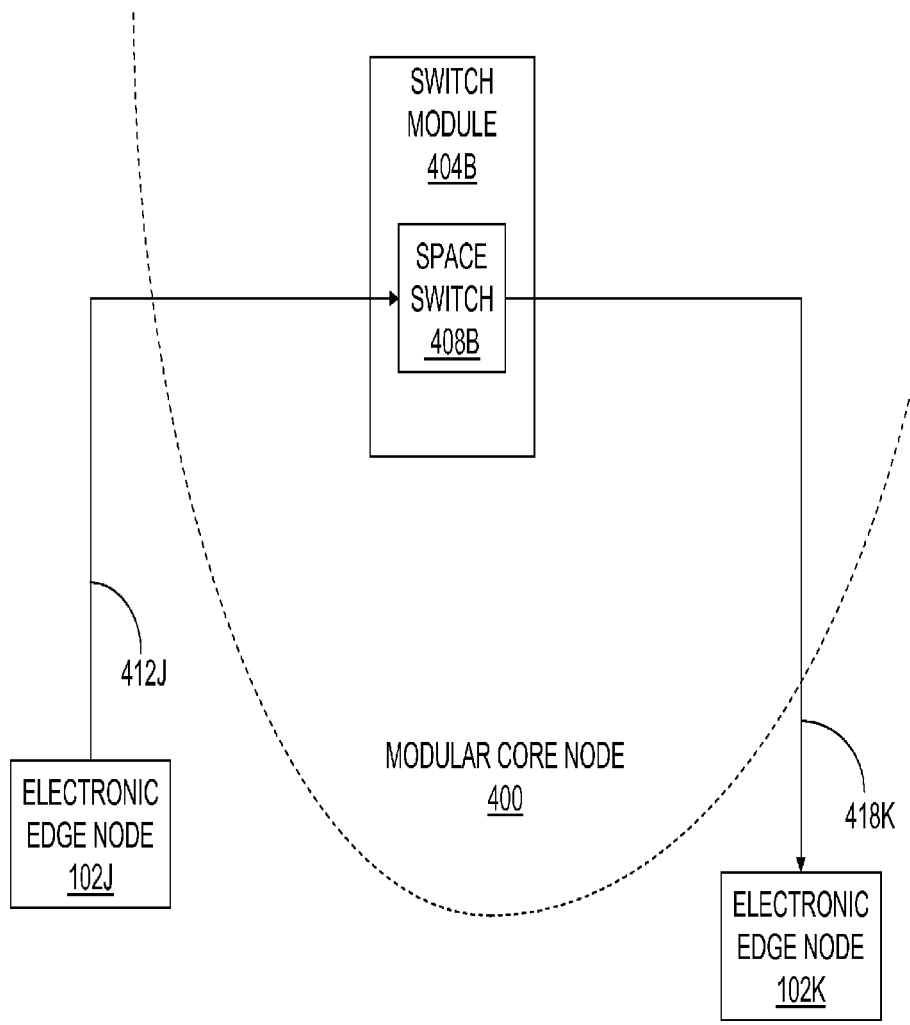
FIG. 6 illustrates a single space switch in the modular core node of FIG. 4 connecting two electronic edge nodes.

FIG. 6 illustrates a first path in the modular core node 400 of FIG. 4. The path traverses a single switch module 404B. The modular core node 400 is used to connect a first electronic edge node 102J to a second electronic edge node 102K, both connecting to the same switch module 404B. Recall, from FIG. 4, that the switch module 404B includes a space switch 408B. Strict time-coordination with edge node 102J is required due to the absence of a receiving buffer at the switch module 404B. For TDM switching, a simple first-order time-slot matching process, well known in the art, can be used for allocating time slots requested for a connection. Note that a time-slot interchange takes place at both edge nodes 102J and 102K.

Figure 7:
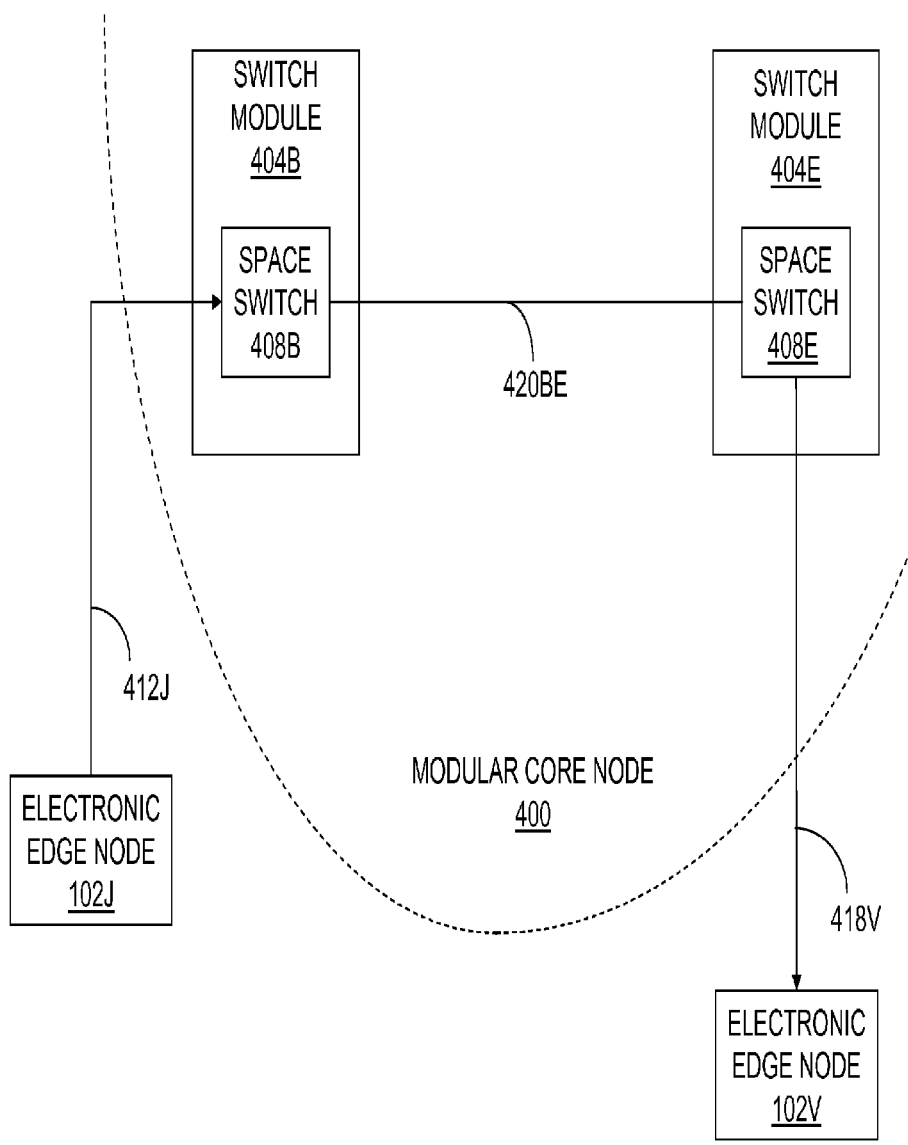
FIG. 7 illustrates a cascade of two space switches in the modular core node of FIG. 4 connecting two electronic edge nodes without a decoupling buffer.

FIG. 7 illustrates a second path, in the modular core node 400, that traverses a first switch module 404B and a second switch module 404E. The modular core node 400 is used to connect a first electronic edge node 102J to a second electronic edge node 102V. Each switch module 404 includes a space switch 408. Each switch module 404 along the illustrated path from the first electronic edge node 102J to the second electronic edge node 102V performs a switching stage. Strict time-coordination with edge node 102J is required, as in the connection of FIG. 6, and, in addition, a compound second-order time-slot matching process (described in detail hereinafter), in accordance with an embodiment of the invention, is required for TDM switching. A time-slot interchange takes place at both edge nodes 102J and 102V.

Figure 8:
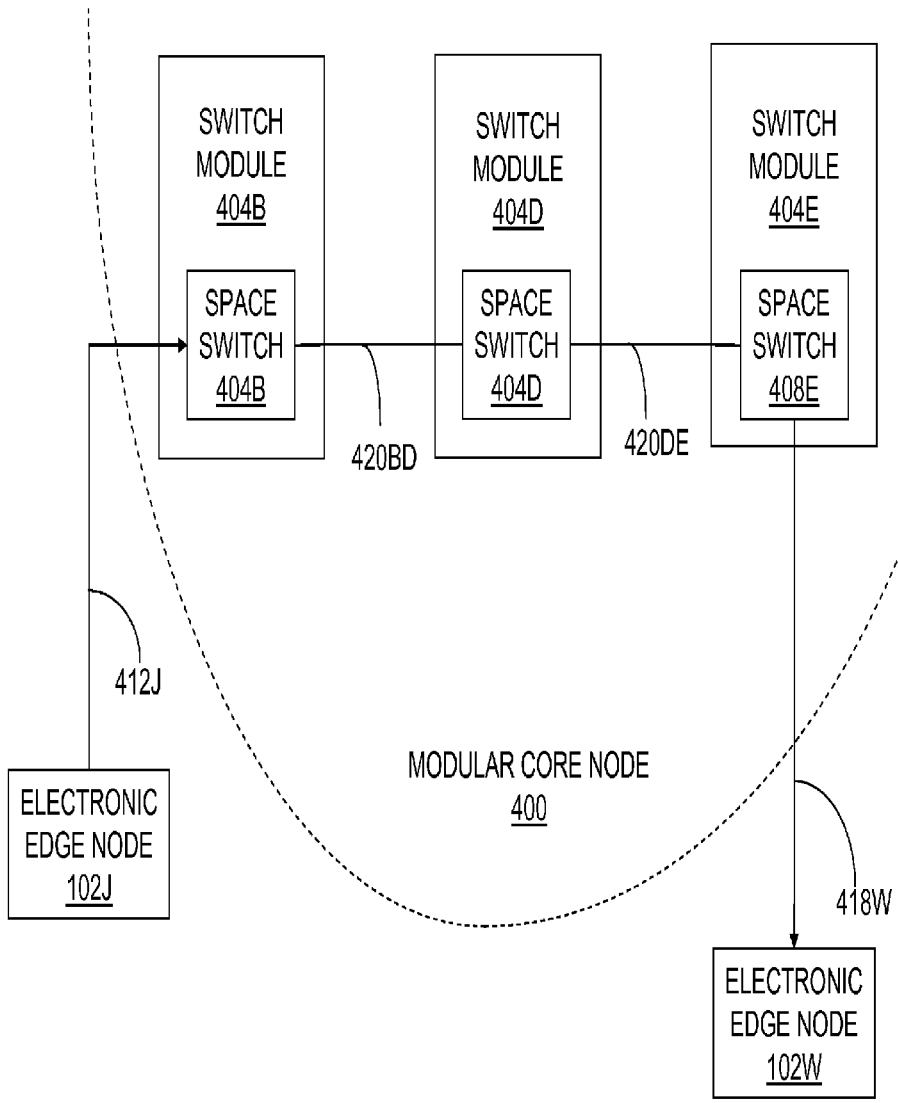
FIG. 8 illustrates a cascade of three space switches in the modular core node of FIG. 4 connecting two electronic edge nodes without decoupling buffers.

FIG. 8 illustrates a third path in the modular core node 400. The path traverses the first switch module 404B, a third switch module 404D and the second switch module 404E. The modular core node 400 is used to connect a first electronic edge node 102J to a second electronic edge node 102W. Each switch module 404 includes a space switch 408. Each switch module 404 along the illustrated path from the first electronic edge node 102J to the second electronic edge node 102W performs a switching stage. Strict time-coordination with edge node 102J is required, as in the connection of FIG. 6, and, in addition, a compound third-order time-slot matching process (described in detail hereinafter), in accordance with an embodiment of the invention, is required for TDM switching. A time-slot interchange takes place at both edge nodes 102J and 102W.

As discussed above in conjunction with FIG. 5, a path traversing two or more space switches operated in a TDM mode with interposing data buffers can be determined by independently establishing a path within each space switch according to a first-order matching process, and the matching time-slot selected in the space switches need not be contemporaneous because time-slot interchange at the interface of two successive space switches is feasible.

Thus, in a network of electronic switches, a compound matching process of an order G, where G is greater than unity, can be decomposed into G stages, each stage requiring a first-order matching process. This requires data buffering between successive stages as illustrated in FIG. 5. In a network of optical switches, data buffering is not feasible and a compound matching process of order G requires concurrent time slot availability in (G+1) ports as will be detailed below.

In a first-order matching process, a connection requesting a single time slot or multiple time slots requires each time slot to be free in two corresponding ports. With a compound, second-order matching process, a connection having multiple time slots requires each time slot in the connection to be free in three corresponding ports and with a compound, third-order matching process, a connection having multiple time slots requires that each time slot be free in four corresponding ports.

First-order matching has been used extensively in circuit switching and the performance of first order matching is well known even with multiple-time-slot connections. It is also known that, with a sufficiently large ratio of the number of time slots per calendar to the largest number of time slots per connection, good performance of first order matching can be realized at a high throughput (see for example, Beshai et al., "Multichannel Services: Performance of Switching Networks", Proceedings of the International Teletraffic Congress, ITC 12, June 1988).

The probability of successful matching decreases rapidly as the number of path segments in a path increases, i.e., as the order of the time-slot-matching process increases.

Connection-Request Blocking

In a first-order matching process of two calendars, it is well known that zero blocking of connection requests, each specifying a single time slot, is realized when the absolute occupancy of each calendar, i.e., the number of occupied cells in a calendar, is limited to a value C so that the number, S, of time slots per calendar equals or exceeds (2×C−1).

In a matching process of J calendars, zero blocking of connection requests each specifying at most ν time slots, ν≥1, can be realized if the absolute occupancy of each of the J calendars is limited so that $$S \geq \left(\sum_{j=1}^{J} \chi_j\right) - (J-1)\nu \tag{1}$$

where $\chi_j$ is the maximum absolute occupancy of calendar j. With $\chi_1 = \chi_2 = \ldots = \chi_J = C$, the maximum absolute occupancy, C, is limited so that $$C \leq (S + (J-1)\nu)/J, J \geq 2,$$

For example with S=1,024, J=4, and ν=8, C is limited to 262, i.e., the maximum relative occupancy of each calendar would be about 0.26. This low utilization is of course unacceptable and means for realizing high utilization, exceeding 0.85 for example, at a negligible connection-request blocking are needed.

Time-Slot Matching Process

In a bufferless single-stage TDM switch having a number inlet ports and outlet ports, a calendar is associated with each inlet port and each outlet port. Each calendar has the same number, S, of time slots. When the controller of the TDM switch receives a connection request, the request specifying an inlet port, an outlet port, and a number of time slots per calendar, the controller of the TDM switch compares the calendar associated with the specified inlet port with the calendar associated with the specified outlet port to find matching time slots that are vacant concurrently in the two calendars. If the number of calendars is large, over 16 for example, the occupancy states of the calendars become weakly correlated and can be treated as uncorrelated.

The computation of the distribution of the number of matching time slots in any two calendars is quite tedious, even when connection requests arrive at random and under the assumption that the occupancy states of all calendars are uncorrelated, as described in the paper titled "Multichannel Services: Performance of Switching Networks", referenced hereinbefore. The computation requires determining the matching time slots for each pair of occupancy states of the two calendars.

When one calendar has m free time slots and the other has n free time slots, and with random distribution of the free time slots within each calendar, the probability of not finding any matching time slot, which is the probability of blocking a connection request specifying only one time slot, is determined as;

$$\beta = \prod_{k=0}^{m}\left(1 - \frac{n}{S-k}\right) = \prod_{k=0}^{n}\left(1 - \frac{m}{S-k}\right) \quad (2)$$

The overall mean blocking is then determined by taking into account the statistical distribution of both m and n.

Expression (2) can be approximated as:

$$\beta \approx \left(1 - \frac{2n}{2S-m+1}\right)^m \quad (3)$$

where m>0, n>0, m≤n, and m+n≤(S+1).

In a bufferless multi-stage TDM switch, a connection may traverse two or more single-stage switch modules, thus requiring compound time-slot matching. A calendar is associated with each inlet port, and each outlet port of each switch module, and a calendar is associated with each inner link connecting two switch modules. Each calendar has the same number, S, of time slots. When the switch controller receives a connection request, the request specifying an inlet port, an outlet port, and a number of time slots per calendar, the switch controller compares the calendar associated with the specified inlet port with the calendar associated with the specified outlet port and the calendars associated with any traversed inner links to find matching time slots.

The number of calendars to be examined for any connection request is denoted J, and the order of a compound-matching process is (J−1). In the modular switch of FIG. 4, the maximum value of J is 4, and a connection may require a first-order, second-order, or third-order matching process.

The computation of the probability of blocking when more than two calendars must be compared (J>2) becomes unwieldy. The probability of not finding any matching time slots in J≥2 calendars for a given occupancy state $\{\xi_1, \ldots, \xi_J\}$, where $\xi_j$ is the number of free time slots in calendar j, 1≤j≤J, can be approximated as:

$$\beta \approx \left(1 - \prod_{j=2}^{J}\left(\frac{2\xi_j}{2S-\xi_j+1}\right)\right)^{\xi_1} \quad (4)$$

where $0<\xi_j\leq(S-(\xi_1-1)/2)$, 1≤j≤J. Without loss of generality, $\xi_1$ is selected to be the least of $\{\xi_1, \ldots, \xi_J\}$.

The above blocking probability applies only for a given occupancy state and for the case where each connection request specifies only one time slot. To determine the mean blocking, the distribution of $\xi_1, \xi_2, \ldots, \xi_J$, must be taken into account. However, despite its limitation, this approximation is useful for illustrating the effect of multi-stage compound matching on connection-request blocking, and, for this purpose, it would be sufficient to consider the occupancy state where each of the J calendars to be compared for a connection request has the same number, n, of vacant time slots, i.e., $\xi_1=\xi_2=\ldots=\xi_J=n$. The probability of not finding any matching time slots in the J calendars is then;

$$\beta \approx \left(1 - \left(\frac{2n}{2S-n+1}\right)^{J-1}\right)^n \quad (5)$$

Consider, for example, the case where S=128, with a mean vacancy of 0.20, i.e., about 25 expected vacant time slots within each calendar. Using n=25 in expression (5) to determine the blocking probability, under the conditions described above, yields:

β=0.00232 for J=2 (first-order matching),
β=0.30452 for J=3 (second-order matching), and
β=0.7776 for J=4 (third-order matching).
Using S=1,024, and n=200 (i.e., the same relative occupancy) yields values of β of $6.7\times10^{-22}$, $6.87\times10^{-5}$, and 0.13065 for J=2, 3, and 4, respectively.

The blocking for connection requests specifying multiple time slots per calendar period would be higher than the above values. For each inlet port in the modular switch of FIG. 4, there are (N−2) paths that may use third-order matching, but only a single path that uses second-order or first-order matching. The blocking shown for J=4, is based on examining only one of the (N−2) path and would be reduced when more than one path are attempted.

With time-slot packing, the blocking values under the same load condition, would be much lower than the above values. Computing the blocking with time-slot packing is very difficult to determine analytically.

A parameter of interest, specially for connection requests specifying multiple time slots per calendar, is the mean value of the number of matching time slots. With $\theta_j$ denoting the relative vacancy in a calendar j, 1≤j≤J, the mean value, μ, of the number of matching time slots in J calendars can be approximated by:

$$\mu = S \times \prod_{j=1}^{J} \theta_j \quad (6)$$

Selecting a reference occupancy state where each of the J calendars has the same number τ of vacant time slots, resulting in a relative vacancy Θ=τ/S, with $\theta_1=\theta_2=\ldots=\theta_J=\Theta$, then the mean number of matching time slots is determined as $\mu=S\times\Theta^J$.

The probability of zero matching and the mean number of matching time slots under a given occupancy state, indicated by the number of free time slots per calendar, are tabulated below for selected values of S and J.

| Time Slots Per Calendar | Free Time Slots | Probability Of Zero Matching | | |
|---|---|---|---|---|
| S | τ | J = 2 | J = 3 | J = 4 |
| 128 | 25 | 0.0023 | 0.3045 | 0.7776 |
| 256 | 50 | $5.2 \times 10^{-6}$ | 0.09176 | 0.6027 |
| 512 | 100 | $2.6 \times 10^{-11}$ | 0.00833 | 0.3621 |
| 1,024 | 200 | $6.7 \times 10^{-22}$ | $6.87 \times 10^{-5}$ | 0.1307 |

| Time Slots Per Calendar | Free Time Slots | Mean Number of Matching Time Slots | | |
|---|---|---|---|---|
| S | τ | J = 2 | J = 3 | J = 4 |
| 128 | 25 | 4.88 | 0.95 | 0.19 |
| 256 | 50 | 9.77 | 1.91 | 0.37 |
| 512 | 100 | 19.53 | 3.81 | 0.74 |
| 1,024 | 200 | 39.06 | 7.63 | 1.49 |

Given the low mean number of matching time slots with J=4, even with a significantly large number of time slots per calendar (S=1,024, for example), it is imperative that connection requests specifying a relatively large number of time slots per calendar period use more than one path through an intermediate switch module when a direct link requiring second-order time-slot matching does not have a sufficient number of matching time slots. There are (N−2) such paths and the required time slots for a connection may be distributed among all the (N−2) paths. It is noted that the delay within the modular core node is negligible and, hence a connection using a combination of direct and indirect paths will still have aligned time slots at the outlet port.

Balancing the Loads Among Calendars

The calendars are divided into three groups associated with inlet ports, outlet ports, and inner links. An inner link connects an outbound port of a switch module to an inbound port of another switch module. Two measures can be taken to maximize the utilization of the ports. The first measure is to equalize the occupancies of the calendars associated with the inner links. This can be realized by selecting a candidate route from routes of the same category within each route set in a cyclic manner for consecutive time-slot-allocation attempts. The second measure is to pack the time slot allocation by examining the time slots starting with a reference time slot.

Figures 9A, 9B, 9C:
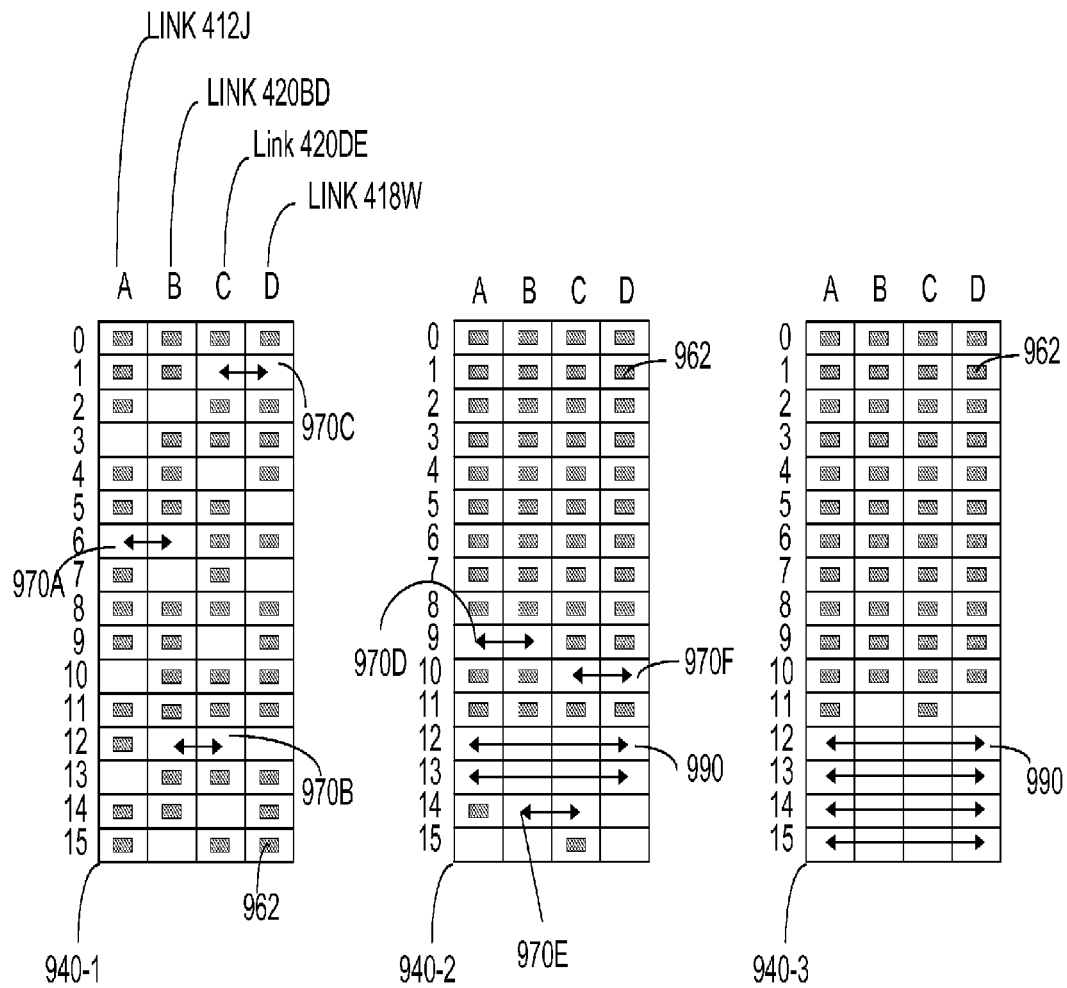
FIG. 9A illustrates a prior-art multiple first-order time-slot matching process.
FIG. 9B illustrates a compound second-order or third-order time-slot matching process under moderate time-slot packing according to an embodiment of the present invention.
FIG. 9C illustrates a compound second-order or third-order time-slot matching process under ideal time-slot packing according to an embodiment of the present invention.

FIG. 9, which comprises FIGS. 9A, 9B, and 9C, illustrates four time-slotted frames, also called calendars, each having a number, S, of cells, each cell corresponding to a time slot of a predefined duration and containing a 1-bit indication of the cell's free or busy state. Each calendar corresponds to a link, or a port, in a multi-stage (modular) core node. Calendars for four links labeled A, B, C, and D are illustrated. An allocable time slot in a path traversing two links is a time slot that is vacant in both links. An allocable time slot in a path traversing three links is a time slot that is vacant in the three links. Likewise, an allocable time slot in a path traversing four links is a time slot that is vacant in the four links as described earlier. The process of finding an allocable time slot across two links is called a first-order matching process. The process of finding an allocable time slot across three links is called a second-order matching process. The process of finding an allocable time slot across four links is called a third-order matching process. In a switching network, or in a modular core node, a first-order matching process corresponds to a path traversing one space switch, a second-order matching process corresponds to a path traversing two space switches, and a third-order matching process corresponds to a path traversing three space switches. A path traversing any number of space switches may require several time slots per calendar period. As would be appreciated by a person skilled in the art, the probability of finding an allocable time slot decreases significantly as the number of traversed space switches increases.

FIG. 9A illustrates a case where the search for an allocable time slots is conducted at random, or according to a simple cyclic discipline where the search for an allocable time slot starts from the same time slot at which the search for a preceding allocable time slot ends. This search approach is suitable for finding a path in the core node 504 of FIG. 5, because the provided buffers 510 enable decomposing a second-order matching process into two first-order matching processes, and a third-order matching process into three first-order matching processes.

In the bufferless modular core node 400, a path across the node may traverse a single switch module 404, two switch modules 404, or three switch modules 404. The preferable path from an inlet port of a first switch module 404 to an outlet port of a second switch module 404 traverses a single inter-modular link 420, if such a link is provided, and requires a second-order matching process. In addition, there are at most (N−2) paths each traversing an intermediate switch module 404 and requiring a third-order matching process to allocate a time slot.

FIG. 9C illustrates the occupancy of the four calendars, A, B, C, and, D if an ideal time-slot packing process can be found, so that all the busy time slots in each calendar occupy consecutive cells. This leads to an alignment of vacant time slots that greatly increases the probability of finding allocable time slots. This occupancy pattern is not, however, realizable without a significant processing effort. A realizable occupancy pattern is visualized in FIG. 9B, where the busy time slots in each calendar tend to create a busy zone close to one end of the calendar and the vacant time slots tend to create a vacancy zone near the other end, with a small proportion of busy time slots infiltrating the vacancy zone and vice versa.

The occupancy pattern of FIG. 9B can be realized by using a simple packing process, where the search for an allocable time slot always starts from a reference time slot (reference cell) in each calendar. This packing technique has been used extensively for first-order matching processes and its extension to compound matching processes (higher-order matching processes) should be obvious to a person skilled in the art. However, finding efficient means for real-time compound matching implementation, where a path allocation process must consume less than a microsecond, for example, of processing time, is a difficult task that requires new methods of real-time path scheduling. The method of the present invention will be described below with reference to FIGS. 22 to 25.

Two measures can be taken to enable multi-stage connection in the absence of inter-stage buffers. The first is to use inner expansion and the second is to use spatial load balancing and temporal load packing. Both are described below.

Inner-Expansion in a Space Switch

The modular core node 400 includes a plurality of switch modules 404, each of which is non-blocking in the sense that any free input port (inlet port or inbound port) can connect to any free output port (outlet port or outbound port). An input port or an output port is said to be free if its vacancy equals or exceeds a switched data unit. Likewise, an outer link or an inner link is said to be free if its vacancy at least equals a switched data unit. A switched data unit is a channel, in a channel-switching switch module, or a time-slot in a TDM frame, in a TDM-switching switch module. In both channel switching and TDM switching, a request for a connection from a free inlet port in a switch module 404A to a free outlet port of another switch module 404B can be blocked even if switch module 404A has several free inner links emanating from its outbound ports and switch module 404B has several free terminating free links to its inbound ports. Blocking can happen due to spatial mismatch of the emanating and terminating free links. In TDM switching, blocking can also occur due to temporal mismatch of vacant time slots in spatially matched links.

The mismatch probability naturally decreases with the decrease of traffic occupancy. In channel switching, if the number of vacant inner channels of the switch modules is large, the probability of spatial channel mismatch decreases. Likewise, in TDM switching, if the number of vacant time-slots in the inner channels is large, the probability of temporal mismatch decreases. Thus, in order to reduce the mismatch probability in space switches, a common practice in the art is to provide more inner channels than outer channels. This automatically forces a reduced inner occupancy. The penalty, however, is a reduced utilization of the space switch. In a first-order matching process, it is well known that mismatch can be entirely eliminated if the number of inner channels is slightly lower than double the number of outer channels (the well-known Closs rule). In a higher-order matching process, the ratio of inner channels to outer channels required to eliminate blocking would be higher than two, as described earlier. If rather than eliminating mismatch blocking the objective is to reduce the mismatch probability to an acceptable value, 0.001 for example, then a lesser expansion ratio (inner channels to outer channels capacity ratio) can be applied. However, in second-order and higher-order matching processes, the expansion ratio can still be extravagant. To circumvent this difficulty, the traffic packing process described above for a first-order matching process can be extended to higher-order matching processes. A process is provided herein for global time-slot occupancy packing across all possible internal paths between each inlet port and each outlet port for which a connection is sought.

Occupancy Packing

FIG. 9C illustrates the concept of occupancy packing. A scheduler matrix 940 comprises four calendars, each calendar corresponding to a link. Each column corresponds to a link in a three-stage path. Each Row in a scheduler matrix 940 corresponds to a time slot in a TDM frame. A three-stage path is a path that traverses three switching modules. An entry 962 in the scheduler matrix 940 corresponds to a time slot in a link. A shaded rectangle in an entry indicates that the corresponding time slot is already reserved for a connection.

The columns in the scheduler matrix 940 are labeled "A", "B", "C", and "D". Referring to FIG. 8, column "A" corresponds to an ingress link (uplink) 412J from a source edge node to an inlet port of a first switching module. Column "B" corresponds to an inner link 420BD from an outbound port of said first switching module to an inbound port of a second switching module. Column "C" corresponds to an inner link 420DE from an outbound port of said second switching module to an inbound port of a third switching module. Column "D" corresponds to an egress link (down link) 418W from an outlet port to a sink edge node. Each of the schedule matrices illustrated has the same number of occupied entries 962. The occupied entries in the scheduler matrix 940-1 are randomly scattered while the occupied entries in the scheduler matrix 940-3 are perfectly packed so that the free entries are perfectly aligned. The scheduler matrix 940-2 illustrates realistic packing of the occupied entries while the scheduler matrix 940-3 illustrates ideal packing.

Consider a three stage connection from an outer link ingress link (Column "A") to an egress link (Column "D"), the connection traversing three switching modules. With inter-module buffers 510, as depicted in FIG. 5, the connection can be established using three first-order matching processes. In the scheduler matrix 940-1, the connection can be established in three parts. The jump from row 6 to row 12 in column "B" and the jump from row 12 to row 1 in column "C" are enabled by the use of the inter-module buffers 510Ψ and 510Θ, respectively. Without inter-module buffers 510, the three-stage connection must be established during the same time slot. With the random assignment of entries, as depicted in the scheduler matrix 940-1, a third-order packing process has a low probability of success, i.e., the probability of finding four free entries in the same row, is low, even at relatively low link utilization. In the realization of the scheduler matrix 940-1, each column has at least four free entries, however, each row has at least one occupied entry and a three-stage connection request would be rejected.

With a realistic occupancy packing discipline, as depicted in the scheduler matrix 940-2, a third order matching process has a high probability of success. The distribution of occupied entries in the scheduler matrix 940-2 yields two opportunities of third-order matching as indicated in time slots 990. The ideal packing of the scheduler matrix 940-3, which may be approached with extensive computational effort, offers four third-order matching opportunities.

Occupancy packing results in a moderate throughput increase in a multi-stage node having inter-module buffers but a much more pronounced throughput increase in a bufferless multi-stage node. Occupancy packing is crucial for compound second-order and third-order matching processes.

Time-Locking Definition

A first node X is said to be time locked to a second node Y along a given path if, at any instant of time, the reading of a time counter at node X equals the sum of a reading of an identical time counter at node Y and the propagation time, normalized to the time-counter period, along the given path from node X to node Y. The time counters at nodes X and Y have the same period. There may be several paths connecting the first node to the second node, and the paths may be defined by individual wavelengths in a fiber link or several fiber links. Due to the difference in propagation delays of different paths connecting the same node pair, time locking must be realized for the different paths individually. Due to dispersion, time locking of individual wavelength channels within the same WDM link may be required. When a first node is time locked to a second node along a given path, the given path is said to be time-locked. It is noted that the methods and apparatus of the present invention apply to both channel switching and TDM switching.

The time-locking process in a time-shared network is described with the help of a two-node model. To realize time locking of a first node to a second node in a network, the first node is provided with a first controller that includes a first time counter and the second node is provided with a slave controller and a master controller that includes a master time counter. The second node has several input ports and output ports and the master controller is connected to one of the input ports and one of the output ports. The first controller sends an upstream control burst to an input port of said second node during a designated time interval, said upstream control burst including a reading of the first time counter. The upstream control burst is sent in-band, together with payload data destined to output ports of the second nodes. The slave controller must be able to direct said upstream control burst to said master controller during a pre-scheduled time interval. The master controller has a device for acquiring and parsing upstream control bursts. The master controller compares the reading of the first time counter with a reading of the master time counter. An agreement of the two readings, or a negligible discrepancy, ascertains time alignment. The second controller reports reading discrepancies to the first controller which resets its time counter accordingly.

Time locking an edge node to a core node means that a time counter at the edge node is time locked to a time counter at the core node. A time counter can be a conventional clock-driven counter. A time counter at an edge node is preferably an up-counter and a time-counter at a core node is preferably a down counter, the two counters have the same cycle duration. Using a 28-bit time counter, for example, driven by a clock of a clock period of 20 nanoseconds, the duration of the time-counter cycle would be about 5.37 seconds ($2^{28}$ times 20 nanoseconds). The reading of an up-counter at an edge node increases, with each clock trigger, from 0 to 268,435,455 (0 to $2^{28}-1$) and the reading of a time counter at a core node decreases, with each clock trigger, from 268,435,455 to 0. If the edge-node controller sends a timing message, when its reading is K1, to a core node, and the reading of the down-counter of the core node at the instant of receiving the timing message is K2, then the edge-node controller must reset its up-counter to zero when the up-counter reading reaches [K2+K1] modulo $2^B$, B being the wordlength of the time counter (B=28 in the above example). If K2+K1=$2^B-1$, the edge node is already time locked to the core node.

In review, within a network, all time counters have the same period and time-coordination can be realized through an exchange of time-counter readings between each source node and its adjacent core node, i.e., the core node to which the source node is connected. In TDM switching, the time-counter readings are carried in-band, alongside payload data destined to sink nodes, and sending each time-counter reading must be timed to arrive at a corresponding core node during a designated time interval. The difficulty of securing time-coordination arises from two interdependent requirements. The first is that communicating a time-counter reading from a controller of a source node to a controller of a core node requires that the source node be time-locked to the core node, and the second is that time-locking a source node to a core node necessitates that a controller of the core node be able to receive a time-counter reading from the source-node controller during a designated interval of time. To initiate or restore time locking, a secondary mechanism is therefore required for directing upstream signals received from source nodes toward said master controller of the core node.

Time-Locking Restoration

In the absence of time alignment, a time-locking recovery procedure must be initiated. The master controller sends a downstream control burst to said first controller to indicate the absence of time alignment. In response, the first node sends a succession of upstream control bursts each including a reading of said first time counter. Meanwhile, the slave controller directs a sample of said upstream control bursts to said master controller during a pre-scheduled time interval and the master controller acquires at least one upstream control burst from said sample and sends an identifier of an acquired upstream burst and a corresponding reading of the master time counter to the first controller. The identifier may be a serial number of the upstream burst, or a reading of the first time counter included in the upstream control burst. The first controller then resets the first time counter accordingly to restore the required time locking. During this recovery phase, the slave controller, which controls the connectivity of input ports to output ports of the second node, disconnects all paths to all output ports from the input port of the second node that connects to the first node.

Figure 10:
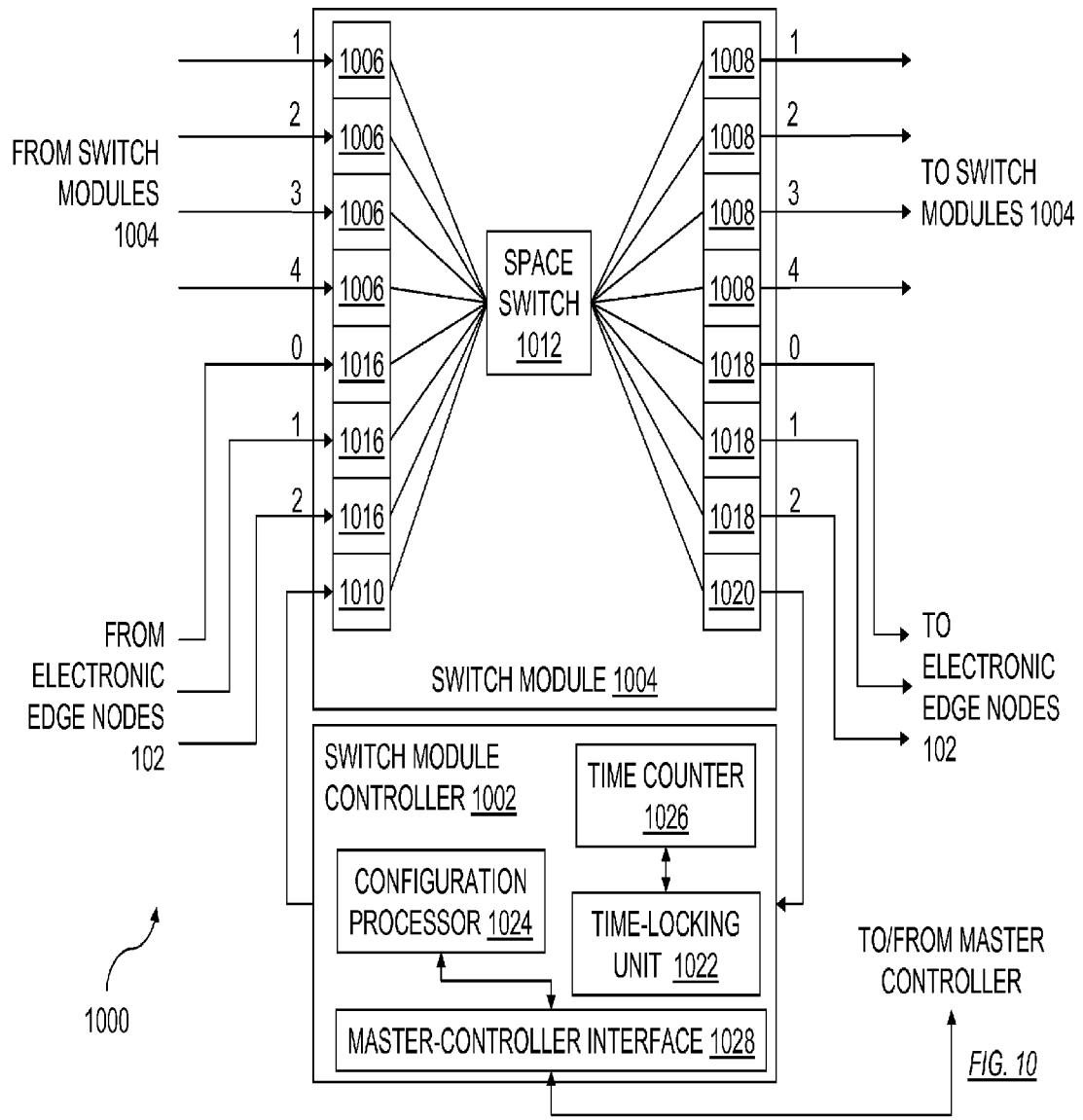
FIG. 10 illustrates a switch module and switch-module controller for use as a building block in a high-capacity optical node according to an embodiment of the present invention.

FIG. 10 illustrates a switch module 1004, to be used hereinafter as a building block in a modular high-capacity optical switch.

Input ports of the switch module 1004 are divided into a set of inlet ports 1016 that connect to source nodes (as part of the electronic edge nodes 102) and a set of inbound ports 1006 that connect to other switch modules 1004. Each of the inlet ports 1016 supports an upstream channel-band carrying data from source nodes. A controller input port 1010 is used to receive communications from a switch-module controller 1002. Output ports of the switch module 1004 are divided into a set of outlet ports 1018 that connect to sink nodes (as part of the electronic edge nodes 102) and a set of outbound ports 1008 that connect to other switch modules 1004. Each of the outlet ports 1018 supports a downstream channel-band carrying data to a sink node. A controller output port 1020 is used to send communications to the switch-module controller 1002.

The input ports 1006, 1016, 1010 direct received optical signals to a space switch 1012 for switching toward output ports 1008, 1018, 1020 under configuration control of the switch-module controller 1002. Specifically, configuration control of the space switch 1012 is provided in the switch-module controller 1002 by a configuration processor 1024. The switch-module controller 1002 also includes a time-locking unit 1022 and an associated clock-driven time counter 1026. The configuration processor 1024 and the time-locking unit 1022 communicate with the switch module 1004. In the preferred TDM switching scheme, each uplink, from an electronic edge node 102, arriving at an inlet port 1016 has a predetermined, time-switched path to the switch-module controller 1002. Similarly, the switch-module controller 1002 has a predetermined, time-switched path to the electronic edge node 102. These time-switched paths allow for the exchange of timing information between the time-locking unit 1022 and the electronic edge node 102 in a time-locking procedure that is detailed in Applicant's U.S. patent application Ser. No. 10/054,509, filed on Nov. 13, 2001 and titled "Time-Coordination in a Burst-Switching Network".

The configuration processor 1024 communicates configuration commands to the space switch 1012 to direct optical signals from particular input ports 1006, 1016, 1010 to particular output ports 1008, 1018, 1020. The configuration processor 1024 also exchanges control data with a master controller, to be described with reference to FIG. 11, via a master controller interface 1028.

A switch module receives connection requests from edge nodes, interprets each request, generates a time-slot-allocation request associated with each connection request, and communicates the time-slot-allocation request to the master controller of the modular core node. An edge node may send payload signals (payload data) to a modular core node through one or more upstream channels (an upstream channel is a channel in an uplink) and receive payload signals through one or more downstream channels (a downstream channel is a channel in a downlink). An edge node also exchanges control signals with the modular core node. The control signals may be carried in-band, alongside the payload signals, and a single time slot in an upstream channel and a downstream channel would suffice to carry the control data. For each connection request, the edge node may select the inlet port and outlet port of the modular core node. Alternatively, the master controller of the modular core node may make this decision.

Figure 11:
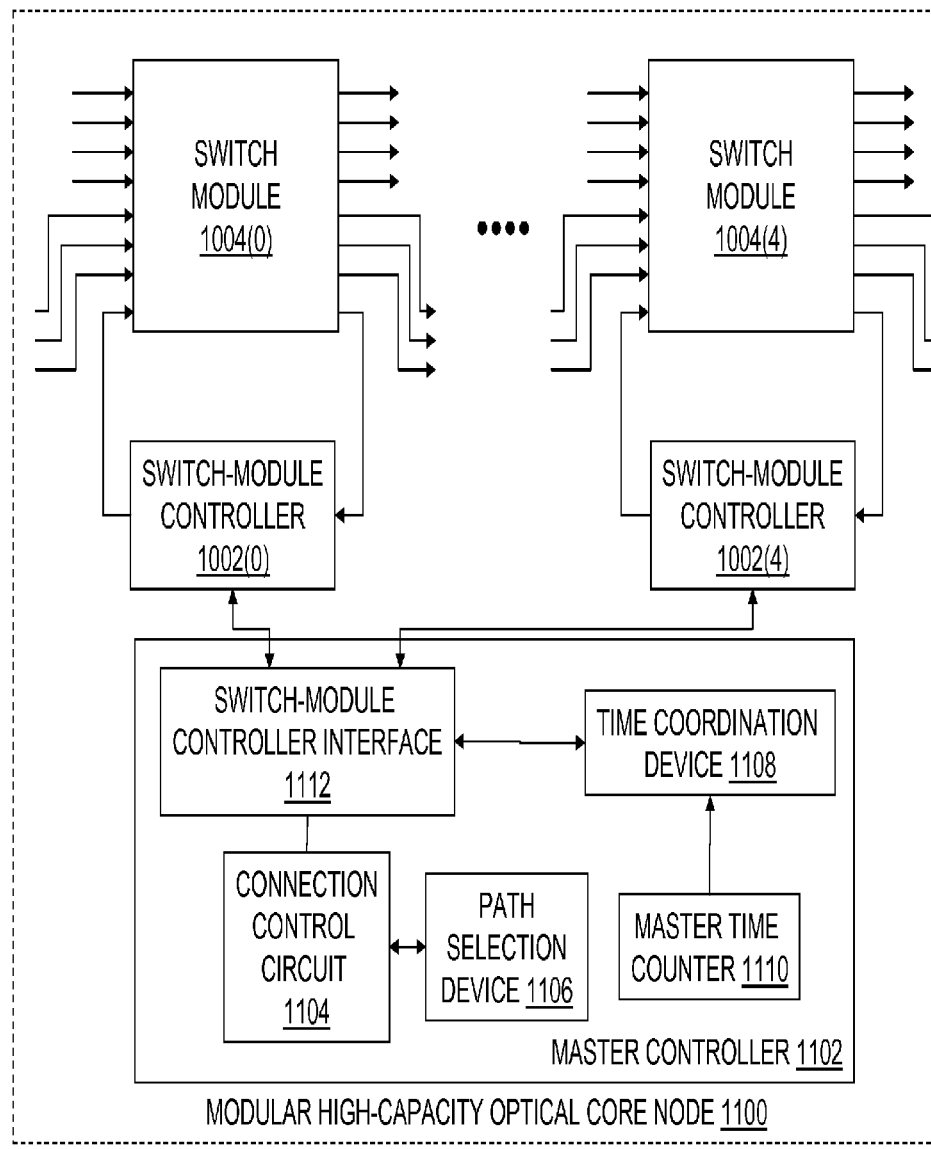
FIG. 11 illustrates a modular, high-capacity, optical core node including a master controller that operates in coordination with the building blocks of FIG. 10 according to an embodiment of the present invention.

A first switch module 1004(0) and a fifth switch module 1004(4) are illustrated in FIG. 11 as but two of a set of switch modules 1004 in a modular, high-capacity, optical core node 1100. As illustrated in FIG. 10, each of the switch modules 1004 has an associated switch-module controller 1002(0), . . . , 1002(4) that connect to a master controller 1102. The master controller 1102 includes a time coordination device 1108, to facilitate time-coordination of the master controller 1102 with the individual switch-module controllers 1002, and a connection-control circuit 1104 in communication with a path selection device 1106. The time coordination device 1108 and the connection-control circuit 1104 communicate with the switch-module controllers 1002 via a switch-module controller interface 1112. The time coordination device 1108 includes a time counter as described in application Ser. No. 10/054,509, referenced hereinbefore.

As described above, each switch-module controller 1002 has a time-locking unit 1022 in communication with a time counter 1026. In order to enable a time-sharing switching scheme, using, for example, TDM switching, the time counters 1026 of all switch-module controllers 1002 must be aligned. To this end, the time coordination device 1108 communicates with the switch-module controllers 1002 to initialize the respective time counters 1026 (to zero). The time counters 1026 are subsequently entrained by the time coordination device 1108 to follow a master time counter 1110. The time coordination device 1108 is relatively simple, as internal propagation delays on links from the master controller 1102 to the switch-module controllers 1002 are either negligible, or are equalized (say, by using equal-lengths fiber links). Alternatively, the N switch-module controllers may have a common time-counter. Each edge node exchanges time-locking measurements with the controller of the switch-module to which the edge node connects. Thus, the time-slotted signals received at all inlet ports of the modular switch are aligned.

The connection-control circuit 1104 receives time-slot-allocation requests from the switch-module controllers 1002. These time-slot-allocation requests identify an inlet port 1016 and an outlet port 1018 and a requested number of time-slots per scheduling period. The time-slot-allocation requests are then, under control of the connection-control circuit 1104, sent to the path selection device 1106. Ports 1010 and 1020 are provided with Electrical-to-Optical (E-O) converters and Optical-To-Electrical (O-E) converters, which are not illustrated but understood to be present.

Figure 12:
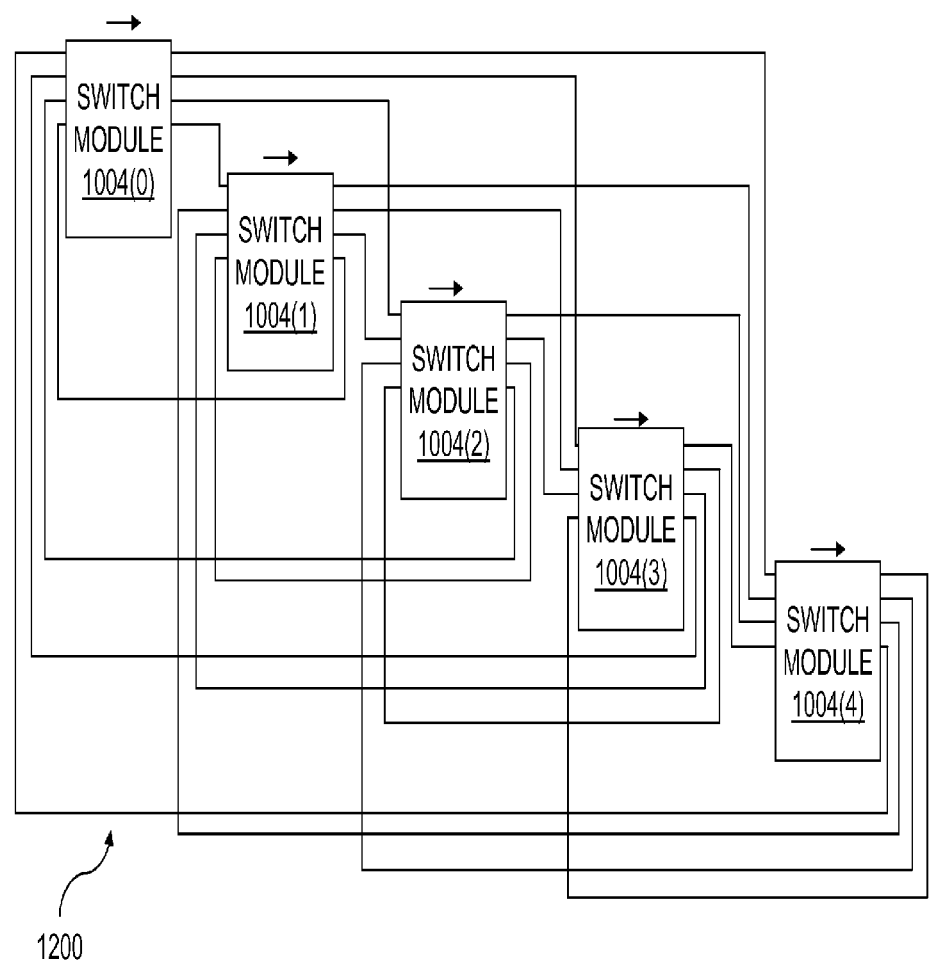
FIG. 12 illustrates a mesh structure with inter-modular connections between switch modules in a modular, high-capacity, optical core node according to an embodiment of the present invention.

A preferable structure for the modular, high-capacity, optical switch 1100 of FIG. 11 is a mesh structure 1200 as illustrated in FIG. 12. The mesh structure 1200 is simplified to illustrate only the inner connections in the modular, high-capacity, optical switch 1100. In the mesh structure 1200 of FIG. 12, each of the first switch module 1004(0), a second switch module 1004(1), a third switch module 1004(2), a fourth switch module 1004(3) and the fifth switch module 1004(4) directly connects to each other switch module 1004 by at least one inter-modular link, where the inter-modular link may comprise a wavelength channel.

To maintain order in the mesh structure 1200 of FIG. 12, each inter-modular link from switch module 1004 to switch module 1004 may be assigned a label. As will be expanded upon hereinafter, the link labels relate directly to labels of the inner ports 1006, 1008 to which the (inner) links connect.

In overview, it is very well known in the art that high-capacity switching nodes can be synthesized from lower capacity switches using multi-stage structures. For reasons that follow, construction of a multi-stage, high-capacity, optical switch differs from construction of known, classical designs in that different, and more efficient, path selection methods are required. One reason for the difference is the absence of buffering in optical switches. Another reason is that there may be a requirement to time-lock the inlet ports 1016 (or a controller of the inlet ports 1016) of each of the switch modules to respective edge nodes (which have buffers). Concurrently, there may be a requirement to time-lock to some other external nodes. Additionally, there will likely be a need to frequently reconfigure the paths through the various switch modules 1004 of the modular, high-capacity, optical switch 1100 to adapt to traffic changes.

Realizing the modular, high-capacity, optical core node 1100 requires recognition of multiple challenges. For reasons stated above relating to topological reach, the modular, high-capacity, optical core node 1100 is preferably operated in a TDM (time-division multiplex) mode. To switch a data stream incoming from an electronic edge node 102 to another electronic edge node 102, it will often be necessary to find a path from a switch module 1004 that receives the data stream to a switch module 1004 that transmits the data stream to a destination.

A path segment between the first switch module 1004(0) and the second switch module 1004(1) may be created by aligning a vacant time slot of a calendar associated with an outbound port 1008 of the first switch module 1004(0) with a vacant time slot of a calendar associated with an inbound port 1006 of the second switch module 1004(1). Multiple path segments may be required to pass a data stream from the switch module 1004 that received the data stream to the switch module 1004 that can transmit the data stream to its destination. Where this vacant-time-slot matching is to be performed across two or more space switches, there is typically a requirement for an intermediate buffer (see FIG. 5). However, if this vacant-time-slot matching is to be performed solely in the optical domain, such use of an intermediate buffer is not available, as such buffers do not currently exist.

In addition to cascading the path finding process in the master controller 1102, each switch-module controller 1002 should be time-locked with the source nodes (which are part of the electronic edge nodes 102) from which the corresponding switch module 1004 receives data streams at the inlet ports 1016. Such time-locking is necessary to prevent contention at the bufferless core nodes. Time-locking may not be required in a channel-switched network if it may be acceptable that channels be kept idle during the execution of path-setup procedures.

As described earlier, a first node is said to be time-locked to a second node along a given path, if, at any instant of time, the reading of a time-counter at the first node equals the sum of a reading of an identical time-counter at the second node and the propagation time, normalized to the time-counter period, along the given path from the first node to the second node, where the time counters at the first and second nodes have the same period. There may be several paths connecting the first node to the second node, and the paths may be defined by individual wavelengths in a fiber link or several fiber links. Due to the difference in propagation delays of different paths connecting the same node pair, time-locking may be realized for the different paths individually. Due to dispersion, time-locking of individual paths may be required even for paths defined by wavelengths in the same fiber link. When a first node is time-locked to a second node along a given path segment, the given path segment is said to be time-locked.

Time-sharing switching schemes, such as TDM switching or burst switching, require that each data block, whether the data block refers to data carried during a time-slot in a TDM frame or refers to a data burst in a burst switching scheme, arrive at an optical switch precisely at a predefined instant of time. This can be realized by time-locking the path segment from the electronic edge node 102 to the modular, high-capacity, optical core node 1100. Restated, in order to be able to switch data blocks arriving at the modular, high-capacity, optical core node 1100 from different electronic edge nodes 102 having different propagation delays to the modular, high-capacity, optical core nodes 1100, without contention or the need for data storage at the core node, the electronic edge nodes 102 must be time-locked to each switch module 1004 to which the electronic edge nodes 102 send data streams.

Each source node (as part of an electronic edge node 102) has at least one time counter and, as stated hereinbefore, the time-locking unit 1022 of the switch-module controller 1002 has a time counter 1026. All time counters have the same period and time-coordination can be realized through an exchange of time-counter readings between each source node and its adjacent switch-module controller 1002, i.e., the switch-module controller 1002 associated with the switch module 1004 to which the source node is directly connected. The time-counter readings are transmitted in-band, alongside payload data destined to sink nodes, and each time-counter reading transmitted must be timed to arrive at an adjacent switch-module controller 1002 during a designated time interval.

Difficulty in securing time-coordination may arise from two interdependent requirements. The first requirement is that transmitting a time-counter reading from a controller of a source node to a switch-module controller 1002 requires that the source node controller be time-locked to the switch-module controller 1002. The second requirement is that time-locking a source node to a switch-module controller 1002 necessitates that the switch-module controller 1002 be available to receive a time-counter reading from the source node controller during a designated interval of time. To initiate or restore time-locking, a secondary mechanism is therefore required for directing upstream signals received from source nodes toward the switch-module controller 1002. Two such mechanisms are described in the applicant's U.S. patent application Ser. No. 09/960,959, the specification of which is incorporated herein by reference.

Where time-locking is the activity performed by the time-locking unit 1022 of the switch-module controller 1002 of FIG. 10, the other illustrated element of the switch-module controller 1002 is the configuration processor 1024. As stated above, the configuration processor 1024 acts, through communication with the space switch 1012, to direct an optical signal from a particular input port 1006, 1016 to a particular output port 1008, 1018 and exchanges control data with the master controller 1102. The configuration of the space switch 1012 is determined by the configuration processor 1024, based on configuration instructions received from the master controller 1102 as the result of a path finding process.

The internal path finding process is of paramount importance in determining the throughput of the modular, high-capacity, optical core node 1100. The master controller 1102 receives time-slot-allocation requests from switch-module controllers 1002 for processing. The path selection process begins by looking for direct paths between switch modules 1004, which require a second-order time-slot matching process described hereinafter, before looking for indirect paths, which require a third-order time-slot matching process, also described hereinafter. Advantageously, this order of processing may avoid unnecessary diversion of a connection to an indirect path. Note that those intra-switch-module paths that do not require traversing inter-modular links can be processed after the results of the second-order and third-order matching processes are performed. The reason for giving these intra-switch-module paths the lowest priority is that these intra-switch-module paths already enjoy a high probability of successful time-matching because each requires only a first-order matching process, also described hereinafter.

First-order time-slot matching is a process used widely in TDM circuit switches. In this widely used process, the signal received at each input port 1006, 1016 is pre-organized into a time-slotted calendar and the signal at each output port is likewise organized. The calendar at all input ports and output ports are independent but have the same duration (scheduling period) and the same number of equal-duration time slots. A time-slot-allocation request specifying a given inlet port 1016 and a given outlet port 1018 may require $K \geq 1$ time slots per calendar period. To satisfy this time-slot-allocation request, the switch-module controller 1002, more specifically, the configuration processor 1024, must find K time slots wherein both the given inlet port 1016 and the given outlet port 1018 are vacant, i.e., not used or planned to be in use. A time slot that is vacant in both the given inlet port 1016 and the given outlet port 1018 may be called a "matching time slot". There are several input ports and several output ports and the process of selecting a time slot to satisfy a time-slot-allocation request is generally unaware of future time-slot-allocation requests. Thus, it is possible that a matching time slot cannot be found even when the respective input port and output port have numerous vacant time slots. Such a scenario occurs when none of the vacant time slots in the given inlet port 1016 is aligned with a vacant time slot in the given outlet port 1018.

As described earlier, it is well known in the art that the probability of successful time-slot matching is greatly enhanced by adopting a primitive occupancy packing strategy, wherein the search for a matching time slot from any input port to any output port starts from a designated reference time slot and proceeds by examining the time slots of the calendar in a prescribed order until the required number of matching time slots is found or the time-slot-allocation request is rejected. Other occupancy packing techniques can be marginally more effective than the primitive occupancy packing techniques described above. Such techniques generally require more intensive processing, however, and the resulting improvement may not justify the required increased computational effort.

If a path has to traverse more than one bufferless switch module 1004, the probability of successful time-slot matching decreases sharply as the occupancy of the ports traversed by the path approaches unity. The occupancy of a port is the number of allocated time slots divided by the number of time slots in the calendar. To find K matching time slots across $\Lambda$ switch modules 1004, $\Lambda \geq 1$, at least K time slots must be vacant in $(\Lambda+1)$ ports defining a path. In a first order matching process, at least K time slots must be vacant in the respective inlet port 1016 and outlet port 1018. In a second-order matching process, where a path must traverse two switch modules 1004, at least K time slots must be vacant in a respective inlet port 1016 in the first switch module 1004(0), an outbound port 1008 of the first switch module 1004(0) (or, equivalently, a corresponding inbound port 1006 of the second switch module 1004) and a respective outlet port 1018 of the second switch module 1004.

In a mesh interconnection of $N>2$ switch modules 1004, there is a direct path and $(N-2)$ indirect paths between any two space switches, each indirect path comprising two links.

A bufferless two-link path requires a third-order matching process, traversing three switch modules 1004, where a time slot in the path must be vacant at a respective inlet port 1016, the two inter-modular links defining the path, and a respective outlet port 1018. There are (N−2) such paths between any inlet port 1016 of a switch module 1004 and any outlet port of another switch module 1004. The probability of successful matching increases as N increases. The process of examining (N−2) candidate paths in four ports, each path requiring finding K vacant time slots in a calendar of S time slots, can be intensive. For example, with N=32, S=256, the search space includes 7,680 time slots ((N−2)×S). It is one of the objects of the present invention to develop a technique for overcoming this difficulty.

The preferable internal connectivity of the modular, high-capacity, optical switch 1100 is the mesh structure 1200 as illustrated in FIG. 12. In order to realize a network of high topological reach, high-capacity optical core nodes employing time sharing are needed. Time-sharing switching may be realized by TDM switching or burst switching. Time sharing of a fiber link or an individual channel in a fiber link requires fast-switching and fast-switching optical switches are typically realizable in relatively small sizes (small number of ports per switch). The mesh structure 1200 illustrated in FIG. 12 enables the construction of the modular, high-capacity, optical core node 1100 and, despite the resulting control complexity, the modular structure 1200 has advantages related to reliability. For instance, failure of a single switch module 1004 results in only a partial outage within the modular, high-capacity, optical core node 1100.

In the mesh structure of FIG. 12, each switch module 1004 directly connects to each other switch module by at least one wavelength channel. An internal connection within a switch module 1004 requires only one single time-slot matching process (a first-order matching process). A direct connection between two switch modules requires a second-order time-slot matching process as described above. Due to typical traffic imbalance, some traffic streams may have to traverse an intermediate switch module 1004, in which case a third-order time-slot matching process is required. It is well known that inner capacity expansion, where the combined capacity of the inner ports 1006, 1008 exceeds the combined capacity of the inlet and outlet ports 1016, 1018 in each module, can reduce, or even eliminate, the incidence of vacancy mismatch of a set of time slots that may form a path. Excessive inner-capacity expansion is, however, costly and techniques of reducing the mismatch probabilities by appropriate path-allocations are highly desirable. Successful path selection can be realized with a very high probability, without resorting to extensive and costly internal-capacity expansion, by appropriate path selection techniques with a slight inner expansion, as will be described below.

Figure 13:
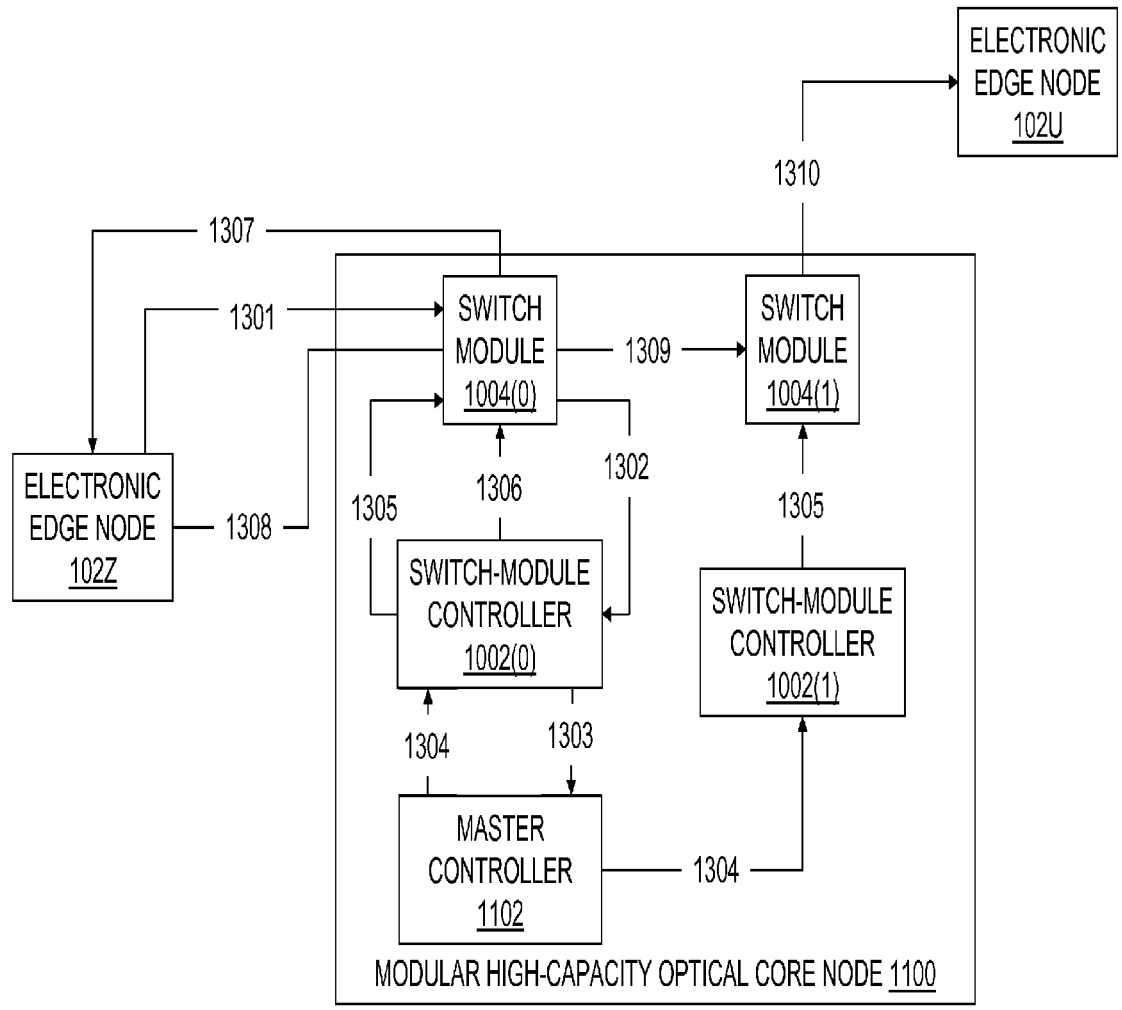
FIG. 13 illustrates a signal flow diagram according to an embodiment of the present invention.

To review the signal flow related to the modular, high-capacity, optical core node 1100, consider FIG. 13. A first electronic edge node 102Z communicates a connection request to the first switch module 1004(0) (step 1301). The connection request may, for instance, specify a second electronic edge node 102U and a number of requested time-slots. The connection request is switched from an inlet port of the first switch module 1004(0) to the first switch-module controller 1002(0) (step 1302). The first switch-module controller 1002(0) translates the connection request into a time-slot-allocation request that is subsequently sent to the master controller 1102 (step 1303). Eventually, the master controller 1102 sends configuration instructions (a connection schedule) to the first switch-module controller 1002(0) that takes into account the time-slot-allocation request (step 1304).

Where the time-slot-allocation request was, at least partially, satisfied by a second order connection to the second switch module 1004(1), a connection schedule that takes into account the time-slot-allocation request is also sent to the second switch-module controller 1002(1) (step 1304). In step 1305 both switch-module controllers 1002, send updated configuration information to respective switch modules 1004. The first switch-module controller 1002(0) also sends an updated connection schedule to the switch module 1004(0) (step 1306) that is destined for the first electronic edge node 102Z (step 1307).

When the time comes to use the connection schedule, the first electronic edge node 102Z sends data blocks to the first switch module 1004(0) (step 1308) arranged in time slots according to the connection schedule. Those time slots allocated to the connection specified in the connection request are then switched at the first switch module 1004(0) and sent to the second switch module 1004(1) (step 1309). The second switch module 1004(1) has been appropriately configured (in step 1305) to direct those time slots allocated to the connection to the second electronic edge node 102U.

Figure 14:
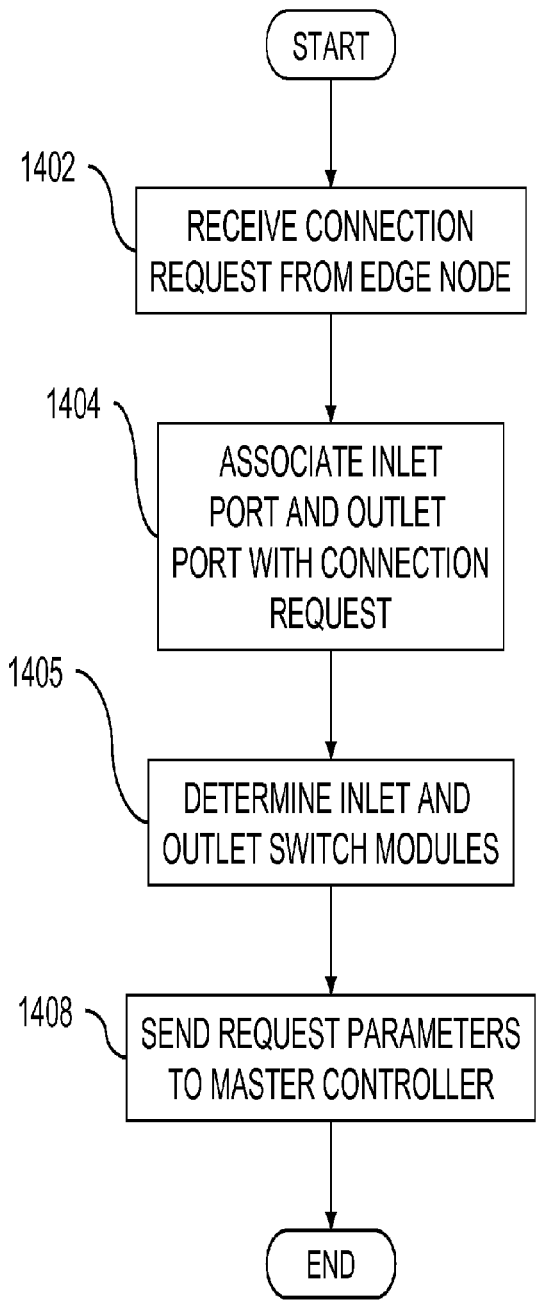
FIG. 14 illustrates steps of formulating a connection request at a controller of a switch module according to an embodiment of the present invention.

When a switch module receives a connection request (step 1402 in FIG. 14), it associates an inlet port and an outlet port with the connection request (step 1404) and identifies the switch modules to which the inlet and outlet ports belong (step 1405). Each switch-module controller maintains connectivity data of the entire modular switch (modular core node) and can, therefore, identify the switch modules associated with the inlet and outlet ports. It is noted that an inlet port specified in a connection request may not belong to the switch-module that receives the connection request. The switch-module controller also determines a number of time slots to be allocated and communicates a time-slot-allocation request to the master controller (step 1408).

When a switch-module controller receives a connection request indicating an inlet port J and an outlet port K, and a number of time slots, it may formulate a time-slot-allocation requests that specifies a lesser number of time slots. This could happen if the switch-module controller receives a request to release a current connection between the same inlet port J and outlet port K, or reduce the number of time slots allocated to a current connection. A lesser number of time slots may also be specified in the time-slot-allocation request under certain overload conditions, in accordance with a service-level agreement.

Figure 15:
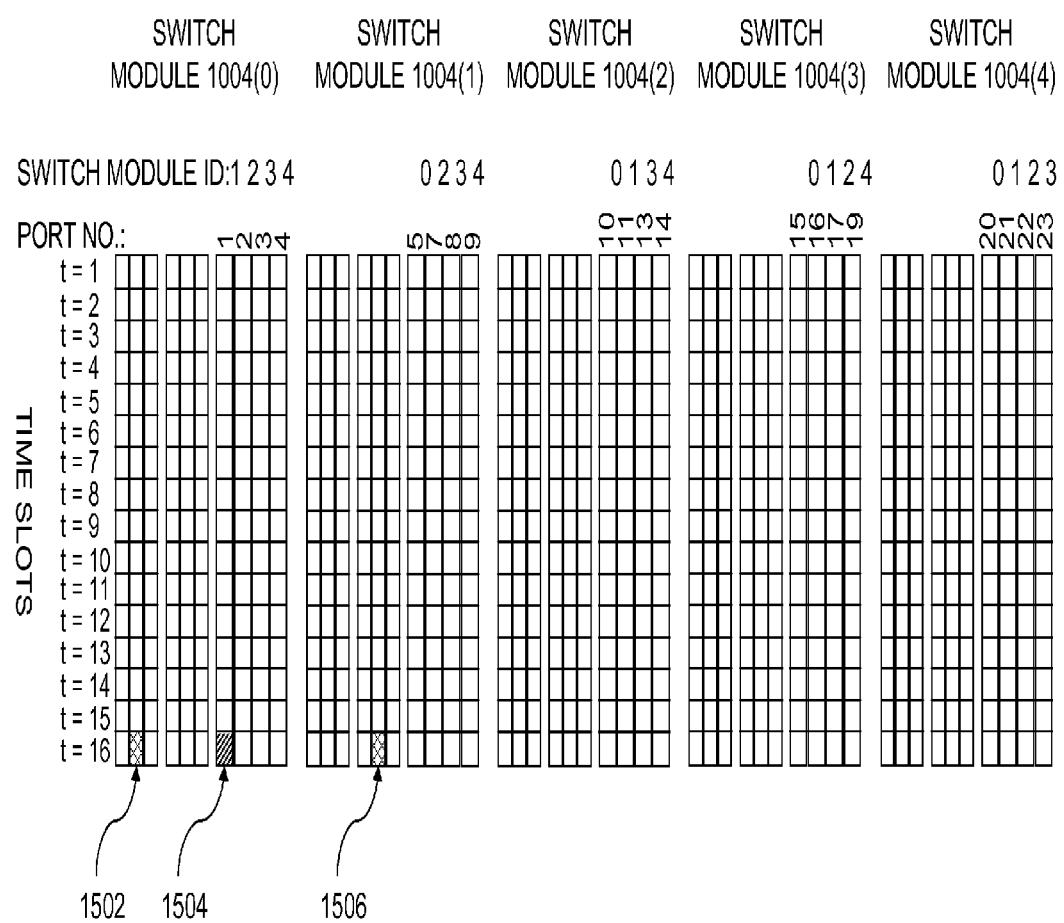
FIG. 15 illustrates a data structure for use in the application of a second-order time-slot matching process for the mesh structure of switch modules of FIG. 12 according to an embodiment of the present invention.

FIG. 15 illustrates the application of second-order time-slot matching process, where free time slots must be aligned in two stages of space switches, using a data structure based on the mesh structure of FIG. 12. In this example, each switch module 1004 has three inlet ports 1016 and three outlet ports 1018 interfacing with electronic edge nodes 102. Further, each switch module 1004 has four inbound ports 1006 and four outbound ports 1008 connecting to other switch modules 1004. A state map associated with each switch module 1004 has 16 rows, each row corresponding to a time slot in a 16-slot calendar, and ten columns. The ten columns include a column corresponding to each of three inlet ports 1016, a column corresponding to each of three outlet ports 1018 and a column corresponding to each of four outbound ports 1008. To have columns corresponding to the four inbound ports 1006 would be redundant as the same information is conveyed by the columns corresponding to the outbound ports 1008 of other switch modules that connect to the four inbound ports 1006.

The term channel-band, when used herein, may refer to a single channel, a subset of channels or an entire WDM link. Each port handles a channel-band. Each entry in FIG. 15 corresponds to a time slot in a channel-band, and therefore a time slot in a calendar associated with a port. There is a column for each upstream channel-band from an electronic edge node 102 to an inlet port 1016, a column for each downstream channel-band from an outlet port 1018 to an electronic edge node 102 and a column for each inter-modular link from an outbound port 1008 of a switch module 1004 to an inbound port 1006 of another switch module 1004. A channel-band to an inbound port 1006 in a designated switch module 1004 also connects an outbound port 1008 of another switch module 1004 to the designated switch module 1004 and, hence, the state of each of the inbound ports 1006 may be determined accordingly. A single bit may identify the state of an inter-modular link during a specific time slot, the state being simply "free" or "busy". An inter-modular link can be carrying a single wavelength channel or several channels. In FIG. 15, a time slot at an inlet port 1016 (column 1502) in the first switch module 1004(0) to an outlet port 1018 (column 1506) in the second switch module 1004(1) is selected to use a single inter-modular link (column 1504). The path selection requires a time-slot matching process that requires the alignment of free corresponding time slots in the columns 1502, 1504 and 1506.

Figure 16:
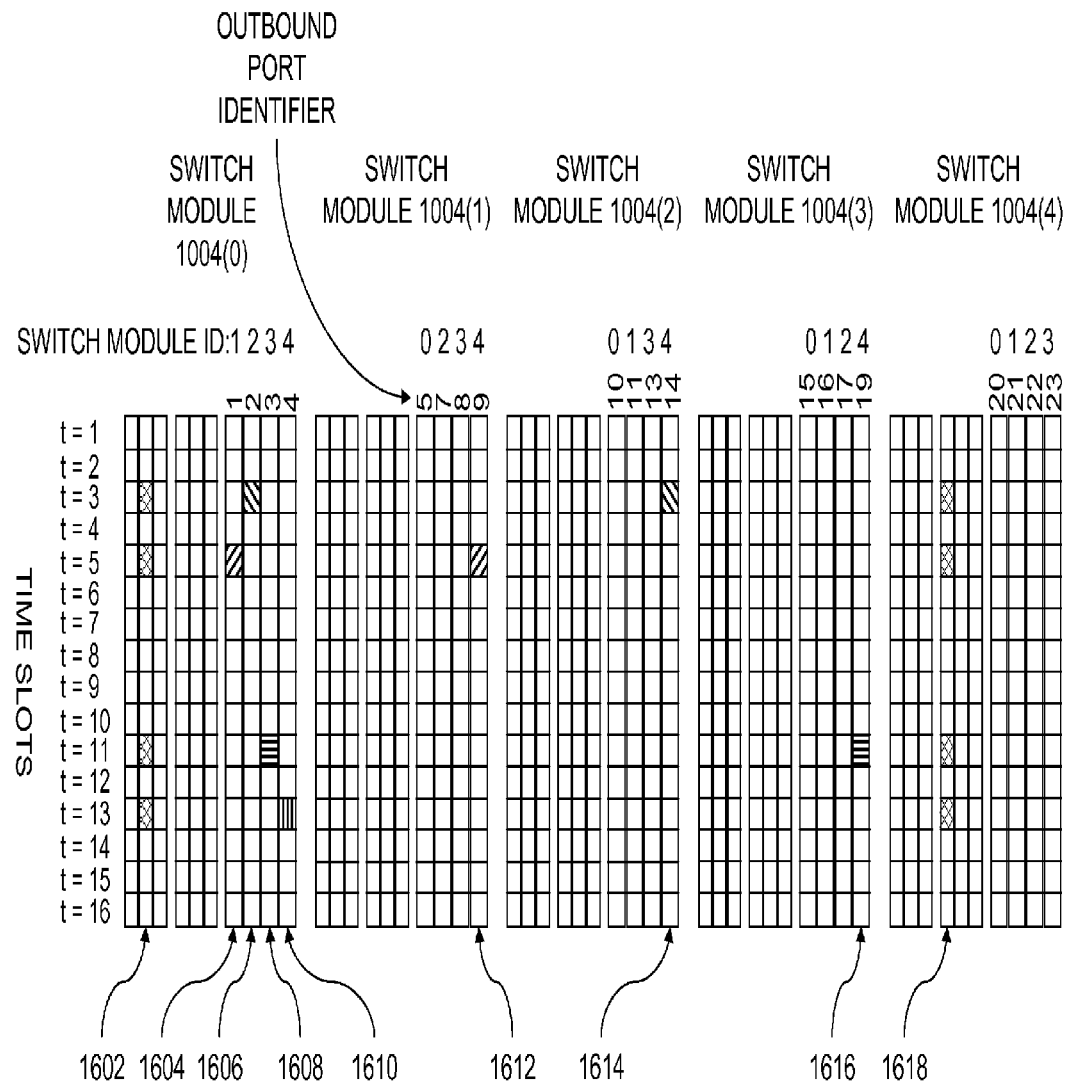
FIG. 16 illustrates the use of the data structure of FIG. 15 in the application of a third-order time-slot matching process for the mesh of switch modules of FIG. 12 according to an embodiment of the present invention.

FIG. 16 uses the data structure of FIG. 15 to illustrate second-order and third-order matching processes for the mesh structure of FIG. 12. In FIG. 16, a path from an inlet port 1016 (column 1602) in the first switch module 1004(0) to an outlet port 1018 (column 1618) in the fifth switch module 1004(4) can be selected to use free corresponding time slots in column subsets represented by column reference numbers: {1602-1610-1618}, {1602-1604-1612-1618}, {1602-1606-1614-1618} or {1602-1608-1616-1618}. Notably, the first subset, {1602-1610-1618}, includes three columns, and each of the other subsets includes four columns.

Compound matching is facilitated by inducing strong occupancy correlation among all ports in the modular, high-capacity, optical core node 1100 with a high link-occupancy gradient. This is realized by a path selection discipline that preferably applies to all possible internal paths from an inlet port to an outlet port.

Figures 17A, 17B:
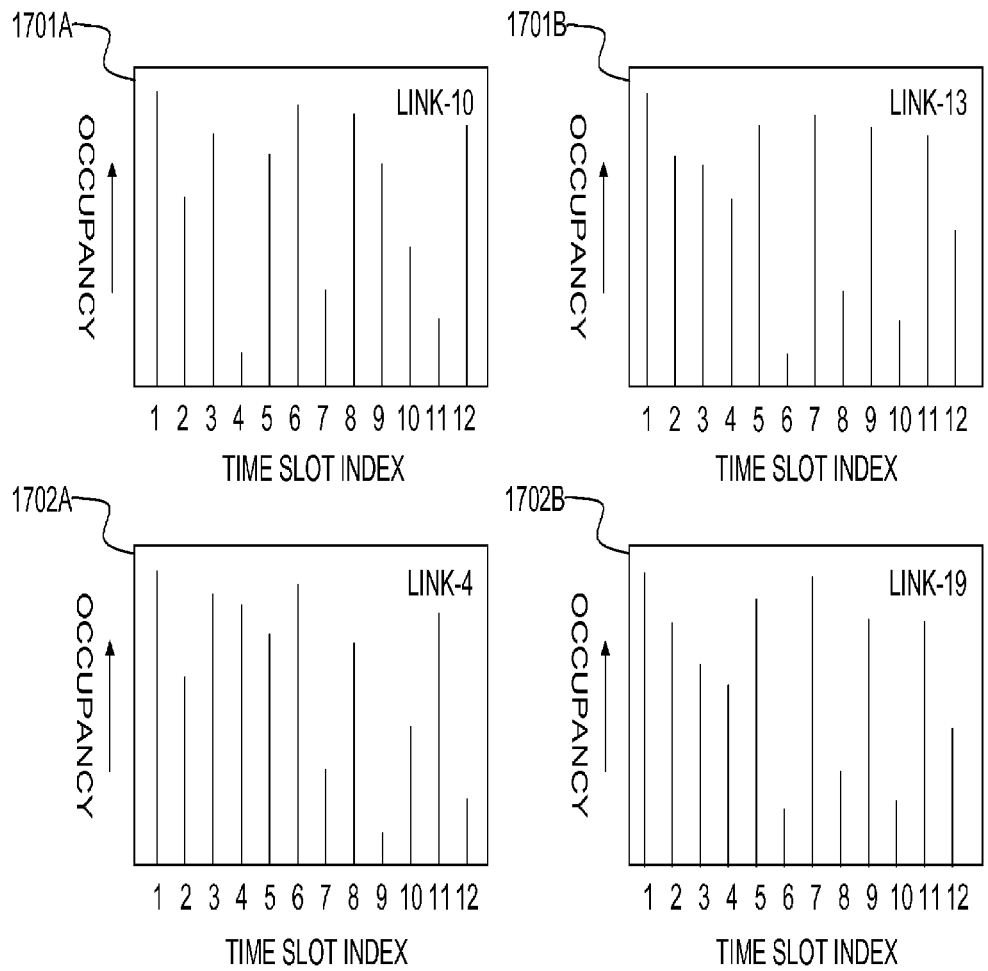
FIG. 17A illustrates temporal correlation of a first pair of weakly correlated inter-modular links in the mesh structure of FIG. 12.
FIG. 17B illustrates temporal correlation of a second pair of weakly correlated inter-modular links in the mesh structure of FIG. 12.

FIGS. 17A and 17B illustrate occupancy of two inter-modular links, labeled LINK-10 and LINK-4. In FIG. 17A, the time-slot occupancies of LINK-10 are shown in a LINK-10 occupancy plot 1701A while the time-slot occupancies of LINK-4 are shown in a LINK-4 occupancy plot 1702A. In FIG. 17A, the occupancies of LINK-10 and LINK-4 appear to be weakly correlated. In FIG. 17B, the time-slot occupancies of LINK-13 are shown in a LINK-13 occupancy plot 1701B while the time-slot occupancies of LINK-19 are shown in a LINK-19 occupancy plot 1702B. In FIG. 17B, the occupancies of LINK-13 and LINK-19 appear to be highly correlated. Such a highly-correlated pattern assists to increase the probability of successful time-slot matching.

Figures 18A, 18B:
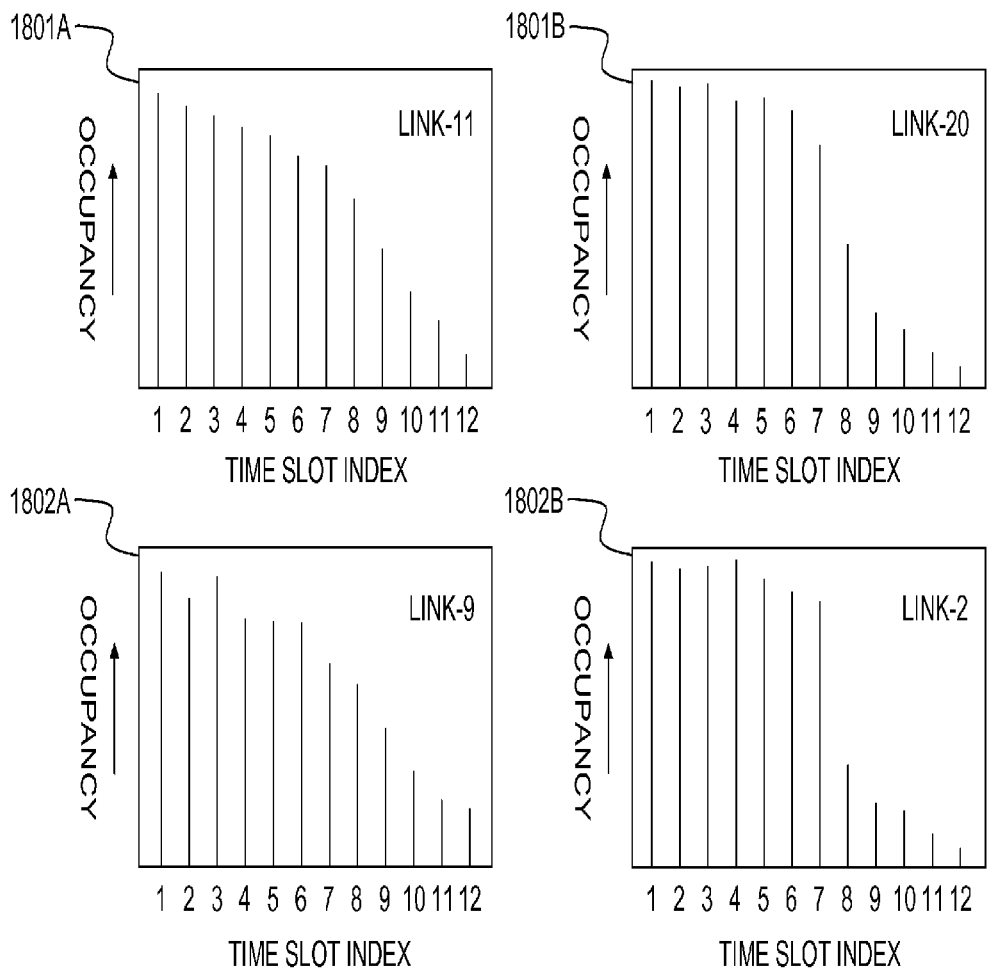
FIG. 18A illustrates temporal correlation of a first pair of highly correlated inter-modular links in the mesh structure of FIG. 12 with a first link-occupancy gradient.
FIG. 18B illustrates temporal correlation of a second pair of highly correlated inter-modular links in the mesh structure of FIG. 12 with a second link-occupancy gradient.

FIG. 18A illustrates occupancy of two inter-modular links, labeled LINK-11 and LINK-9. In FIG. 18A, the time-slot occupancies of LINK-11 are shown in a LINK-11 occupancy plot 1801A while the time-slot occupancies of LINK-9 are shown in a LINK-9 occupancy plot 1802A. In FIG. 18A, the occupancies of LINK-11 and LINK-9 appear to be highly correlated and each exhibit a moderate occupancy gradient. In FIG. 18B, the time-slot occupancies of LINK-20 are shown in a LINK-20 occupancy plot 1801B while the time-slot occupancies of LINK-2 are shown in a LINK-2 occupancy plot 1802B. In FIG. 18B, the occupancies of LINK-20 and LINK-2 appear to be highly correlated and exhibit a high occupancy gradient. A higher time-slot matching probability is realized with high occupancy correlation and high occupancy gradient.

Port Numbering Scheme

Inlet and outlet ports are preferably identified according to the switching modules and port positions within the switch modules. Within a switching module, an inlet or an outlet port is given a number between 0 and a specified maximum. Preferably, the specified maximum port number is unified for all switching modules, even if the actual number of ports provisioned in a given module is substantially less than the maximum. Thus, if the specified maximum number of ports is P, an inlet-port identifier takes the form j·m, $0 \le j < P$ and an output-port identifier takes the form k·n, $0 \le k < P$, j being the relative input-port position within switch module m and k the relative port position within switch module n. An inlet port j·m and an outlet port k·n belong to the same switch module only if n=m. An internal link, whether outbound or inbound, is also identified as a concatenation of an identifier, m, of a first switching module from which the link originates and an identifier, n, of a second switch module on which the link terminates. Thus, an internal link would have an identifier m·n, $0 \le m < Q$, and $0 \le n < Q$, Q being the maximum number of switching modules in the modular core node. Selecting the maximum number of inlet ports to be 256, the maximum number of outlet ports to be 256, and the maximum number of switching modules to be also 256, for example, an inlet port or an outlet port can be conveniently represented by two bytes (octets).

Figures 19A, 19B:
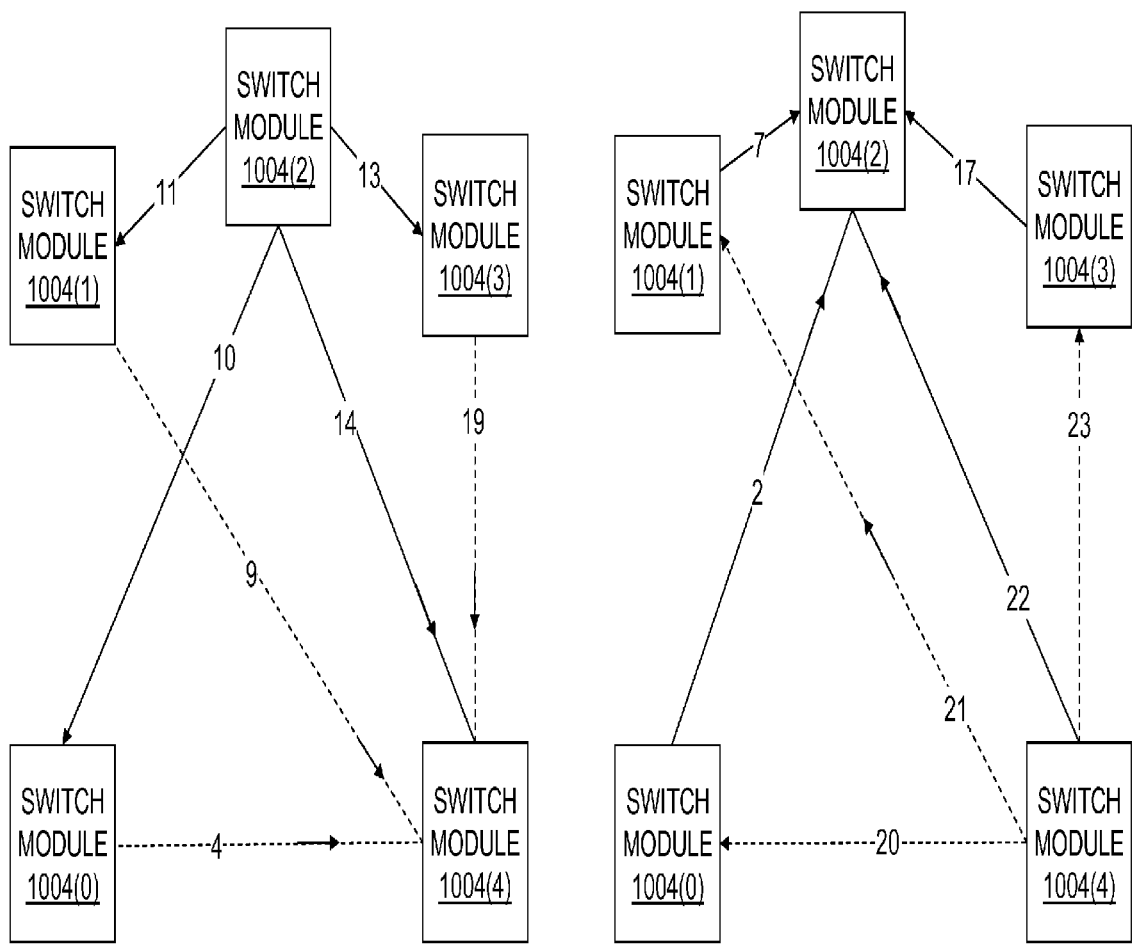
FIG. 19A illustrates an inter-modular link labeling scheme, for inter-modular links outbound from a third switch module and inbound to a fifth switch module, in an exemplary five-module node according to an embodiment of the present invention.
FIG. 19B illustrates the inter-modular link labeling scheme, for inter-modular links inbound to the third switch module of FIG. 19A and outbound from the fifth switch module of FIG. 19A according to an embodiment of the present invention.

FIGS. 19A and 19B illustrate a link labeling scheme for the inter-modular links and, by extension, for the inbound ports 1006 and the outbound ports 1008. The inter-modular links outbound from a switch module 1004(m), $0 \le m < N-1$, N-1 being the number of switch modules 1004, are labeled from m×P to (m+1)×P−1, where P is an upper bound of the number of inbound ports 1006, outbound ports 1008, inlet ports 1016 or outlet ports 1018 for any switch module 1004. For the exemplary network of FIG. 19A, P=5 and for the third switch module 1004(2) (m=2) the outbound inter-modular links are labeled from 2×5 to (3)×5−1, that is, from 10 to 14. For ease of labeling, a non-existing link from each switch module to itself is assigned a label. This link labeling scheme is applied even if some or all of the switch modules 1004 employ fewer than P inbound ports 1006. Thus, the outbound ports 1016 of each module are labeled with consecutive numbers while the inbound ports 1006 of consecutive modules are labeled with numbers that are successively separated by P.

In the structure illustrated in FIGS. 19A and 19B, the two sides of each switch module 1004 have the same number (P) of inbound ports 1006 and outbound ports 1008. As will be apparent to a person skilled in the art, it is possible, and even likely, that a modular, high-capacity, optical core node 1100 may be constructed with a number of switch modules 1004 that is not equal to the number of inbound ports 1006 on each switch module 1004.

FIG. 20A illustrates a port numbering scheme based on a first matrix 2000A with the horizontal axis of the first matrix 2000A indexing the inlet ports 1016 and the vertical axis indexing the switch modules 1004. The first matrix 2000A sets out a structure for a sub-section of an inlet port-state memory 2411 that will be discussed in further detail hereinafter with reference to FIG. 24. Each sub-section of the inlet port-state memory 2411 is used to maintain an indication of the state (i.e., busy or free) of each inlet port 1016 for a single time slot. A second matrix 2010A is illustrated in FIG. 20A that, for a particular time slot, indicates the state of each inlet port 1016 and, therefore, may be called an inlet port-state map. A "0" in the second matrix 2010A indicates a free state for the inlet port 1016 to which the location in the second matrix 2010A relates, while a "1" in the second matrix 2010A indicates a busy state. Note that the state represented in the second matrix 2010A is for a particular time slot in the calendar associated with each of the labeled inlet ports 1016.

FIG. 20B illustrates a port numbering scheme based on a first matrix 2000B with the horizontal axis of the first matrix 2000B indexing the outlet ports 1018 and the vertical axis indexing the switch modules 1004. The first matrix 2000B sets out a structure for a sub-section of an outlet port-state memory 2412 that will be discussed in further detail hereinafter. Each sub-section of the outlet port-state memory 2412 is used to maintain an indication of the state of each outlet port 1018 for a single time slot. A second matrix 2010B is illustrated in FIG. 20B that, for a particular time slot, indicates the state of each outlet port 1018 and, therefore, may be called an outlet port-state map. For the meaning of a "0" or a "1" in the second matrix 2010B see the discussion of FIG. 20A hereinbefore.

For uniformity, as mentioned above, the inlet ports 1016 in a switch module m are numbered as m×P to (m+1)×P−1 and the outlet ports 1018 are numbered likewise, P being the specified maximum number of ports. Consequently, even though the switch modules 1004 under consideration have only three inlet ports 1016 and three outlet ports 1018, these ports are labeled as if there were five of each.

In view of FIG. 20A and FIG. 20B, a time-slot-allocation request identifying the inlet port 1016 labeled 12 and the outlet port 1018 labeled 11 may be satisfied, for the particular time slot with which the second matrices 2010A, 2010B are associated, within the third switch module 1004(2), requiring only a first-order matching process. Note that in the second matrix 2010A of FIG. 20A the inlet port 1016 labeled 12 is free and in the second matrix 2010B of FIG. 20B the outlet port 1018 labeled 11 is free.

A time-slot-allocation request identifying the inlet port 1016 labeled 12, of the third switch module 1004(2), and the outlet port 1018 labeled 20, of the fifth switch module 1004(4), requires a compound matching process. The first step of such a compound matching process is determining, for a particular time slot, that the inlet and outlet ports 1016, 1018 of interest are free.

FIGS. 21A and 21B assist in the compound matching process. FIG. 21A illustrates a port numbering scheme based on a first matrix 2100A with the horizontal axis of the first matrix 2100A indexing the outbound ports 1008 and the vertical axis indexing the switch modules 1004. By labeling the outbound ports 1008, the inter-modular links have also, in effect, been labeled. The first matrix 2100A sets out a structure for a sub-section of an outbound port-state memory 2413 that will be discussed in further detail hereinafter. Each sub-section of the outbound port-state memory 2413 is used to maintain an indication of the state (i.e., busy or free) of each outbound port 1008 for a single time slot. A second matrix 2110A is illustrated in FIG. 21A that, for a particular time slot, indicates the state of each outbound ports 1008 and, therefore, may be called an outbound port-state map. By extension, the state of each inbound port 1006 and each inter-modular link is also indicated, for a particular time slot, by the second matrix 2110A. Notably, the state of the outbound port 1008 of the switch module 1004 bearing the same index is always "1" (i.e., each element in a diagonal in matrix 2110A always has a state of "1").

The second step of the compound matching process discussed in conjunction with FIGS. 20A and 20B is determining that, for the particular time slot, an outbound port 1008 of the origin switch module 1004 and a corresponding inbound port 1006 of the destination switch module 1004 are free. In the case of a direct inter-modular link between the switch modules 1004, the state of only one inner port 1006, 1008 need be assessed. However, in the case of a path from an origin switch module 1004 to a destination switch module 1004 passing through an intermediate switch module 1004, there is a need for the state of two outbound ports 1008 to be assessed (namely an outbound port 1008 on the origin switch module 1004 and an outbound port 1008 on the intermediate switch module 1004). This is equivalent to assessing the state of one outbound port 1008 and one inbound port 1006 (namely an outbound port 1008 on the origin switch module 1004 and an inbound port 1006 on the destination switch module 1004).

This latter assessment may be accomplished for a particular time slot by comparing the row, of the second matrix 2110A of FIG. 21A, that corresponds to the origin switch module 1004 with the column, of the same second matrix 2110A, that corresponds to the destination switch module 1004. In the outbound port-state memory that maintains a copy of the second matrix 2110A for each time slot, the comparing requires that the memory locations of the row be read. Such a row read operation can be accomplished with a single memory access where the state information is maintained in contiguous memory locations, as is preferred. The comparing also requires that the column be read. Such a column read operation would take five memory-access steps for the exemplary second matrix 2110A.

To facilitate the third-order matching process, a further state memory may be created. Nominally, this further state memory may be an inbound port-state memory, but the structure of each sub-section, as represented by a first matrix 2100B of FIG. 21B, is a transpose of the first matrix 2100A of FIG. 21A. This transposition of the first matrix 2100A of FIG. 21A allows the column read operation mentioned above to be accomplished as a row read operation, requiring just a single read command, thereby requiring less processing time. Accordingly, a second matrix 2110B is illustrated in FIG. 21B that, for a particular time slot, indicates the state of each inbound ports 1006 and, therefore, may be called an inbound port-state map. The second matrix 2110B of FIG. 21B is a transpose of the second matrix 2110A of FIG. 21A.

An indicated row 2102A in FIG. 21A contains the identities of outbound ports 1008 of the third switch module 1004(2) while an indicated row 2104B in FIG. 21B contains the identities of inbound ports 1006 of the fifth switch module 1004(4). Note that the identities in the indicated row 2104B of FIG. 21B are the same as the identities in an indicated column 2104A of FIG. 21A.

To select a path, as requested above, from the inlet port 1016 labeled 12 of the third switch module 1004(2) to the outlet port 1018 labeled 20 of the fifth switch module 1004(4), a compound matching process is required. That is, the same time slot must be found vacant not only at the inlet port 1016 labeled 12 and the outlet port 1018 labeled 20 but also on any inter-modular links in a path from the third switch module 1004(2) to the fifth switch module 1004(4).

Using the identification of ports presented in FIGS. 19A and 19B, an outbound port 1008 and a corresponding inbound port 1006 can be represented by a single label (number). This single label is the label for the inter-modular link that connects the corresponding ports. For example, compare the indicated row 2104A in FIG. 21A, containing the identities of outbound ports 1008 of the third switch module 1004(2), to the labels on the inter-modular links emanating from the third switch module 1004(2) in FIG. 19A. Note that diagonal entries of the first matrix 2100A of FIG. 21A and of the first matrix 2100B of FIG. 21B are italicized to indicate that the diagonal entries are null entries, i.e., the diagonal entries do not correspond to actual inter-modular links.

The number of pairs of inter-modular links is one less than the number outbound ports 1008 for the origin switch module 1004 under consideration (i.e., P−1). To select a path from the third switch module 1004(2) to the fifth switch module 1004(4), a path finding process should consider the state of the following inter-modular links: {10, 4}, {11, 9}, {13, 19}, {14, Null}. Notably, these pairs may be determined by aligning the indicated row 2104A of FIG. 21A with the indicated row 2104B of FIG. 21B. The latter of these pairs is representative of a single inter-modular link from the third switch module 1004(2) to the fifth switch module 1004(4), requiring only a second-order matching process. Recalling that a first-order matching process is necessary above to match a vacant time slot in an inlet port 1016 to a vacant time slot in an outlet port 1018 of the same switch module 1004, the second order matching process adds the additional requirement of matching a vacant time slot in an outbound port 1008. The rest of the pairs of inter-modular links require a third-order matching process. The third-order matching process adds the requirement of matching a vacant time slot in an outbound port 1008 of an intermediate switch module 1004 (or a vacant time slot in an inbound port 1008 of the destination switch module 1004).

For the example time slot represented by the second matrix 2010A of FIG. 20A, the second matrix 2010B of FIG. 20B, the second matrix 2110A of FIG. 21A and the second matrix 2110B of FIG. 21B, the compound matching process required to select a path from the inlet port 1016 labeled 12 of the third switch module 1004(2) to the outlet port 1018 labeled 20 of the fifth switch module 1004(4) begins by establishing that the inlet port 1016 labeled 12 and the outlet port 1018 labeled 20 are free. Once inlet and outlet ports have been established to be free, the inter-modular link from the third switch module 1004(2) to the fifth switch module 1004(4) is considered. If that inter-modular link, labeled 14 in FIG. 19A and corresponding to the outbound port labeled 14 in FIG. 21A, is free, then the second-order matching process is complete and the result {14, Null} is output. If that inter-modular link is busy, as it is in the example state map given by the second matrix 2110A of FIG. 21A, then the second-order matching process is attempted for the next time slot. If a second-order matching process has been attempted, and failed, for every time slot, a third order matching process may be attempted, again on a time slot by time slot basis.

Where a third-order matching process is attempted on the time slot represented in FIGS. 21A and 21B, the states of the inter-modular links in the pairs {10, 4}, {11, 9}, {13, 19} are considered. Although the outbound port 1008 labeled 10 at the third switch module 1004(2) is free, the outbound port 1008 labeled 4 at the first switch module 1004(0) is busy. Additionally, the outbound port 1008 labeled 11 at the third switch module 1004(2) is busy and the outbound port 1008 labeled 9 at the second switch module 1004(1) is free. Fortunately, the outbound port 1008 labeled 13 at the third switch module 1004(2) is free and so is the outbound port 1008 labeled 19 at the fourth switch module 1004(3). The third-order matching process is then considered to be complete and the result {13, 19} is output.

Alternative labels for ports are also contemplated. Such alternative labels represent a port with two binary values separated by a period. The first value is the index, m, of the switch module 1004(*m*) and the second number is a relative port number. For the above example, the inlet port 1016 labeled 12 may be alternatively labeled 010.010, i.e., the switch module 1004(2) number 2 and the relative inlet port 1016 number 2. Equally, the outlet port 1018 labeled 20 may be alternatively labeled 100.000, i.e., the switch module 1004(4) number 4 and the relative outlet port 1018 number 0.

As described earlier, in a first-order matching process, occupancy packing increases the throughput of a space switch. Occupancy packing in a time-multiplexed space switch increases the temporal occupancy gradient of the input and output ports of the space switch, which tends to maximize a probability of vacant time-slot alignment. The probability of free time-slot alignment decreases as the order of the matching process increases. In the mesh structure 1200 (see FIG. 12) of the modular, high-capacity, optical core node 1100 in accordance with the present invention, the relatively low probability of time-slot alignment along a single internal path (made up of one or more inter-modular link) within the mesh structure 1200 is offset by the availability of multiple internal paths. This, however, may require intensive processing. The pipelined processing method according to the present invention enables a high rate of connection routing within the mesh structure 1200 as will be described below with reference to FIG. 23.

Switch-module controllers receive release requests from edge nodes and communicate the requests to the master controller. In an adaptive network, an edge node may modify its path-capacity requirements to follow traffic-load variation. Thus, an edge node may request more time slots per time frame or may offer to release a number of time slots in a current connection to another edge node. The master controller need not be aware of the individual connections managed by the switch-module controllers. Thus, each switch-module controller formulates a release request indicating the inlet port, the outlet port, and any traversed internal link.

It is preferable that release requests be given the highest priority for two reasons. The first is that the release requests require a negligible processing effort. The second is that releasing resources as soon as possible facilitates the scheduling process.

Figure 22:
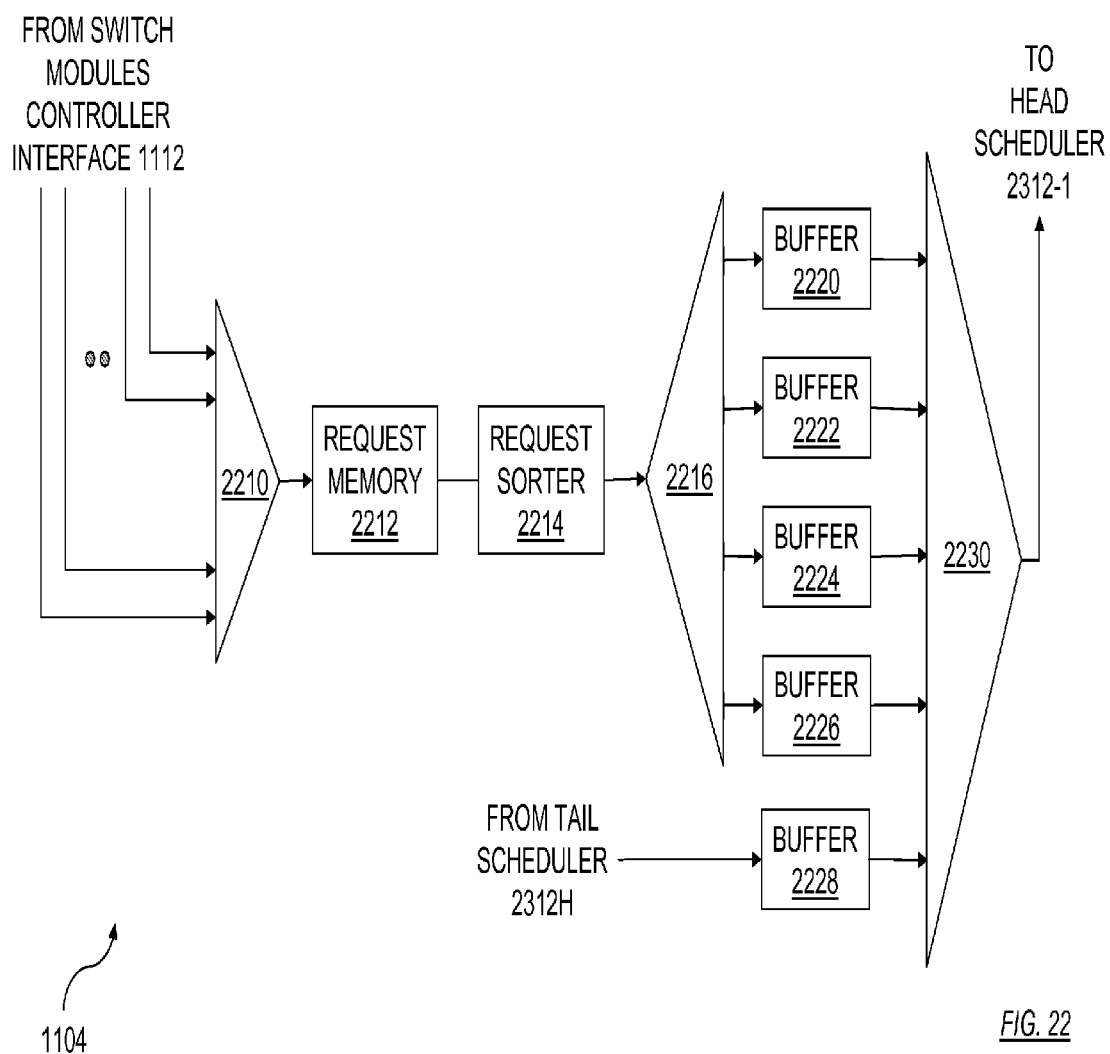
FIG. 22 illustrates the control-data transfer from switch modules to the master controller according to an embodiment of the present invention.

FIG. 22 partly illustrates the connection-control circuit 1104. The switch-module controllers periodically send parameters of connection requests to the master controller. The requests are received at consecutive intervals of time and selector 2210 directs the release requests and connection requests to a request memory 2212 from which the requests are placed in buffers 2220, 2222, 2224, or 2226 according to the request type as determined by request sorter 2214. An additional buffer 2228 receives continuation requests from a "tail" scheduler (scheduler number H) as will be described below.

The core node may be operated in a TDM mode, as described earlier, where each TDM frame is divided into $H \geq 1$ sub-frames. A cascade of $H \geq 1$ schedulers is provided and the $h^{th}$ scheduler, $1 \leq h \leq H$, covers $\Psi_h \geq 1$ time slots per TDM frame. The $\Psi_h$ time slots need not be consecutive. It is convenient, however, to allocate consecutive locations in a calendar, so that the $h^{th}$ scheduler is allocated time slots $\tau_h$ to $\tau_h + \Psi_h - 1$, with $\tau_1 = 0$. The actual time slots can be a one-to-one mapping of the consecutive time slots. This data is virtually static and is set when the scheduling mechanism is installed or modified. Each switch-module controller must be aware of the values $\tau_h$ and $\Psi_h$ for each of the H schedulers, and the corresponding mapping. For example, if the total number S of time slots per TDM frame (per calendar) is a power of 2 (such as 1,024), a reverse-binary mapping can be used to distribute the time slots allocated by a scheduler along the entire TDM frame. Reverse binary mapping is derived by reading consecutive numbers in the reverse binary order, i.e., the least-significant bit becomes the most significant bit, and vice-versa.

Figure 23:
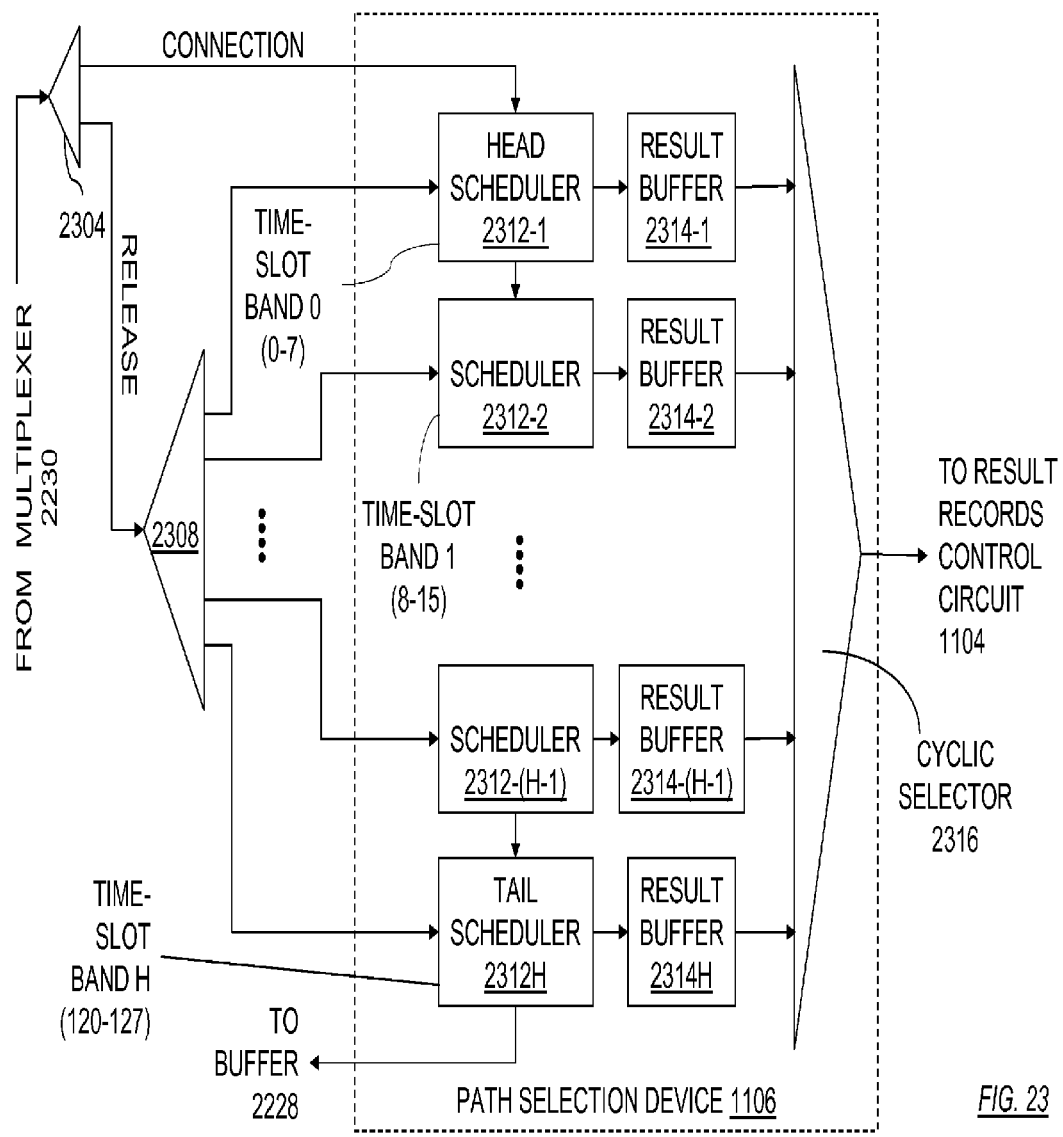
FIG. 23 illustrates a path selection device using an array of schedulers for a cascaded search according to an embodiment of the present invention.

As illustrated in FIG. 22, there are five buffers, 2220, 2222, 2224, 2226, and 2228, at the input of the head scheduler (scheduler 2312-1 in FIG. 23). The first buffer 2220 contains release requests. The second buffer 2222 contains new requests where the inlet port and outlet port belong to the same switch module. The third buffer 2224 contains new requests where the inlet port and outlet port are on different switch modules and a direct internal link from the originating switch module and terminating switch module is provided. If a direct link is not provided, the request is placed in the fourth input buffer 2226. With a fully-meshed switch modules, a direct internal link is provided for each switch-module pair and the fourth input buffer 2226 is not needed. The fifth buffer 2228 contains only requests, initially placed in the third buffer 2224, that were processed by the cascade of schedulers according to a second-order matching process but the second-order matching process failed to find the required number of allocable time slots. A type of 0 is associated with each release request placed in the first input buffer 2220, a type of 1 is associated with each connection request placed in the second or third input buffers, 2222, 2224, and a type of 2 is associated with each connection request placed in the fourth or fifth input buffer, 2226, 2228. Each of the H schedulers distinguishes a type-1 connection request having parameters j·m, and k·n by comparing m and n. When m=n, the connection requires only a first-order matching process. The purpose of using separate buffers (2222 and 2224) for type-1 requests is to enable a service-priority discipline for all the five buffers. It is noted that the first four buffers 2220, 2222, 2224, 2226 can share a memory device because only one is accessed at any time. The fifth buffer 2228 is preferably a separate memory device because it is accessed independently.

A 1:2 distributor 2304 and a 1:H distributor 2308 (see FIG. 23) are components of the path-selection device 1106. The connection-control circuit 1104 controls the dequeuing of the release requests waiting in buffer 2220. Preferably, release requests are given top priority in order to release reserved time slot as soon as the reserved time slots become idle.

The connection-control circuit 1104 also controls the dequeuing of the connection-request buffers 2222, 2224, 2226, and 2228, and the head scheduler processes one connection-request at a time. In a first preferred dequeuing method, the buffers are dequeued according to a predetermined priority order. In a second method, the buffers are dequeued in a cyclic order, with each of the four buffers allocated a time interval during which some or all of its waiting requests are processed by the head scheduler. When a connection-request buffer is empty, the connection-control circuit 1104 proceeds to dequeue another connection-request buffer. If the first method is used, the preferred priority order is: 2224, 2228, 2226, then 2222. The rationale behind this selection is that giving inter-module connections waiting in buffer 2224 a high priority increases the proportion of connections using a single link 420. A connection request waiting in buffer 2228 may have already reserved time slots along a direct link which would remain idle until the connection is completely scheduled. Buffer 2226 is only used when a direct link 420 is not provided, and a connection-request waiting in the buffer is not holding any time slots. Finally, a connection request waiting in buffer 2222 has a high probability of acceptance and may then be given the lowest priority.

In the second method, the connection-control circuit 1104 allocates a time interval for dequeuing each buffer. When the interval allocated to de-queue a buffer expires, or when the buffer becomes empty, a selector 2230 proceeds to the next buffer in a cyclic fashion so that the third buffer 2224 follows the second buffer 2222 and the second buffer 2222 follows the fifth buffer 2228. Note that the release-request buffer 2220 is always given the highest priority and its dequeuing interleaves the dequeuing of the four connection-request buffers. For example, each of the intervals may be selected to be one millisecond. If the spatial distribution of the traffic is uniform, a small proportion of connections would be confined within switching modules, i.e., requiring a first-order matching process, and the majority of connections would be established over direct internal links connecting switching modules. Thus, even though the four connection-request buffers are granted equal service intervals, the head scheduler receives most of its requests from the third buffer 2224, and the other four intervals would be shortened below the assigned one millisecond. With non-uniform spatial distribution of traffic, where the connection requests received at a switching module are directed to a few of the (N−1) other switching modules, a significant proportion of the connections may have to use two-link paths, each requiring a third-order matching process, and the fourth allocated interval would be the busiest of the assigned four intervals.

Global time-slot occupancy packing, more fully described hereinafter, could be a time-consuming process, which, in some instances, may be too slow to be practically useful if implemented according to traditional path selection methods. However, the use of cascaded schedulers 2312, to be described with reference to FIG. 23, in the master controller 1102 enables path selection within the modular, high-capacity, optical core node 1100 at very high rates. A single scheduler 2312 may be limited to path selection for a predetermined number of time-slots in a calendar. Each scheduler 2312 in this cascaded (pipelined) structure uses memory devices 2408 to hold a state map indicating the busy/idle state for each inlet port 1016 and each outlet port 1018 for the predetermined number of time slots, i.e., the time-slot band handled by a stage. Advantageously, each entry in each state map need only be one-bit wide (see the discussion of FIGS. 21A, 21B). If a very high path selection rate is not required, the number of cascaded schedulers 2312 can be reduced. Such a reduction requires that each scheduler 2312 handle more time-slots per calendar.

A strategy of global time-slot occupancy packing is used herein to promote order in the path selection process, wherein each time-slot-allocation request is processed in the same order in the path selection device 1106. That is, a path to satisfy each time-slot-allocation request is sought starting with the time-slot band A, corresponding to the first scheduler 2312A of the path selection device 1106 (FIG. 23). If a path is not found for all the requested time-slots, an amended version of the time-slot-allocation request may be passed to the second scheduler 2312B, and so on. By always processing the time-slot-allocation requests in this order, the early time slots will tend to have high occupancy and the later time slots will tend to have low occupancy. This occupancy pattern is known to result in a more efficient matching process.

FIG. 23 illustrates elements of the path selection device 1106 of the master controller 1102 of FIG. 11. The path-selection device 1106 receives both connection requests and release requests from the selector 2230. The search effort for finding an internal path can be divided among a number of schedulers 2312, where each scheduler 2312 handles the search over a prescribed "band" of time slots. The number, S, of time slots per calendar is preferably large, of the order of 1,024 for example. The S time slots may be grouped into J sets, where J<S, and each of the J sets may be associated with a processing unit. Each of the schedulers 2312 is a time-slot matching device that can perform first-order, second-order, or third-order matching processes.

A 1:2 distributor 2304 directs connection requests to a head scheduler 2312-1 and release requests to a 1:H distributor 2308 which places each release request in a release-request buffer associated with each scheduler 2312. The appropriate schedulers 2312 for each release request are determined by request sorter 2214. Each switch-module controller associates each release request received from edge nodes 102 with one or more of the H schedulers 2312 and where a release request covers more than one scheduler 2312, the release request is divided into release requests each covering only one scheduler. It is noted that, in order to realize temporal packing, each connection requests must be offered to the head scheduler and proceed through the array of schedulers 2312 until the number of time slots specified in the connection request is allocated or all internal routes have been unsuccessfully attempted. In contrast, a release request specifies the time slots to be released and the corresponding inlet port, outlet port, and inner links. Therefore, it would be wasteful to let a release request proceed along the array of schedulers 2312. The path selection device 1106 makes use of cascaded stages to expedite a path selection process. The number of time slots in a scheduling period may be arranged as time-slot bands (of, for example, eight time-slots per band) so that each stage of the path selection device 1106 may correspond to a single time-slot band. The cascaded schedulers of FIG. 23 are labeled 1 through H. Each of a set of schedulers 2312-1, 2312-2, ..., 2312-(H−1), 2312H communicates with a corresponding one of a set of result buffers 2314-1, 2314-2, ..., 2314-(H−1), 2314H (referred to individually or collectively as 2314). The output of the result buffers 2314 is transmitted to a cyclic selector 2316 from which selected results are transmitted to switch-module controllers 1002. Note that, at any instant of time, it is possible that all the H schedulers 2312 be engaged in processing connection requests. The processing gain, hence the increased scheduling throughput, derives directly from this simultaneous processing. The processing gain of a system employing multiple processing units may be defined as the ratio of the mean processing throughput to the throughput of a system employing a single processing unit.

The cyclic selector 2316 transfers the results of all schedulers to the connection-control circuit 1104 (see FIG. 11). A path-search attempt performed by the path selection device 1106 may terminate successfully at any scheduler 2312 of the path selection device 1106. Only unsatisfied time-slot-allocation requests are processed in all schedulers 2312. Notably, while the time-slot-allocation requests arrive sequentially at the path selection device 1106, successive time-slot-allocation requests may terminate concurrently at different schedulers 2312. Each scheduler 2312 is therefore provided with a result buffer 2314 to store each result record that is a product of satisfaction, at least in part, of a time-slot-allocation request. Alternatively, the result buffer 2314 may store an identity (say, a cyclical request number) that points to a result record, where the record stores attributes of the path selected to satisfy the time-slot-allocation request. The cyclical selector 2316 visits the result buffers 2314 and, under control of a de-queue circuit (not illustrated), reads the content, if any, of each result buffer 2314 (or of the result record to which the identity in the result buffer 2314 points) and transfers the content to the connection-control circuit 1104 in the master controller 1102 (FIG. 11). With proper selection of the capacities of the inner ports 1006, 1008 and the inlet and outlet ports 1016, 1018 of each switch module 1004, the incidence of unsuccessful path-search attempts can be made negligibly small.

As stated hereinbefore, the time slots of the calendar of interest may be collected into time-slot bands to enhance processing efficiency. Each stage of the path selection device 1106, including a scheduler 2312 and a result buffer 2314, corresponds to a single time-slot band. A time-slot band may include only one time slot. However, when the number of time slots per TDM frame (per calendar) is large, 1,024 for example, a time-slot band may contain several time slots. There is no requirement that each of the time-slot bands considered by a path selection device 1106 have the same number of time slots. In fact, there may be significant advantages realized by arranging the time-slot bands so that the earlier time-slots bands contain a small number of time slots, while the later time-slots bands contain a larger number of time slots.

If, for example, time-slot-allocation requests are received at a rate of one million per second in a 20-band path selection device 1106, and with proper selection of the time-slot bands, the result records would be queued in the result buffers 2314 at approximately the same rate, with a negligible request rejection rate. A worst-case de-queue delay may occur when all the time-slot-allocation requests terminate successfully at a single given time-slot band. The cyclic selector, which is unaware of the content of individual result buffers 2314, must visit all the result buffers 2314. With an access time of 20 nanoseconds, for example, there may be an overhead time of about 0.4 microseconds (20 buffers and 20 nanoseconds access time) and the available de-queue time per time-slot-allocation request may be about 0.6 microseconds. If the number of schedulers is large, 100 for example, an auxiliary cyclic selector (not illustrated) may be used to concurrently "look ahead" and list, in an auxiliary buffer (not illustrated), only those result buffers 2314 that contain results. In any case, the de-queue delay may be considered insignificant because a high overhead results in more accumulation and a self-adjusting relative reduction in overhead. A scheduler 2312 can only process one request at a time. Thus, it de-queues a request from a request buffer only after it either places a record in its result buffer and/or after it places the request parameters into a cascade buffer, i.e., the connection-request buffer of a subsequent scheduler, for further processing.

It is noted that a direct link connecting a first switch module to a second switch module may be reserved for the exclusive use of connections from inlet ports of the first switch module to outlet ports of the second switch module if the total rate of such connections is known to be sufficiently high. Under high load, connection requests from the first switch module to the second switch module may still be accommodated using a two-link path through an intermediate switch module.

Figure 24:
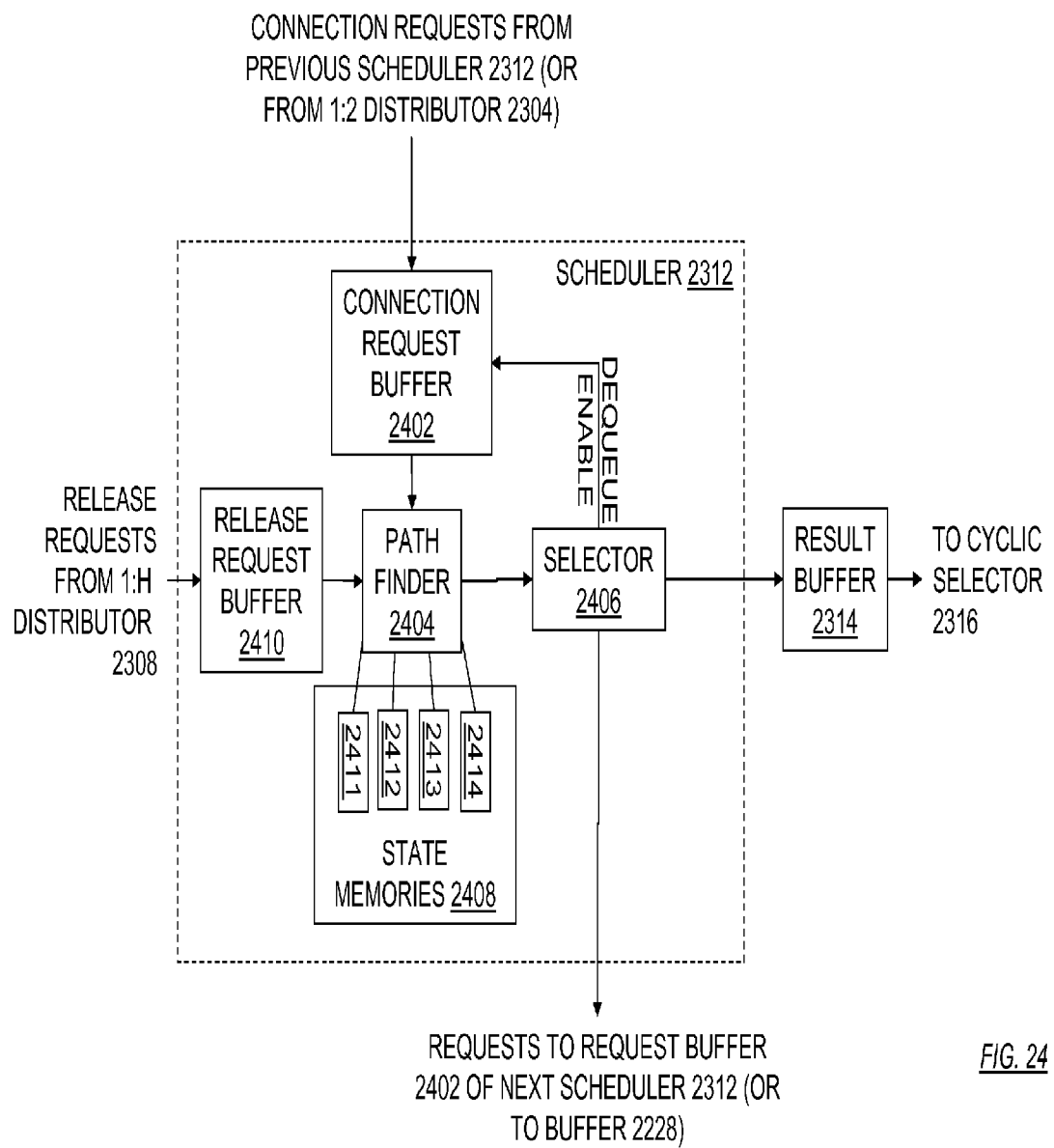
FIG. 24 illustrates one of the schedulers of FIG. 23 according to an embodiment of the present invention.

FIG. 24 illustrates one of the cascaded stages of FIG. 23, where a stage includes a scheduler 2312 and a result buffer 2314. A connection-request buffer 2402, as part of the scheduler 2312, receives incoming time-slot-allocation requests either from the connection-control circuit 1104 (for the head scheduler 2312-1) or from the previous scheduler (for the scheduler 2312-2 through to the tail scheduler 2312-H) and buffers these time-slot-allocation requests before transmitting the time-slot-allocation requests to a path finder 2404. A release-request buffer 2410 receives requests to release paths allocated for time slots covered by the specific scheduler 2312. The path finder 2404 gives the release-request buffer priority over the request buffer 2402 in order to exploit the released time slots in accommodating any new connection requests in connection-request buffer 2402.

As discussed hereinbefore, a time-slot-allocation request may, for instance, identify an inlet port 1016, an outlet port 1018 and a number of time slots required per scheduling period. The path finder 2404 has access to memory devices 2408 for maintaining an inlet port-state memory 2411, an outlet port-state memory 2412, an outbound port-state memory 2413 and an inbound port-state memory 2414 that relate to the time-slot band assigned to the scheduler. A selector 2406 receives a result of a path finding process carried out by the path finder 2404. If the process has been successful, i.e., a path has been found for at least one of the time slots requested, a result record that indicates the found path or paths is sent to the result buffer 2314. The result record is then selected by the cyclic selector 2316 (FIG. 23). Where the process has been unsuccessful, at least in part, i.e., a path has been found for fewer than all of the time slots requested, the time-slot-allocation request (amended to reflect the selection of a path for some, though not all, of the requested time slots) may be sent to the next scheduler 2312 (for the head scheduler 2312-1 and the scheduler 2312-2 through to the scheduler 2312-(H−1)) or to the connection-control circuit 1104 (for the tail scheduler 2312-H).

Consider that the time slots of a given calendar may be collected into time-slot bands, as described above in conjunction with FIG. 23, where the time-slot bands do not necessarily have equal numbers of time slots and that a given time-slot-allocation request may indicate a need for more than one time slot in the calendar. Each scheduler 2312 of the path selection device 1106 may be associated with four memory devices 2408 that cover a particular time-slot band. These four memory devices may include, for instance, an inlet port-state memory 2411 (FIG. 20A), an outlet port-state memory 2412 (FIG. 20B), an outbound port-state memory 2413 (FIG. 21A) and an inbound port-state memory 2414 (FIG. 21B).

As noted earlier, the number of time slots in each time-slot band is arbitrary and may vary from one time-slot band to another. The mean search time in a time-slot band increases with the number of time slots in the time-slot band. Increasing the number of time-slot bands in a calendar increases the path selection capacity of the path selection device 1106. Such an increase in the number of time-slot bands reduces the size of individual memory devices 2408 but increases the required number of memory devices 2408.

Configuration of the path selection device 1106 may be under the control of the connection control circuit 1104, which may monitor the mean search time. Based on changes in the mean search time, the connection control circuit 1104 may configure the path selection device 1106 to alter the number of time slots in individual time-slot bands.

FIG. 25 shows an example output of the path selection device 1106 of the master controller 1102 in response to the receipt of a time-slot-allocation request. A first exemplary result record 2502 illustrates the selection of a path for a single time slot per calendar using a direct link {14, NULL}. Where the time-slot-allocation request required q time slots per calendar, with q=4 for example, the time-slot-allocation request may be considered to have been only partially satisfied. Other exemplary result records 2504 illustrate the selection of a two-link path for each of the remaining three time slots of the time-slot-allocation request.

For each path in the example of FIG. 25, it is assumed that the path selection device 1106 found the vacant time slot as close to a reference time slot in the calendar as possible. In view of FIG. 23, it appears that the first result record 2502 is a result of path selection performed by the scheduler 2312-2 associated with the second time-slot band and the result records 2504 are results of path selection performed by the head scheduler 2312-1 associated with the first time-slot band.

The q requested time slots may be allocated any number, less than or equal to the number, q, of inter-modular paths. The path for a given time slot may be described by one or more inter-modular link identifiers, where each link identifier is equivalent to a label of an outbound port 1008 and the corresponding inbound port 1006. The entries in each row in the result records 2502, 2504 contain a first inter-modular link identifier, L1, of a first inter-modular link, a second inter-modular link identifier L2 of a second inter-module link for a path of two inter-module links, and a time-slot index, T (a number between 0 and S−1, S being the number of time slots per calendar). The value of q is less than or equal to S and is typically substantially less than S. The identifiers L2 are initialized as null entries. It is noted that the second link identifier L2 can be determined, by an inlet switch module, based on L1 and the outlet switch module, however it may be provided by the path-selection device 1106. A null value is assigned to L2 if link L1 connects the inlet switch module directly to the outlet switch module specified in a connection request. (An inlet switch module and an outlet switch module are the switch modules that respectively include the inlet and outlet ports specified for a connection.)

Figure 29:
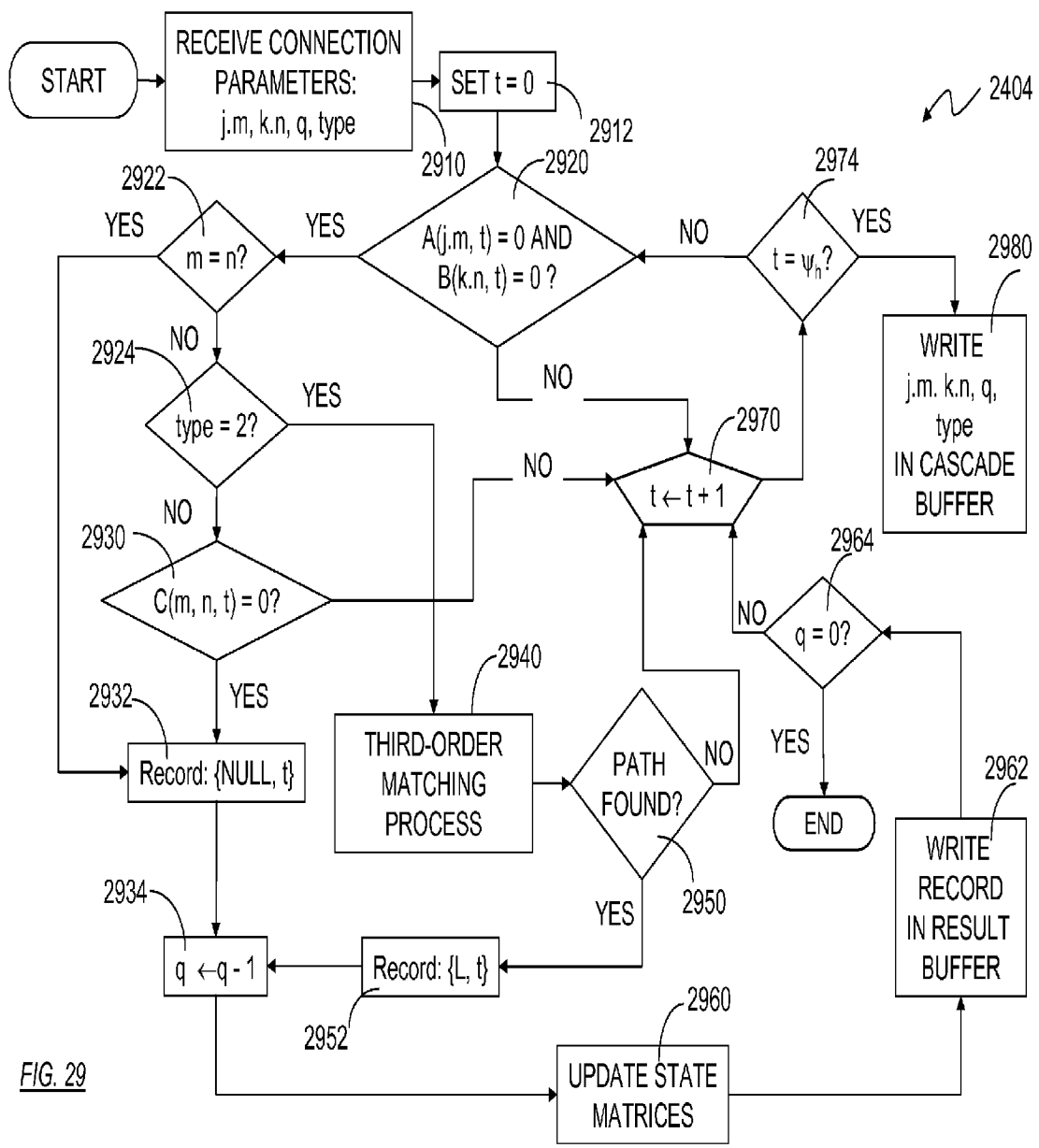
FIG. 29 illustrates steps in a first-order, second-order, or third-order matching method to be used by the scheduler of FIG. 24 according to an embodiment of the present invention.

In a preferred embodiment, on first pass through the stages of the path selection device 1106 (FIG. 23), the schedulers 2312 attempt a second-order matching process (see FIG. 29). Any time-slot-allocation requests rejected by all (i.e., not completely satisfied by any) of the schedulers 2312 are returned to the connection control circuit 1104 (buffer 2228). The connection control circuit 1104 may then re-introduce the rejected time-slot-allocation requests to the path selection device 1106 so that the schedulers 2312 may attempt a third-order matching process (see FIG. 30). Such a two-pass process helps to ensure that if a time slot is available wherein a direct connection between switch modules 1004 may be established, that time slot is allocated before considering a path via an intermediate switch module 1004. The two-pass process requires the secondary buffer 2228 to store time-slot-allocation requests that were not fully accommodated by a second-order timeslot matching. The secondary buffer 2228 may be part of, or controlled by, the connection-control circuit 1104 as described earlier.

Figure 26:
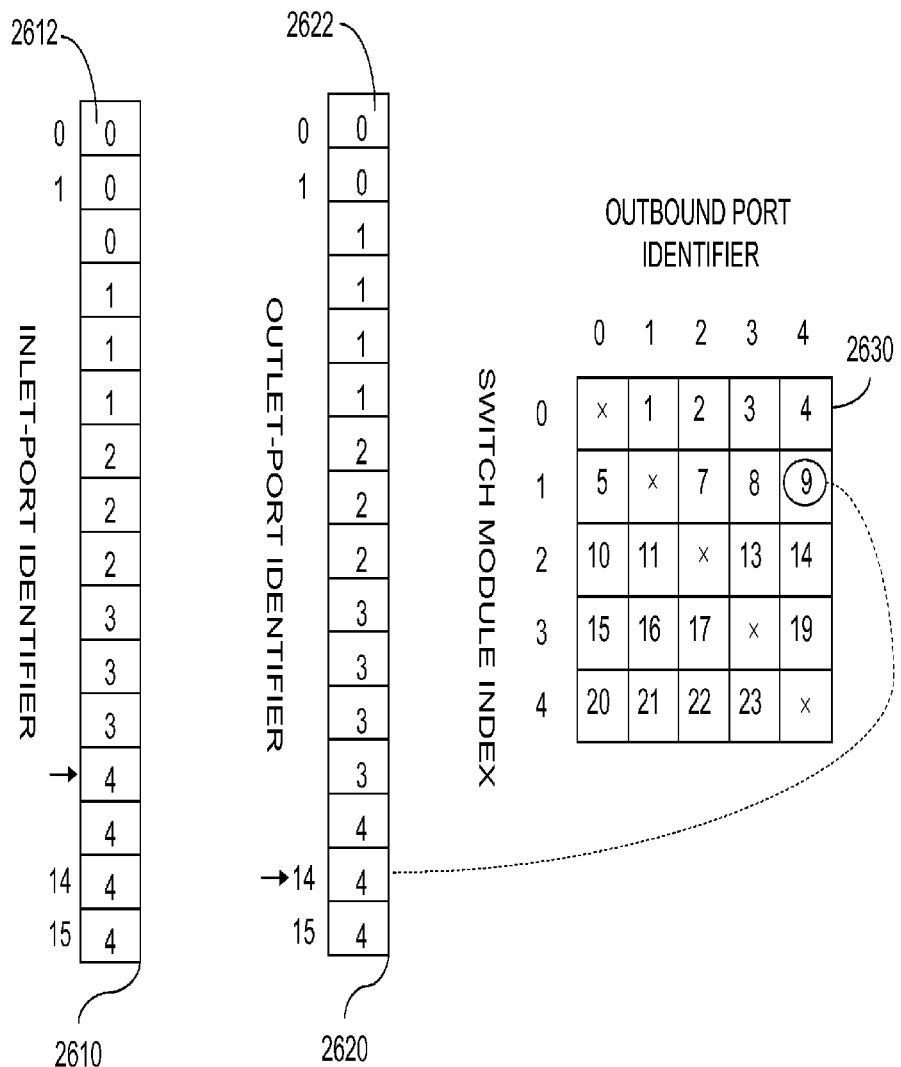

A connection request basically specifies an inlet port and an outlet port of the modular switch and a required number of time slots per time frame (per calendar). The switch-module controller must then identify the corresponding inlet switch module and outlet switch module. It is noted that the inlet switch module is not necessarily the switch module that receives the connection request. Referring to FIG. 26, an inlet port identification array 2610 having P entries, and an outlet port identification array 2620 having Q entries, where P is the number of inlet ports and Q is the number of outlet ports, can be used for associating a switch module with an inlet port or an outlet port. The inlet port identification array 2610 is indexed by an inlet-port identifier to read an identifier 2612 of the inlet switch module. Likewise, the outlet port identification array 2620 is indexed by an outlet-port identifier to read an identifier 2622 of the outlet switch module. A inner link identification matrix 2630 having N rows and N columns holds the identifiers of the inner-links, N being the number of switch modules 1004. An entry corresponding to row m and column n contains the identifier of the inner link connecting switch modules m and n, $0 \le m < N$, and $0 \le m < N$. When m=n, the identifier is a NULL value indicated by the symbol "x".

Figure 27:
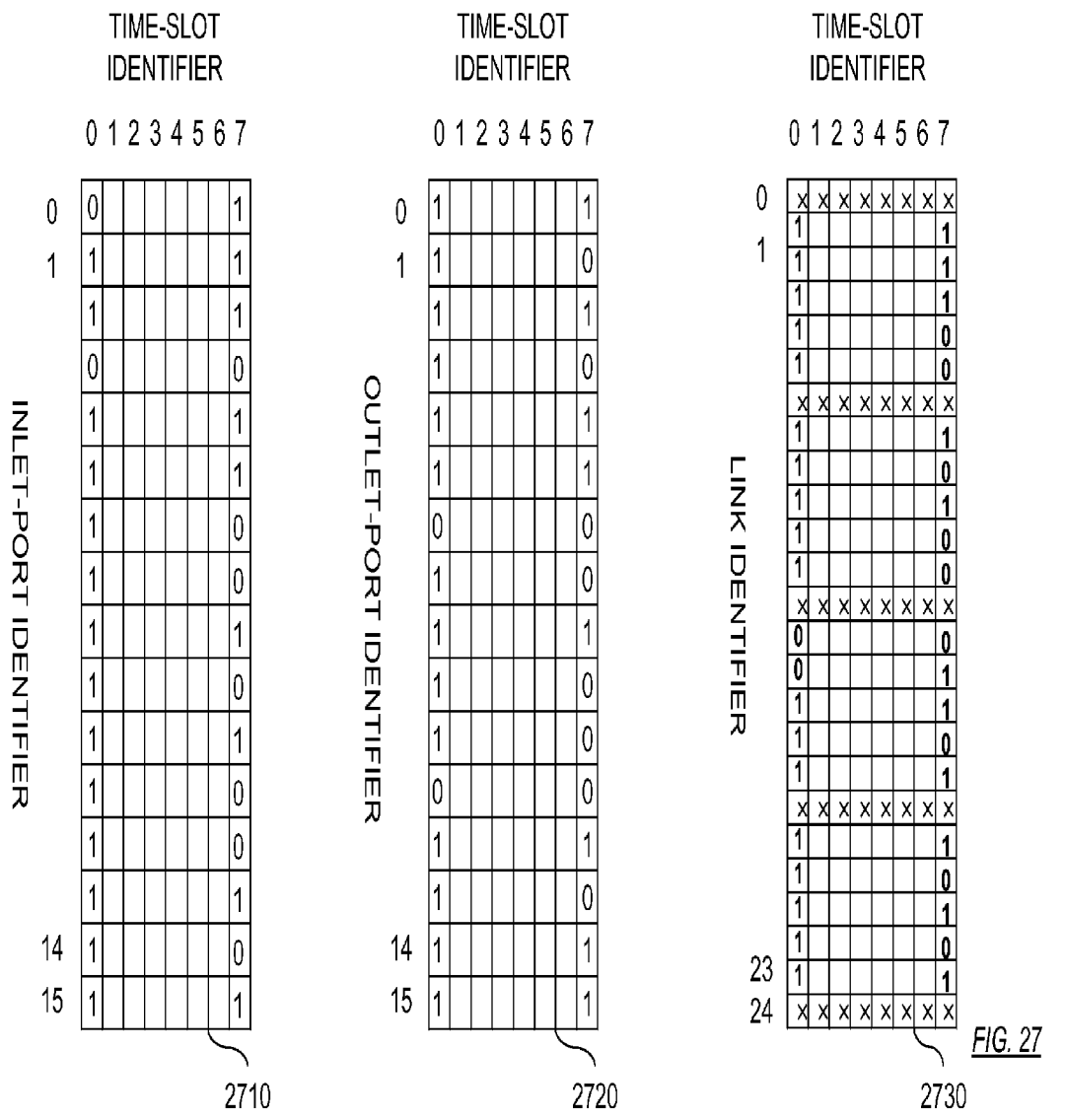

The arrays 2610, 2620, and matrix 2630 of FIG. 26 contain virtually static data that change only when the modular-switch configuration is changed. To allocate a path, requiring one or more time slots per time frame, three state maps are needed as illustrated in FIG. 27. An inlet port state map 2710 has a number of rows equal to the number P of inlet ports and a number of columns equal to the number of time slots per time frame, eight in this example. An outlet port state map 2720 has a number of rows equal to the number Q of outlet ports and a number of columns equal to the number of time slots per time frame. An inner link state map 2730 has a number of rows equal to the number of inner links and a number of columns equal to the number of time slots per time frame. The maximum number of inner links is N×(N−1). With N=5, the number of inner links would be 20. In this example, however, the number of rows of the inner link state map 2730 is 25 (numbered 0 to 24). The number of rows exceeds the actual number of inner links because the null links indicated in the diagonal of the inner link identification matrix 2630 are included for addressing convenience.

A data structure comprising the arrays 2610, 2620 and matrix 2630 of FIG. 26 and the state maps 2710, 2720 and 2730 of FIG. 27 can be used to find a path from any inlet port to any outlet port. If the inlet port identification array 2610 and the outlet port identification array 2620 indicate that the inlet port and the outlet port belong to the same switch module, only the inlet port state map 2710 and the outlet port state map 2720 need be consulted. For example, inlet port 12 and outlet port 14 belong to switch module 4, and hence only row 12 in the inlet port state map 2710 and row 14 in the outlet port state map 2720 need be examined. This requires examining corresponding time slots in the two rows until either the required number of matching time slots is reached or all time slots have been examined. If the inlet port identification array 2610 and the outlet port identification array 2620 indicate that the inlet port and outlet port belong to different switch modules, then the inner link identification matrix 2630 is consulted to determine the inner link connecting the different switch modules. For example, inlet port 12 and outlet port 12 belong to switch modules 4 and 3 respectively. Note that the inlet and outlet connectivity need not be identical, as indicated in the inlet port identification arrays 2610 and the outlet port identification array 2620. The inner link identification matrix 2630 indicates that link 23 connects inlet switch module 4 to outlet switch module 3. To find a path, row 12 in the inlet port state map 2710 and row 12 in the outlet port state map 2720 are examined to find matching time slots. As described earlier, a matching time slot is a time slot that is vacant in two or more specified ports or links. In order to realize temporal packing, as described earlier with reference to FIG. 9, the search for a matching time slot starts from the same reference time slot, conveniently selected to be time slot 0 for example. When the first matching time slot is found, according to the inlet port state map 2710 and the outlet port state map 2720, row 23 in the inner link state map 2730 is examined to determine if the matching time slot determined from rows 12 and 12 of the inlet port state map 2710 and the outlet port state map 2720 is also vacant in row 23 in the inner link state map 2730. If so, the time slot is marked as allocable in row 12 of the inlet port state map 2710, row 12 in the outlet port state map 2720, and row 23 in the inner link state map 2730. The process continues until either the number of required matching time slots is met or all the time slots have been examined and there is still a pending number, greater than zero, of time slots. If there is a pending number of time slots, a third-order matching process would be required. A third-order matching process can use up to (N−2) paths from the inlet switch module to the outlet switch module, one path through each switch-module other than the inlet and outlet switch modules.

Starting with a switch module 2, for example, to establish a path between inlet switch module 4 and outlet switch module 3, the inner link identification matrix 2630 is consulted to determine the identifier of the outbound link from switch module 4 to switch module 2 and the inbound link from switch module 2 to switch module 3. These are determined as inner link 22 (outbound) and inner link 13 (outbound). This can also be seen from FIGS. 19A and 19B. If a matching time slot determined from row 12 of the inlet port state map 2710 and row 12 of the outlet port state map 2720 is also free in row 22 and row 13 of the inner link state map 2730, the time slot is allocable and corresponding entries in row 12 of the inlet port state map 2710, row 12 in the outlet port state map 2720, and rows 22 and 13 in the inner link state map 2730. If a matching time slot is found through switch module 2, no other switch module is attempted because at most one path can be established during a single time slot. If, on the other hand, a path through switch module 2 is not found, another switch module, 0 for example, is considered. The outbound and inbound links are determined from the inner link identification matrix 2630 to be inner link 20 (outbound) and inner link 3 (inbound), and the process of third-order matching is repeated using row 12 of the inlet port state map 2710, row 12 of the outlet port state map 2720, and rows 20 and 3 of the inner link state map 2730. If all (N−2) path are attempted, successfully or otherwise, and if the pending number of allocable time slots is still greater than zero, and if at least one time slot has not been examined, then the process is repeated with a new time slot.

It is important to note that the outbound links, hence the associated inbound link, for the third-order matching processes are preferably selected in a manner that promotes vacancy equalization, as will be described later with reference to FIG. 29.

Figure 28:
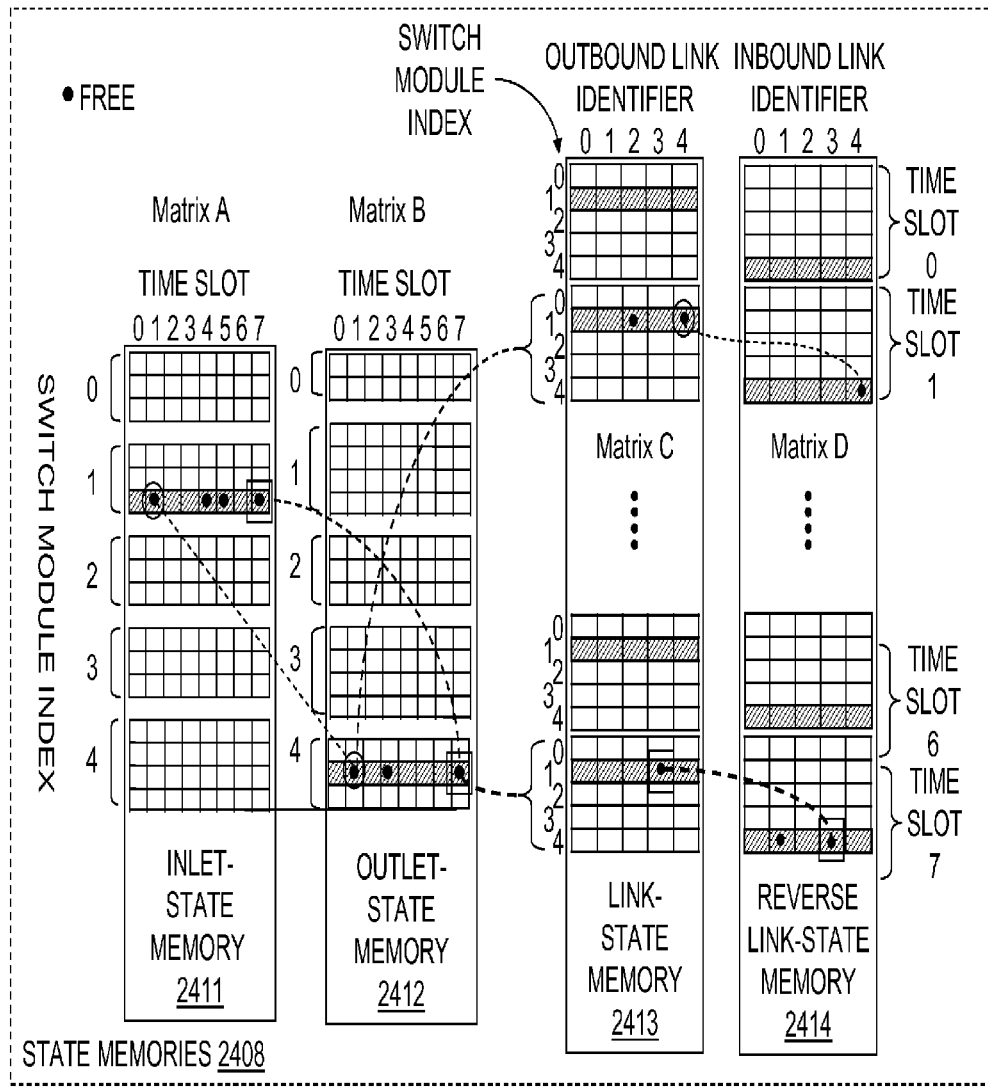
FIG. 28 illustrates state maps as used to select paths in a first-order, second-order, and third-order matching processes according to an embodiment of the present invention.

The path allocation processes can be further simplified if the port numbering scheme described with reference to FIG. 19 is adopted. With that scheme, the inlet switch module and outlet switch modules are indicated directly as the second of two concatenated words. In addition, since for each time slot in a third-order matching process (N−2) candidate paths may be examined, it is convenient to place their state indicators (a state indicator is either 0 or 1) in consecutive locations in memory for both the outbound inner link and the inbound inner link of a path. This suggests the use of separate memory devices to contain the states of outbound links and inbound links, leading of course to data-storage duplication but faster processing. The preferable structure of the state maps is illustrated in FIG. 28. The structure includes inlet port-state map 2411, analogous to the inlet port state map 2710, outlet port-state map 2412, analogous to the outlet port state map 2720, state map 2413 structured in σ×N rows, where σ is the number of time slots per time frame (per calendar) specified for a corresponding scheduler 2312 and N is the number of switch modules, and state map 2414 of a similar structure to that of state map 2413. Each row in input-port state map 2411 corresponds to an inlet port and each row in output-port state map 2412 corresponds to an outlet port. Each row in state map 2413 contains the states of N consecutive outbound links, including a null entry corresponding to a non-existing link from a switch module to itself. Each row in state map 2413 contains the states of N consecutive inbound links, including a null entry. The states of all inner links, in state maps 2413 and 2414 during a time slot occupy N consecutive rows, as indicated in FIG. 28. The time slot specified for each scheduler 2312 may be given consecutive numbers (0 to 7 in FIG. 28). There is a one-to-one correspondence between each of the time slots specified for a given scheduler 2312 and a time slot in the TDM time frame.

For each scheduler 2312, the state maps held in memory devices 2411, 2412, 2413, and 2414 take the form of matrices labeled A, B, C, and D, illustrated in FIG. 28. Each of the matrices labeled A and B includes a partition corresponding to each switch module. Each partition has a number of rows equal to a prescribed upper bound of a number of ports, in the input side or output side, of a switch module. The upper bound may further be selected to be the nearest integer that is a power of 2, and not less than the maximum number of ports per switch module, if addressing the matrices is based on concatenated numbers as described earlier. Only the used rows, however, are indicated in FIG. 28. Each of matrices A and B has a number of columns equal to the number of time slots in the time-slot band designated for the scheduler. Each of matrices C and D has a number of columns equal to above mentioned prescribed upper bound of a number of ports per switch module.

FIG. 29 outlines the steps of a process followed by one of the selectors 2312 in the path selection device 1106 to find a number of matching time slots. When the scheduler 2312 receives a request (step 2910) either from the previous scheduler 2312 or, in the case of the head scheduler 2312-1, from 1:2 distributor 2304 (FIG. 23), the scheduler extracts the connection parameters: j·m, k·n, q, and type, as described above. The time-slot t is set to zero (step 2912). The inlet state (0 or 1), stored in A(j·m, t) and the outlet state (0 or 1), stored in B(k·n, t), are examined (step 2920). If either is busy (state 1), a succeeding time slot within the time-slot set covered by the scheduler 2312 is sought (step 2970). If step 2920 is successful (i.e., if both the inlet port and the outlet port are free (state 0)), it is then required to determine whether the connection is an intra-module connection by comparing m and n (step 2922). If m=n, a result record {NULL, t}, where the first field indicates a link identifier and the second field indicates a relative time-slot identifier t, is generated (step 2932). The number, q, of pending time slots is reduced by 1 (step 2934) and corresponding entries in state matrices A and B are updated to indicate a busy state (step 2960), the result record is written in result buffer (step 2962) and, if q is still greater than zero (step 2964), a subsequent time slot is sought (step 2970). If, in step 2922, m and n are determined to be unequal, and the type of the request is determined to be other than type 2 (step 2924), a free time slot along the link from module m to module n is sought (step 2930). Note that, if such a direct link did not exist, the request would have been placed in buffer 2226 (FIG. 22) corresponding to a type-2 connection. To find an allocable time slot in a direct link, the value of C(m, n, t) is examined (step 2930) and if found to be zero (indicating a free time slot along link m·n), a result record (NULL, t} is generated (step 2932), the number q of pending time slots is then reduced by one (step 2934), corresponding entries in matrices A, B, and C are updated to indicate a busy state (step 2960), and the result record {NULL, t} is placed in the result buffer associated with the scheduler 2312 (step 2962). If q is still greater than zero (step 2964), the remainder of the sub-frame is examined starting with step 2970). If the sub-frame is exhausted (step 2974), and q is still greater than zero (as determined from step 2964), the connection request is placed in a cascade buffer (step 2980) which is the connection-request buffer 2402 of a subsequent scheduler 2312, and the process is complete. If the scheduler in question is the h$^{th}$ scheduler, the subsequent scheduler has an index equal to h+1. If h=H, the subsequent scheduler is the head scheduler 2312-1 and the cascade buffer of scheduler H is the fifth input buffer 2228 of the connection-control circuit 1104.

If, in step 2924, the connection type is determined to be 2, then a third-order matching process is activated (step 2940). If a path is found for the current time slot t (step 2950), a result record {L, t}, L being the selected outbound link from switch module m, is formulated, the number q of pending time slots is reduced by 1 (step 2934), corresponding entries in state matrices A, B, C, and D are updated (step 2960), and the result record is written in the result buffer 2314 associated with the scheduler 2312 (step 2962). Note that the matrix D will be discussed in conjunction with FIG. 30. If the pending number q of time slots is not zero (step 2964), a subsequent time slot is sought (step 2970) and, if the subsequent time slot is within the sub-frame of the current scheduler 2312 (step 2974), steps 2920, 2922, 2924, 2940, and 2950 are repeated. If step 2980 is reached, the connection-request parameters, with the current value of q, are written in the connection-request buffer 2402 buffer associated with the subsequent scheduler 2312-(h+1), and the process is complete.

Figure 30:
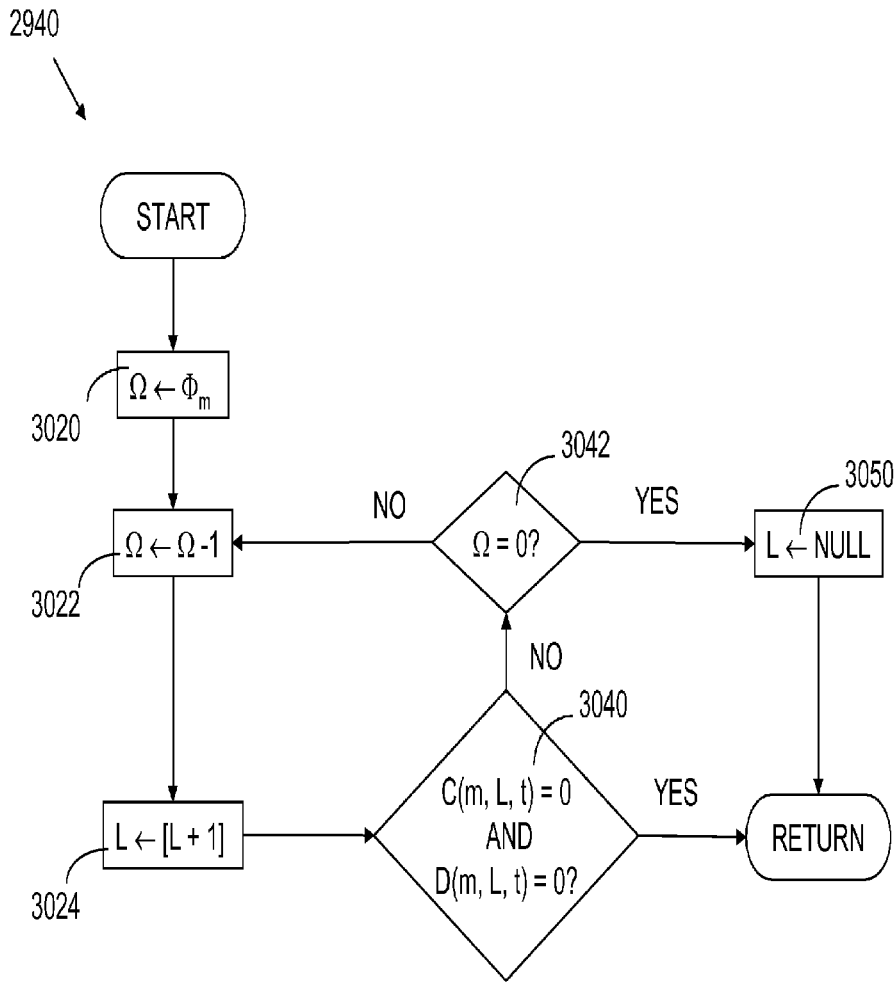
FIG. 30 illustrates details of a step of third-order matching to be used by the scheduler of FIG. 24 according to an embodiment of the present invention.

Details of step 2940 are given in FIG. 30. In step 3020, a number, Ω, of the remaining outbound links is initialized to equal the number, Φ$_m$, of provisioned outbound links for switch module m. In step 3022, Ω is reduced by 1, and in step 3022, a current outbound link from switch module m is selected by adding 1, modulo Φ$_m$, to the index of the last used outbound link. In step 3040, entries C(m, L, t) and D(n, L, t) are examined to determine the state of a two-link path from switch module m to switch module n through outbound link L during time slot t. If the path is free, step 2940 is complete and the selected value of L is used by step 2952 in formulating a result record. Otherwise, if in step 3040 it is determined that a path is not available, and provided that Ω is not zero, indicating that there is at least one more outbound link to be examined, steps 3022, 3024, and 3040 are repeated, and if step 3050 is reached, a NULL outbound link identifier is returned to step 2950 to indicate that a path was not found along any of the outbound links Φ$_m$ of switch module m. Where it is determined that a path was not found (step 2950), then a subsequent time slot (step 2970) is examined. It is noted that one of the Φ$_m$ outbound links can be a direct link, a path through which requires only a second-order time-slot matching process. However, such a link will always indicate a busy state (C(m, L, t)=1) because step 2940 is only activated when a second-order matching process fails in step 2930.

In performing step 3040, row m×t of matrix C and row n×t of matrix D are preferably read concurrently from the link-state memory and the reverse link-state memory, respectively and held in registers. It is noted that, in step 2940, only one outbound link L, 0≤L<Φ$_m$−1, can be selected during a single time slot t. In a full-mesh, Φ$_m$=N−2 for all switch modules, where N is the number of switch modules. It is desirable to equalize the vacancy among all links and, therefore, the initial value of L for successive searches is preferably selected in a cyclic fashion where the initial value of L succeeds the value at which the immediately preceding search has ended.

If, after exhausting all path for each time slot covered by the scheduler 2312, q is still greater than zero, the request parameters j·m, k·n, q, and type are placed in the connection-request buffer of the scheduler 2312. If the connection type is 2 and the scheduler 2312 is the tail scheduler 2312-H, the process is considered complete and, regardless of the value of q (0 or positive), the acquired allocable time slots are reported to the controller of the switch module that requested the connection. The switch-module controller can assign the time slots to the specific connection request for which the allocable time slots were sought, or the time slots may be assigned to another connection request, for example when q>0 after processing a given request and a subsequent request can use the allocable time slots.

The memory that would be required to maintain an indication of the state of every port of every switch module 1004 in the modular, high-capacity, optical core node 1100 is divided into a number of memory partitions equal to the number of stages in the path selection device 1106 of FIG. 23. FIG. 28 illustrates, in further detail, memory devices 2408 associated with a single scheduler 2312 (see FIG. 24). The memory devices 2408 include the inlet port-state memory 2411, the outlet port-state memory 2412, the outbound port-state memory 2413 and the inbound port-state memory 2414.

As is indicated in the inlet port-state memory 2411, time slots 1, 4, 5 and 7 are free for the inlet port 1016 labeled 7 (see FIG. 20A) of the second switch module 1004(1). Additionally, as is indicated in the outlet port-state memory 2412, time slots 1, 3 and 7 are free for the outlet port 1018 labeled 21 (see FIG. 20B) of the fifth switch module 1004(4). As the inlet port 1016 labeled 7 and the outlet port 1018 labeled 21 are not part of the same switch module 1004, a compound matching process is required. It should first be noted that the inlet and outlet ports 1016, 1018 of interest have free time slots 1 and 7 in common. The outbound port-state map of outbound port-state memory 2413 and the inbound port-state map of inbound port-state memory 2414 may then be consulted to select a path from the second switch module 1004(1) to the fifth switch module 1004(4). Specifically, the state maps relating to time slots 1 and 7 contained in these memories are reviewed.

A review of the state maps relating to time slot 1 reveals that a direct inter-modular link is available from the outbound port 1008 labeled 9 of the second switch module 1004(1) to the inbound port 1006 labeled 9 of the fifth switch module 1004(4). A result record arising from this path selection would read {9, NULL, 1}.

If the path selected in time slot 1 had not been available, or if a second time slot is requested by the time-slot-allocation request of interest, the state maps relating to time slot 7 may be reviewed. As indicated, an inter-modular link is available from the outbound port 1008 labeled 8 of the second switch module 1004(1) to the inbound port 1006 labeled 8 of the fourth switch module 1004(3). Additionally, an inter-modular link is available from the outbound port 1008 labeled 19 of the fourth switch module 1004(3) to the inbound port 1006 labeled 19 of the fifth switch module 1004(4). A result record arising from this path selection would read {8, 19, 7}.

A switch module can be implemented as a space switch which may switch optical signals from any input port to any output port. Recall that an input port can be an inlet port or an inbound port, and an output port can be an outlet port or an outbound port, as defined earlier. An optical signal may occupy a single wavelength channel or several wavelength channels. If all optical signals at input are in the same wavelength band, then any input signal can be switched freely to any output port. A switch module may also be implemented as a star-coupler where the input signals must have non-overlapping wavelength channels. Each input port must then be provided with a wavelength converter to shift the wavelength band of the optical signal received by the input port to correspond to a desired wavelength channel at an output port. (A wavelength channel carries a modulated wavelength which occupies a wavelength band).

Balancing the Processing Loads of the Schedulers

Each scheduler 2312 attempts to allocate time slots for connection requests waiting at the corresponding connection-request request buffer 2402, where the connection-request buffer of the head scheduler includes the four buffers 2222, 2224, 2226, and 2228. Each of the H schedulers is provided with state maps covering a prescribed set of time slots of the slotted time frame (i.e., a prescribed set of cells in a calendar). The H sets of time slots assigned to the H schedulers are nonintersecting. The time slots within each set need not occupy consecutive positions in the slotted time frame. Each scheduler assigns consecutive numbers to its assigned time slots and associates each of the numbers with a corresponding actual position of the time slot in the slotted time frame. A scheduler reports the actual time-slot positions of allocated time slots. The head scheduler receives fresh connection requests from the N switch-module controllers in addition to continuation connection requests from the tail scheduler after attempting to allocate a required number of time slots through a direct link from an inlet switch module to an outlet switch module, using a second-order time-slot matching process. A scheduler de-queues connection requests waiting in its corresponding connection-request buffer 2402 and attempts to schedule them within its assigned set of time slots. A scheduler processes one request at a time. The workload of the schedulers may vary appreciably, and the throughput of the assembly of schedulers, i.e., the mean number of scheduled time slots, is influenced by overloaded schedulers. The highest throughput is realized when the schedulers' workloads are equalized. The workload of a scheduler can be adapted by modifying its assigned subset of time slots. The occupancy of a connection-request buffer 2402 corresponding to a particular scheduler 2312 is an indicator of its workload. To balance the occupancies of the connection-request buffers 2402 of the H schedulers 2312, the master controller 1102 (FIG. 11) can monitor the occupancy of each of the H connection-request buffers and determine adjustments (increments or decrements) of the sizes of the time-slot subsets assigned to some of the H schedulers 2312. These adjustments are preferably adaptive, possibly changing with changing traffic composition.

Multiple Connections

A connection request received by a switch-module controller may specify an inlet port, an outlet port, and a number of time slots per time frame. A connection request may also specify a forward connection from an inlet port to an outlet port and a return connection from the outlet port to the input port, with different numbers of time slots per time frame in the forward and return connections. To enable the creation of virtual networks within a given network, a connection request may further specify multiple pairs of inlet ports and outlet ports with different time-slot allocation for each pair. Such a multiple-connection request would be initiated by an edge node that is managing a virtual network, in which case the controller of the switch module receiving the request would interpret the request and translate its connectivity requirement into a list of inlet-outlet-port pairs.

Nodal Capacity

With each port operating at the same nominal bit rate, and with a sufficient internal expansion, the access capacity of the modular switch is determined by the nominal bit rate times the lesser of the number of inlet ports and the number of outlet ports. If each inlet port receives only one wavelength channel, then the capacity of the modular switch is determined as the number of ports times the capacity per channel. Higher capacities may then be realized by using parallel switch modules.

Capacity of Scheduler Array

The rate at which a scheduler processes connection requests waiting at its connection request buffer depends heavily on the spatial distribution of the connections. An intra-module connection requests specifying inlet and outlet ports belonging to the same switch module requires a simple first-order time-slot matching process. An inter-module connection specifying inlet and outlet ports belonging to different switch modules may be allocated through a direct link using a second-order time-slot matching process. If the connection requests from each switch module specify an equal number of time slots to each of the other (N−1) switch modules, then the inter-module connections can be accommodated on direct links, and the processing-intensive third-order time-slot matching would not be required. If the connection requests from each inlet switch module specify a small number of outlet switch modules, resulting in direct-link overload, then a large proportion of inter-module connections must be accommodated through intermediate switching modules, requiring third-order time-slot matching.

As described earlier, a third order time-slot matching process requires comparing four calendars per candidate route. There are (N−2) candidate routes and examining all candidate routes requires (N−2)×$\Psi_h$ state inspection processes, each executed in $\Delta$ time units, where $\Psi_h$ is the size of time-slot subset assigned to scheduler h, $1 \le h \le H$. For S=1,024 time slots per time frame, and H=16, and if the time-slot subsets are of equal size, then $\Psi_h$=64. With N=32 switch modules, and $\Delta$=50 nanoseconds, the maximum duration of a third-order time-slot matching process within scheduler h would be about 100 microseconds, and the mean value may be as high as 80 microseconds. Estimating the processing time of an intra-module connection within the switch module to be four microseconds and the processing time of an inter-module connection accommodated through a direct inner link to be eight microsecond, and considering a spatial distribution where intra-module requests constitute 0.2 of all requests and inter-module requests accommodated through direct links constitute 0.4 of all requests, then the weighted mean processing time per connection is (0.2×4+0.4×8+0.4×80)=36 microseconds, and the scheduler throughput would be 27,700 basic connections per second. A basic connection requires one time slot, and the processing effort of a connection requiring y time slots is approximated as y×$\Delta$. Increasing the number of schedulers from 16 to 32 reduces the weighted mean processing time per connection to 18 microseconds and, hence, increases the throughput to 55,400 connections per second.

It is noted that the occupancy of the modular switch decreases gradually along the time frame, with the highest occupancy expected at the reference time slot (time slot 0 for example). The sizes of the time-slot subsets assigned to the H schedulers may be adjusted to equalize the workload.

Hybrid Modular Switch

Figure 31:
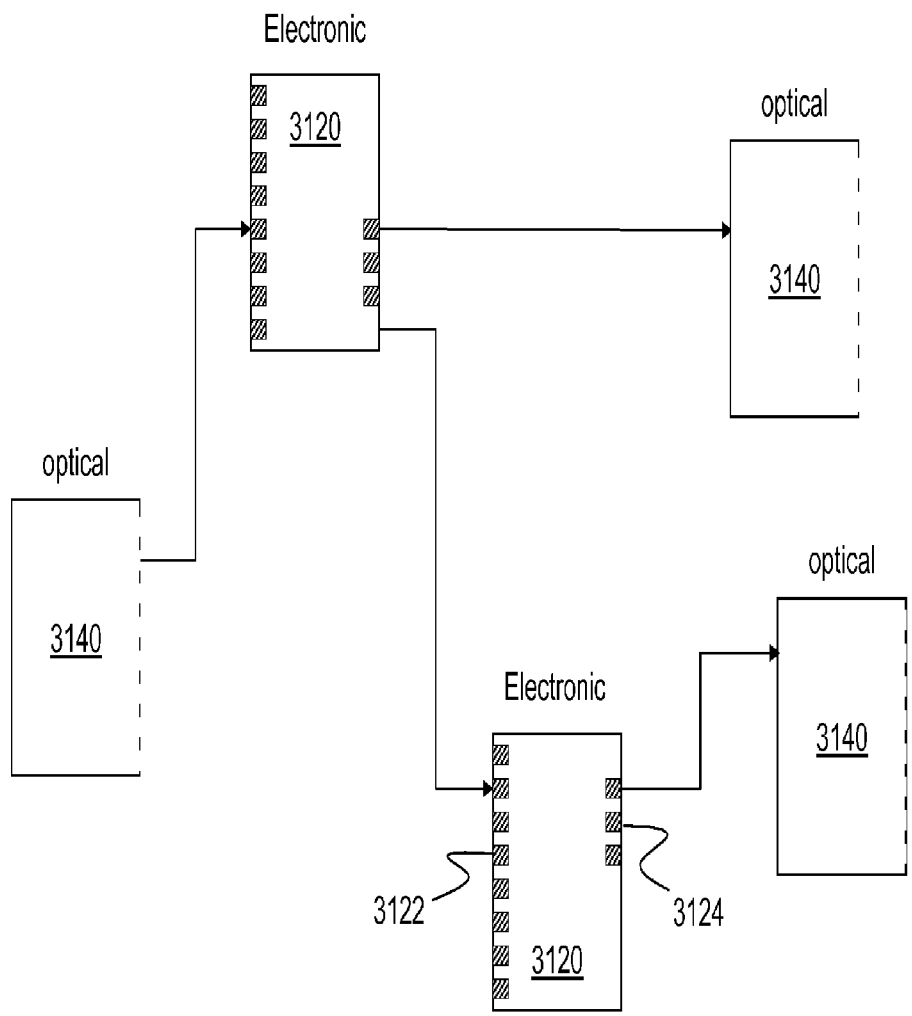
FIG. 31 illustrates a modular switch structured as a mesh of electronic switch modules and optical switch modules according to an embodiment of the present invention.

A modular switch can be constructed using both electronic and optical switch modules. FIG. 31 illustrates a modular switch structured as a mesh of electronic switch modules 3120 and optical switch modules 3140. Each electronic switch module 3120 preferably has a buffer 3122 at each inlet port and each inbound port (i.e., at each input port). A buffer is desirable at each inlet port to relax the requirement of time coordination with the source nodes. A buffer is needed at each inbound port in order to reduce the order of time-slot matching as illustrated in FIG. 32. In addition, if an outbound port of an electronic switch module 3120 connects to an inbound port of an optical switch module 3140, then it is also preferable that the outbound port be provided with a buffer 3124 to enable decoupling the matching processes at the electronic and optical switch modules and, hence, further reduce the order of the matching process. If a switch module in the modular switch is an electronic switch, the switch module need not be time-locked to the source nodes to which it connects. Time-alignment can, instead, be realized using the buffer 3122 at each input port of the switch module 3120.

FIG. 32 indicates the matching processes required in an internal path traversing two or three switch modules, where a switch module can be electronic or photonic. The highest order of matching processes is determined by the number of consecutive optical switching modules in the path. If a path traverses three switch modules where the middle switch module in the path is electronic, then three independent first-order matching processes are required. If only the first or the third switching module is an electronic switch, then two independent matching processes are required, one of which being a second-order matching process and the other a first-order matching process. It is preferable to start with the higher-order matching process in the search for matching time slots.

All-Electronic Modular Switch

A core node 1200 (FIG. 12) may comprise only electronic switch modules. To realize a modular switch of moderate capacity, of the order of 10 Terabits per second for example, common-memory switch modules may be used, each having 64 input ports and 64 output port. The 64 input ports would be divided into 24 inlet ports and 40 inbound ports, and the 64 output ports would likewise be divided into 24 outlet ports and 40 outbound ports. The 40:24 expansion is provided to offset the effect of spatial traffic imbalance which forces some inlet-outlet traffic streams to use two-link internal paths. The mesh structure of FIG. 4 or FIG. 12 would then comprise a maximum of 41 switch modules and the total number of input ports or output ports is then 24×41=984. With each input or output port operating at 10 Gb/s, the total capacity of the modular switch would be 9.84 Terabits per second. To realize a modular switch of very-high capacity, a rotator-based switch having 512 input ports and 512 output ports can be used as a switch module. With the 512 input ports divided into 192 inlet ports and 320 inbound ports, and the 512 output ports divided into 192 outlet ports and 320 outbound ports, the maximum number of switch modules in a mesh structure (FIGS. 4 and 12) is 321. The maximum number of input ports or output ports in the modular switch becomes 192×321=61632, and with each port operating at 10 Gb/s, the total capacity of the modular switch is about 616 Terabits per second. The rotator-based switch is described in U.S. Pat. Nos. 5,168,492 and 5,745,486 issued on Dec. 1, 1992 and on Apr. 28, 1998 to Beshai et al.

In summary, time-sharing switching can not be easily implemented in a network in which an optical signal has to traverse two or more optical switches. However, a set of intermediate-sized optical switches may be used in conjunction with a multi-stage configuration. Although path finding in a time-shared, multi-stage, bufferless, optical core node can be arduous, the present invention provides hardware for a relatively fast performance of the required extensive processing. The overall efficiency of a network based on high-capacity core nodes is enhanced by reducing the internal blocking of the core nodes, thus permitting high occupancy of the input links and output links of the core nodes, and by increasing the scheduling capacity of each core node, thus permitting fast redirection of connections.

Other modifications will be apparent to those skilled in the art and, therefore, the invention is defined in the claims.

What is claimed is:

1. A method of selecting a path through a modular optical switch comprising:
  receiving a request, where said request identifies a requested number of time slots, an inlet port of a first switch module and an outlet port of a second switch module;
  responsive to said receiving said request:
    initializing a local index to a value equal to the requested number of time slots;

comparing a state map associated with said inlet port to a state map associated with said outlet port to find a matching time slot that is vacant in both said inlet port and said outlet port;

if said comparing provides said matching time slot, wherein said state maps respectively associated with said inlet and outlet ports indicate vacancy in said particular time slot;

reducing the local index value by one;

generating an indication of successful mapping;

recording said matching time slot in a result record; and transmitting said result record to a controller of said modular optical switch.

2. The method of claim 1 further comprising repeating said comparing for a subsequent time slot of a first predetermined set of sequential time slots either until said matching time slot has been found or until said state maps associated with each of said first predetermined set of sequential time slots have been compared.

3. The method of claim 2 further comprising repeating said comparing, reducing and generating for each of said sequential time slots of said first predetermined set of sequential time slots either until said local index has been reduced to zero or until said state maps associated with each sequential time slot of said first predetermined set of additional time slots have been compared.

4. The method of claim 3 further comprising, where each of said first predetermined set of sequential time slots have been compared and said local index exceeds zero, repeating said comparing, reducing and generating for sequential time slots of a second predetermined set of sequential time slots either until said local index has been reduced to zero or until said state maps associated with each additional time slot of said second predetermined set of sequential time slots have been compared.

5. The method of claim 3 further comprising, where each of said first predetermined set of sequential time slots have been compared and said local index exceeds zero, outputting a request with a requested number of time slots set to a value of said local index.

6. A path selection apparatus comprising:

a local index counter a plurality of matching units, where each of said plurality of matching units is adapted to:

receive a connection request, where said connection request identifies a requested number of time slots, an inlet port of a first switch module and an outlet port of a second switch module;

initialize the local index counter to the requested number of time slots;

responsive to said receiving said time-slot-allocation request, compare a state map, specific to a particular time slot, associated with said inlet port to a state map, specific to said particular time slot, associated with said outlet port to find a matching time slot that is vacant in both said inlet port and said outlet port;

if said comparing provides said matching time slot, wherein said state maps respectively associated with said inlet and outlet ports indicate vacancy in said particular time slot:

reduce the local index counter by one generate an indication of successful mapping; and record said matching time slot in a result record;

a plurality of result buffers, each of said a plurality of result buffers adapted to receive a result record from an associated one of said plurality of matching units; and a cyclic selector adapted to select a single result record at a time from each of said plurality of result buffers under control of said cyclic selector.

7. The path selection apparatus of claim 6 wherein each of said plurality of matching units comprises:

a request buffer for receiving said time-slot-allocation request;

a memory adapted to store said state map associated with said inlet port and said state map associated with said outlet port;

a path finding processor adapted to:

receive said connection request from said request buffer;

access said memory; and perform said comparing to result in a given result record; and a selector adapted to:

receive said given result record as a product of said comparing; and transmit said result record to said associated result buffer.

* * * * *